(12) United States Patent
Breidenbach

(10) Patent No.: US 10,994,792 B2
(45) Date of Patent: May 4, 2021

(54) AERODYNAMIC DRAG REDUCING APPARATUS

(71) Applicant: Thomas Scott Breidenbach, Maple Grove, MN (US)

(72) Inventor: Thomas Scott Breidenbach, Maple Grove, MN (US)

( * ) Notice: Subject to any disclaimer, the term of this patent is extended or adjusted under 35 U.S.C. 154(b) by 0 days.

(21) Appl. No.: 16/522,341

(22) Filed: Jul. 25, 2019

(65) Prior Publication Data

US 2020/0156716 A1     May 21, 2020

Related U.S. Application Data

(63) Continuation of application No. 15/810,646, filed on Nov. 13, 2017, now Pat. No. 10,370,043, which is a continuation of application No. 15/230,604, filed on Aug. 8, 2016, now Pat. No. 9,815,507, which is a continuation of application No. 14/147,856, filed on Jan. 6, 2014, now abandoned, which is a continuation of application No. 13/306,706, filed on Nov. 29, 2011, now Pat. No. 8,622,461, which is a continuation of application No. 12/872,133, filed on Aug. 31, 2010, now abandoned, which is a continuation of application No. 12/132,585, filed on Jun. 3, 2008, now Pat. No. 7,784,854, which is a continuation of application No. 11/425,854, filed on Jun. 22, 2006, now Pat. No. 7,380,868.

(60) Provisional application No. 60/705,029, filed on Aug. 3, 2005, provisional application No. 60/705,026, filed on Aug. 2, 2005, provisional application No. 60/694,865, filed on Jun. 29, 2005.

(51) Int. Cl.
    *B62D 33/08*     (2006.01)
    *B62D 35/00*     (2006.01)

(52) U.S. Cl.
    CPC ........... *B62D 35/007* (2013.01); *B62D 35/00* (2013.01); *B62D 35/001* (2013.01); *B62D 35/004* (2013.01)

(58) Field of Classification Search
None
See application file for complete search history.

(56) References Cited

U.S. PATENT DOCUMENTS

| | | | |
|---|---|---|---|
| 6,309,010 B1 * | 10/2001 | Whitten | B62D 35/001 296/180.1 |
| 6,467,833 B1 * | 10/2002 | Travers | B62D 35/004 296/180.1 |
| 2004/0119319 A1 * | 6/2004 | Reiman | B62D 35/004 296/180.1 |

* cited by examiner

*Primary Examiner* — Lori L Lyjak
(74) *Attorney, Agent, or Firm* — Merchant & Gould P.C.

(57) ABSTRACT

An aerodynamic drag reducing apparatus is adaptable for use with vehicles having downstream surfaces that are not streamlined. The apparatus consists of a series of nesting shapes and/or frameworks that extend rearward for use in a drag reducing configuration and collapse for use in a space saving configuration.

20 Claims, 67 Drawing Sheets

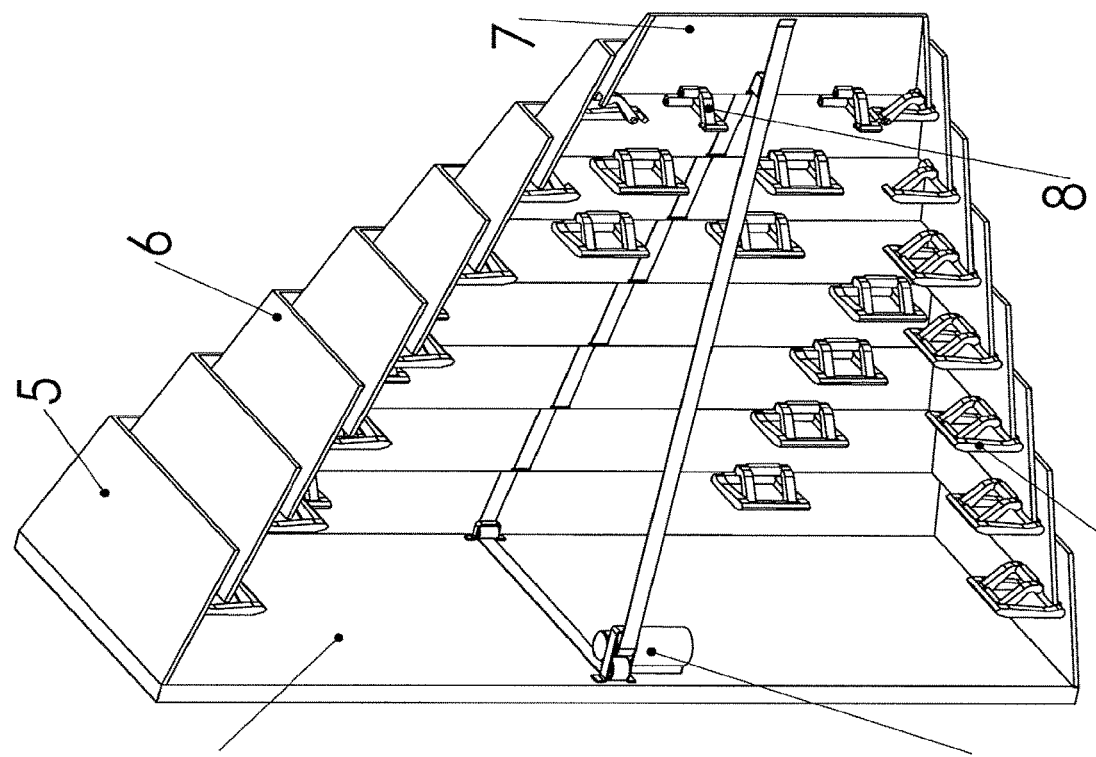
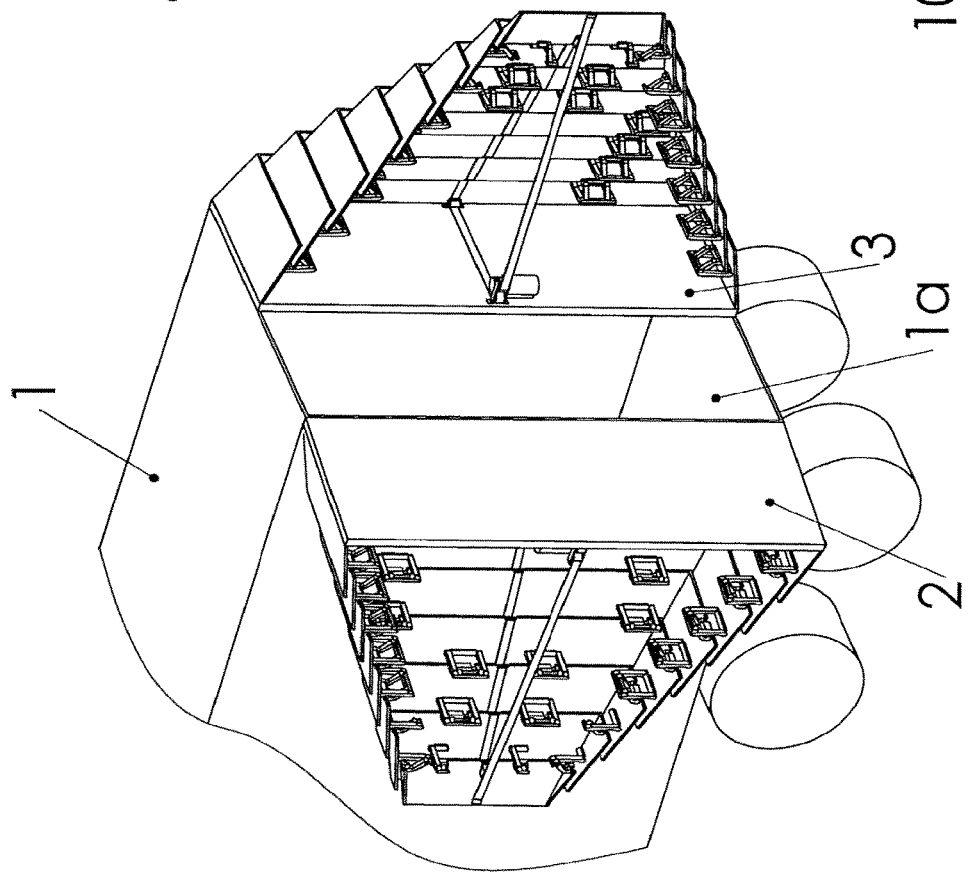
Fig. 1H
Fig. 1G

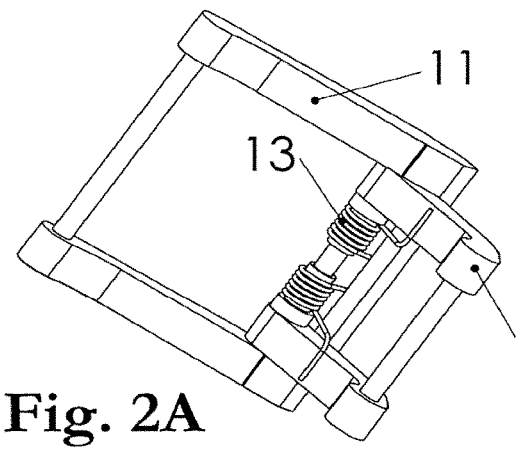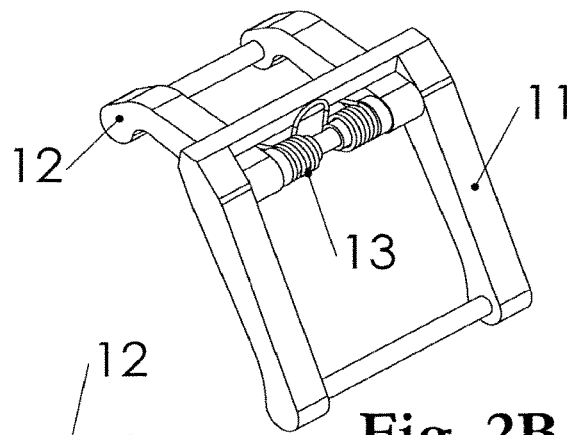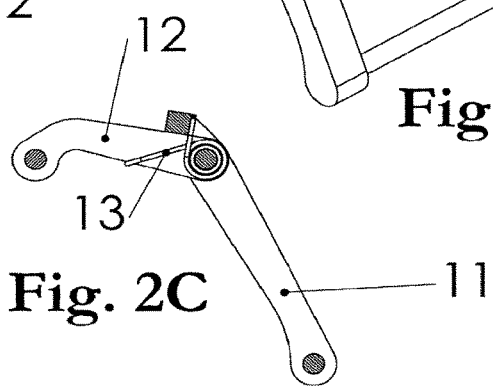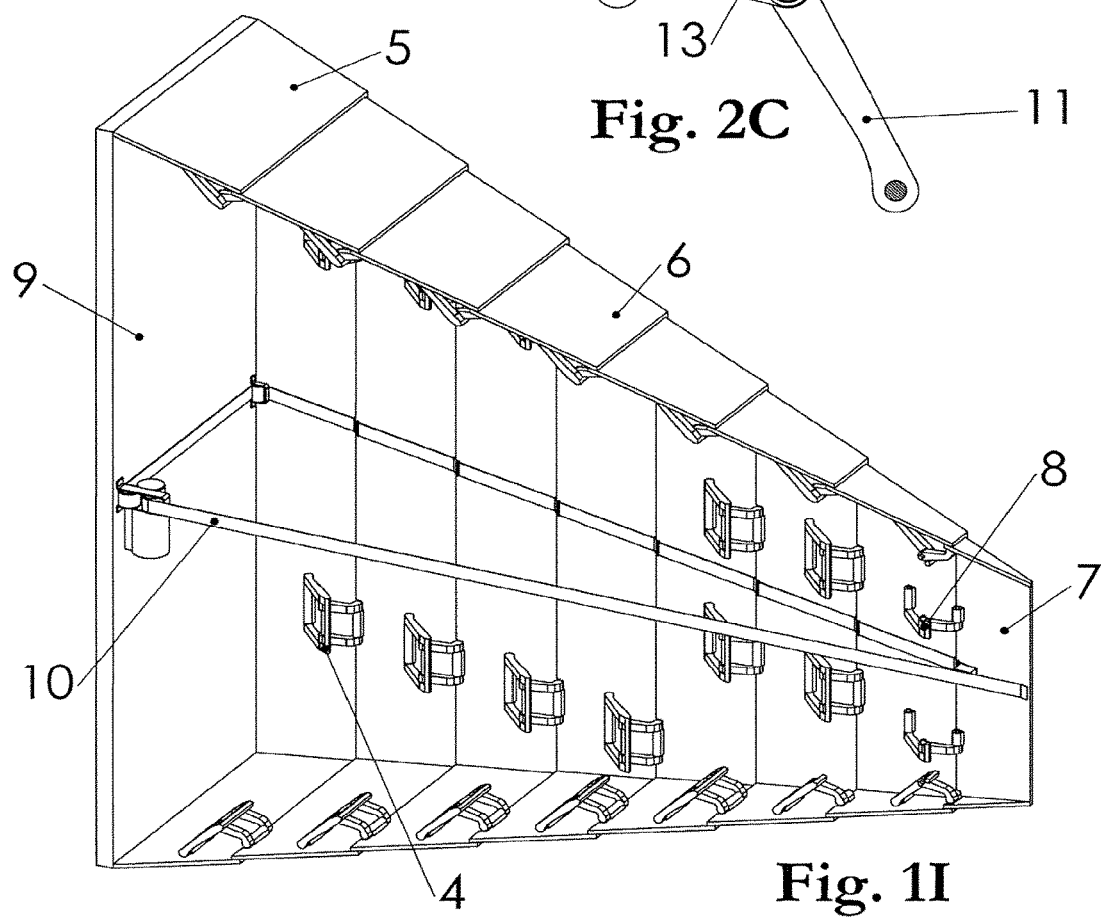

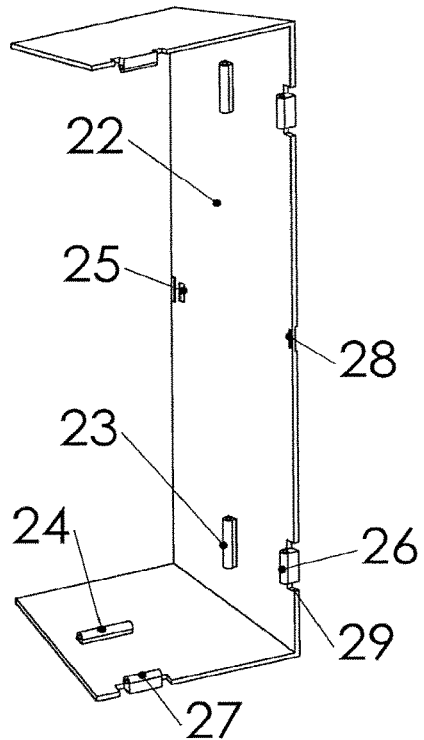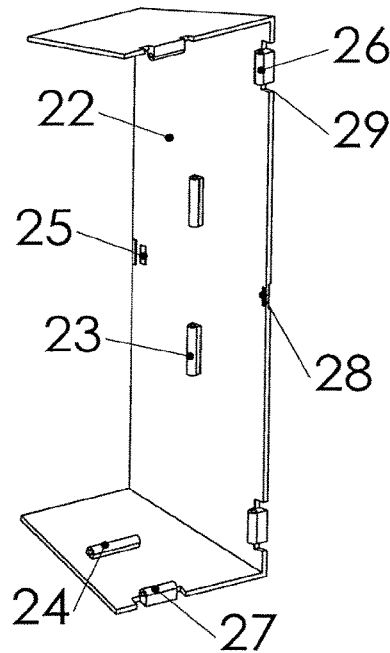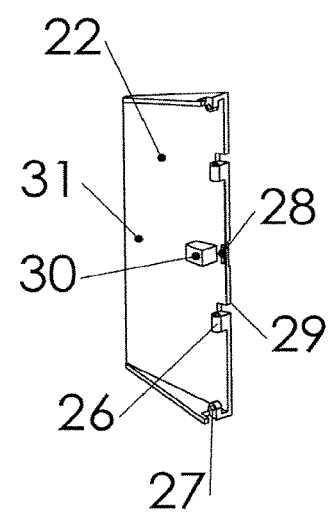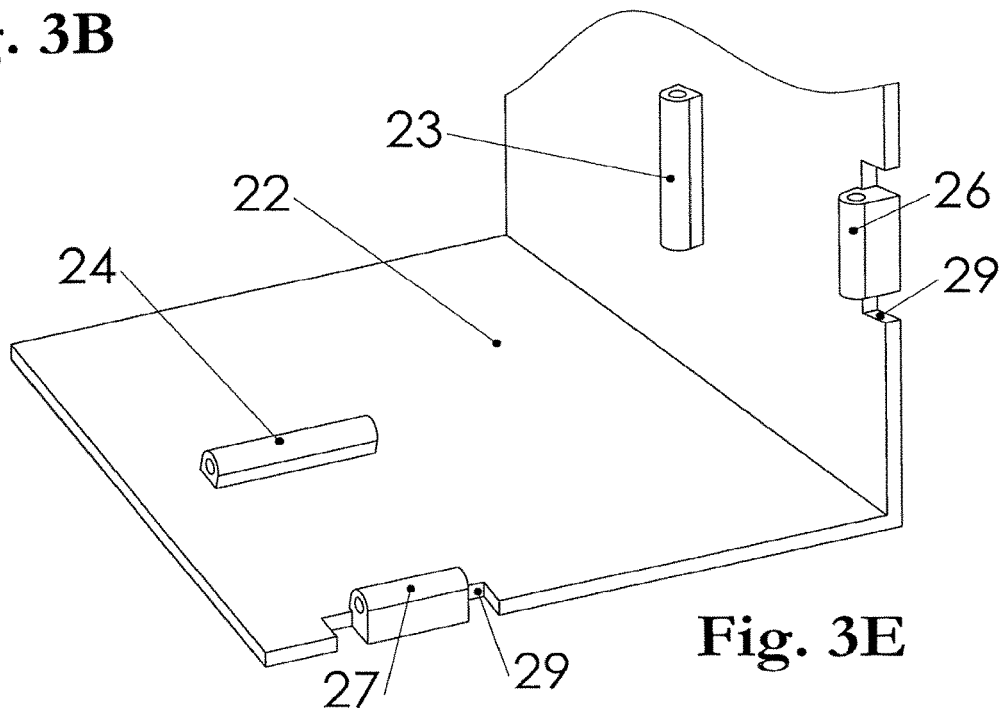

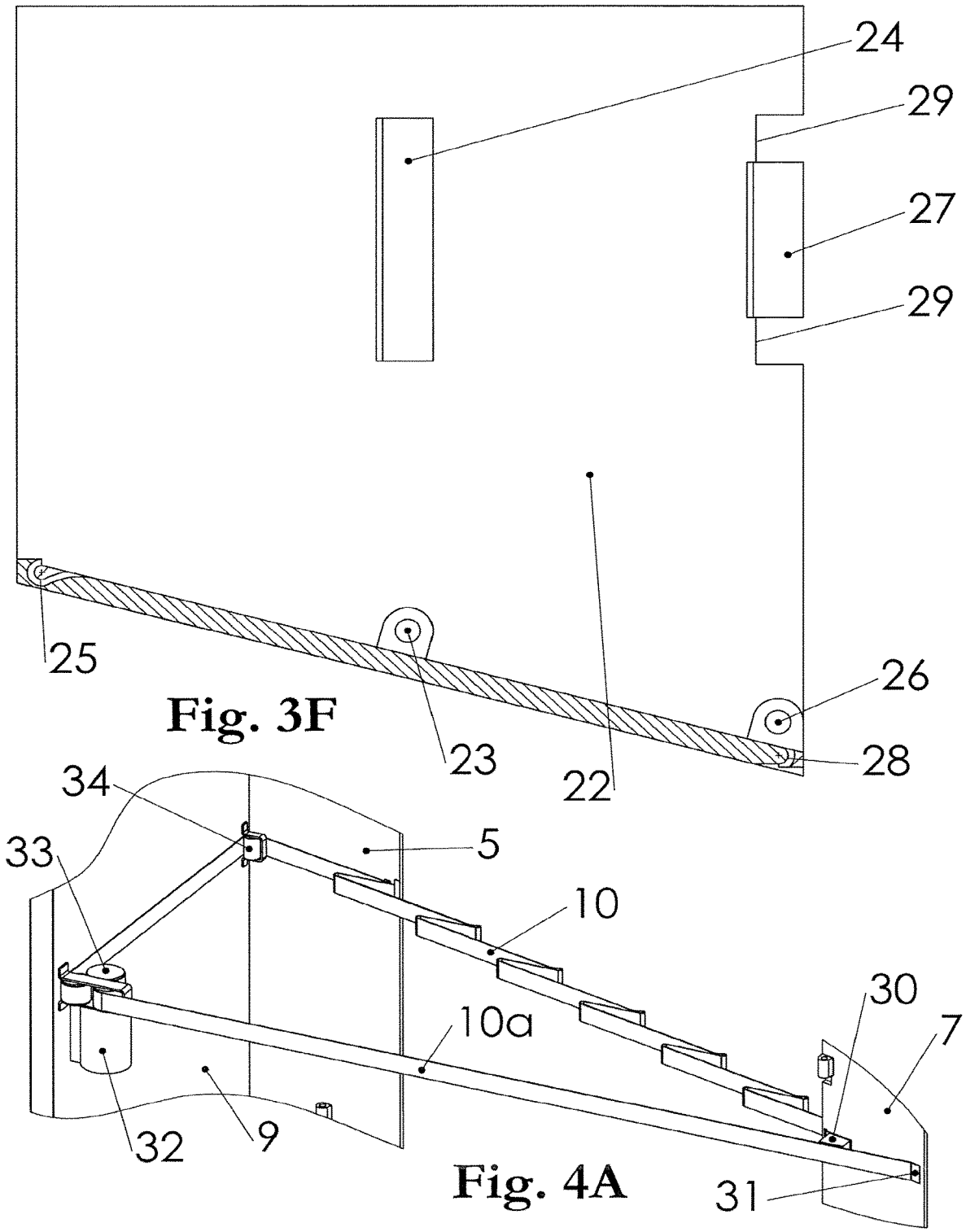

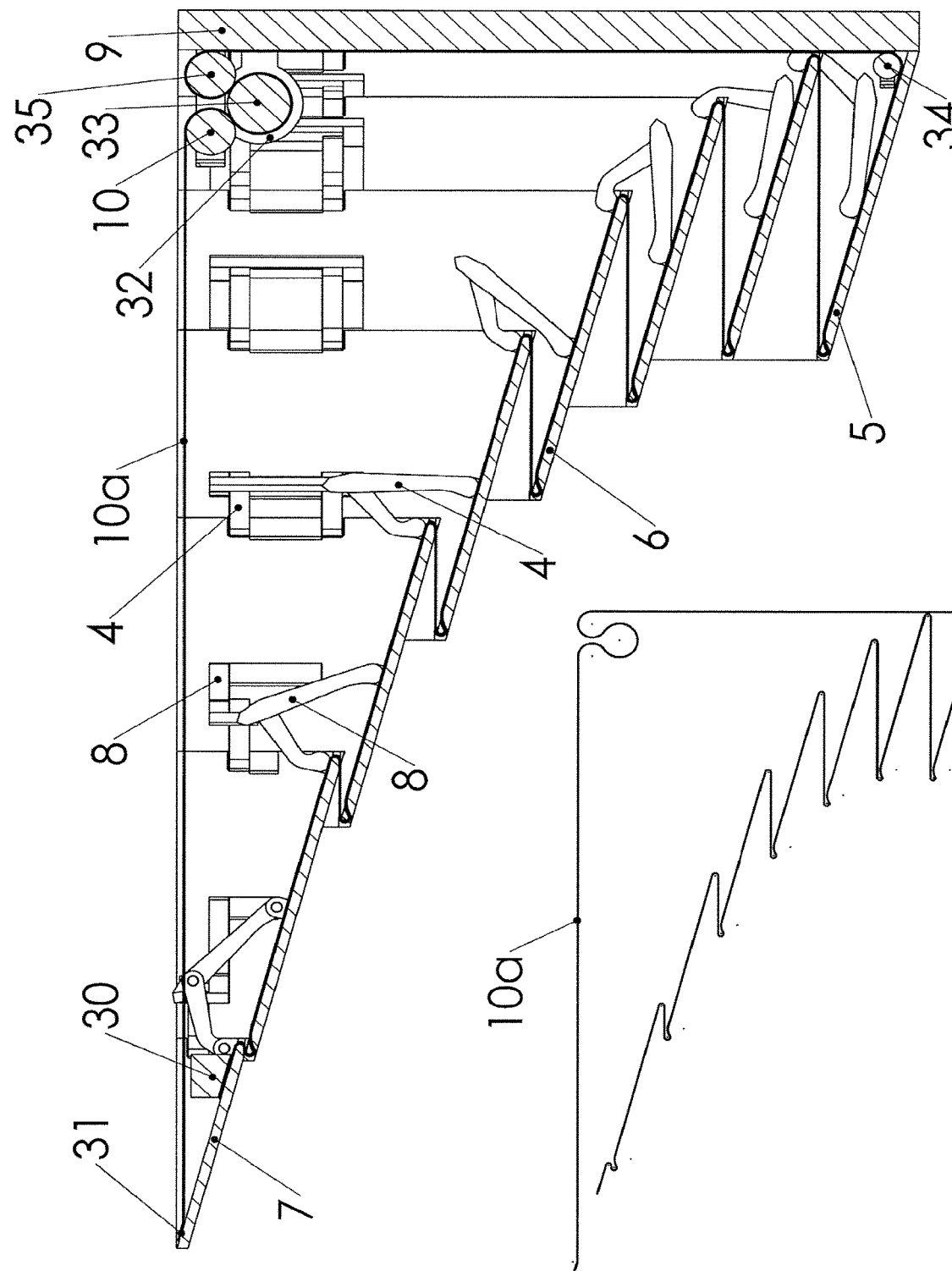
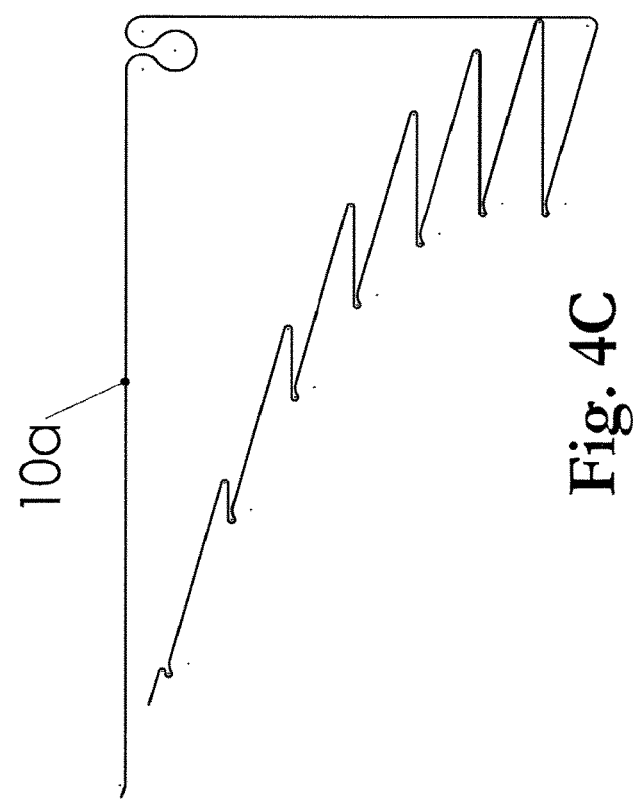
Fig. 4B
Fig. 4C

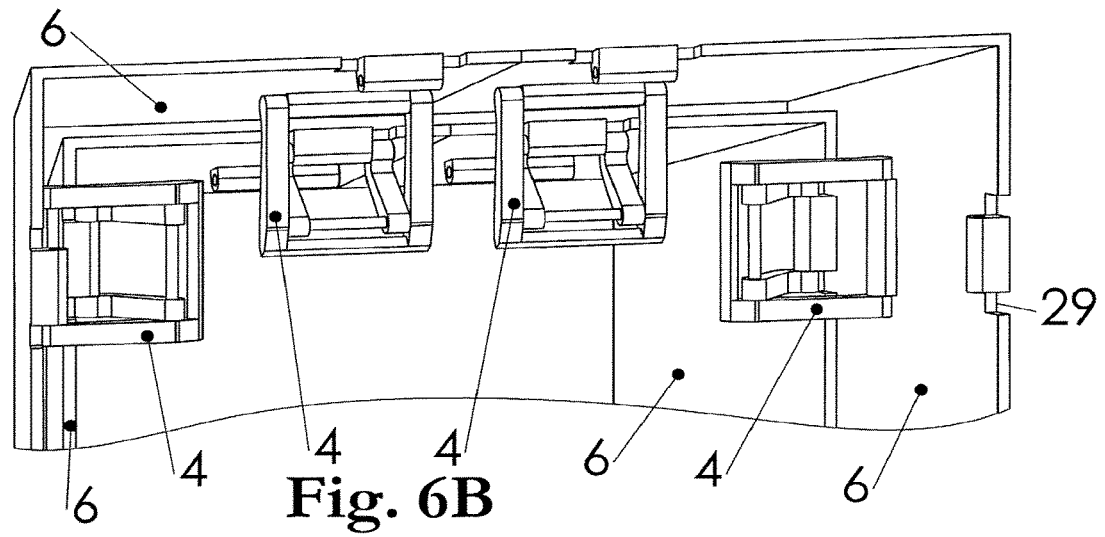
Fig. 6B
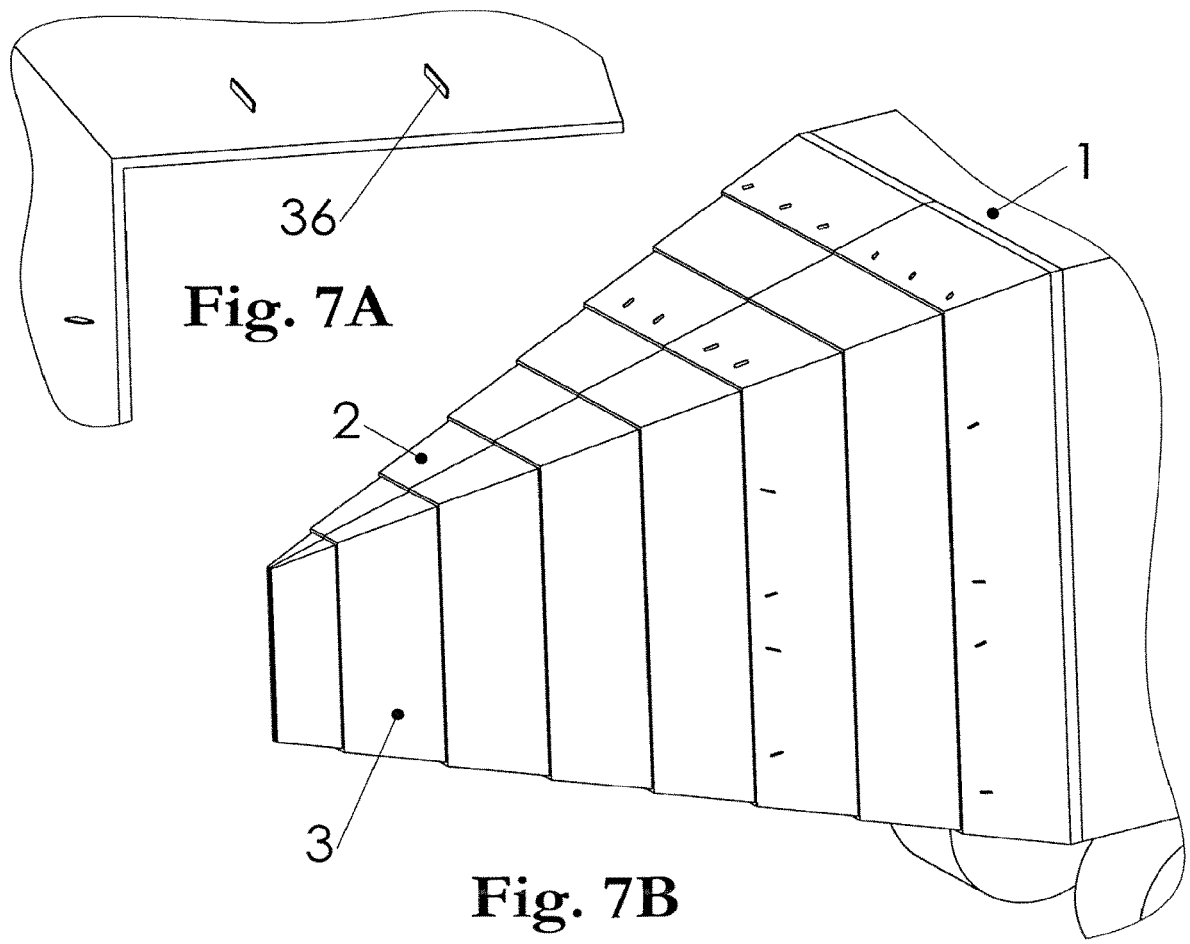
Fig. 7A
Fig. 7B

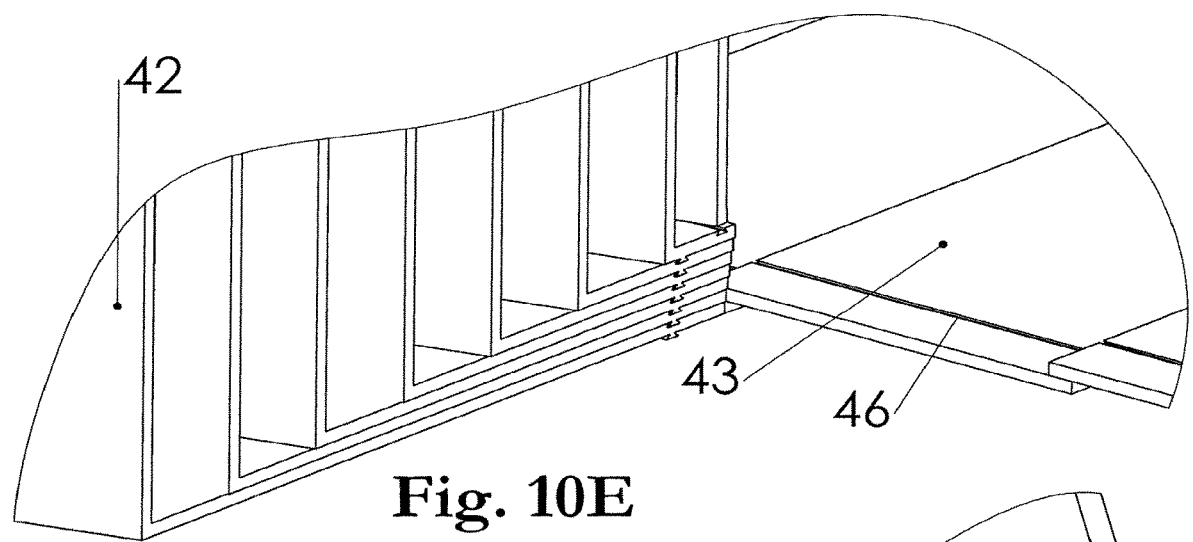
Fig. 10E
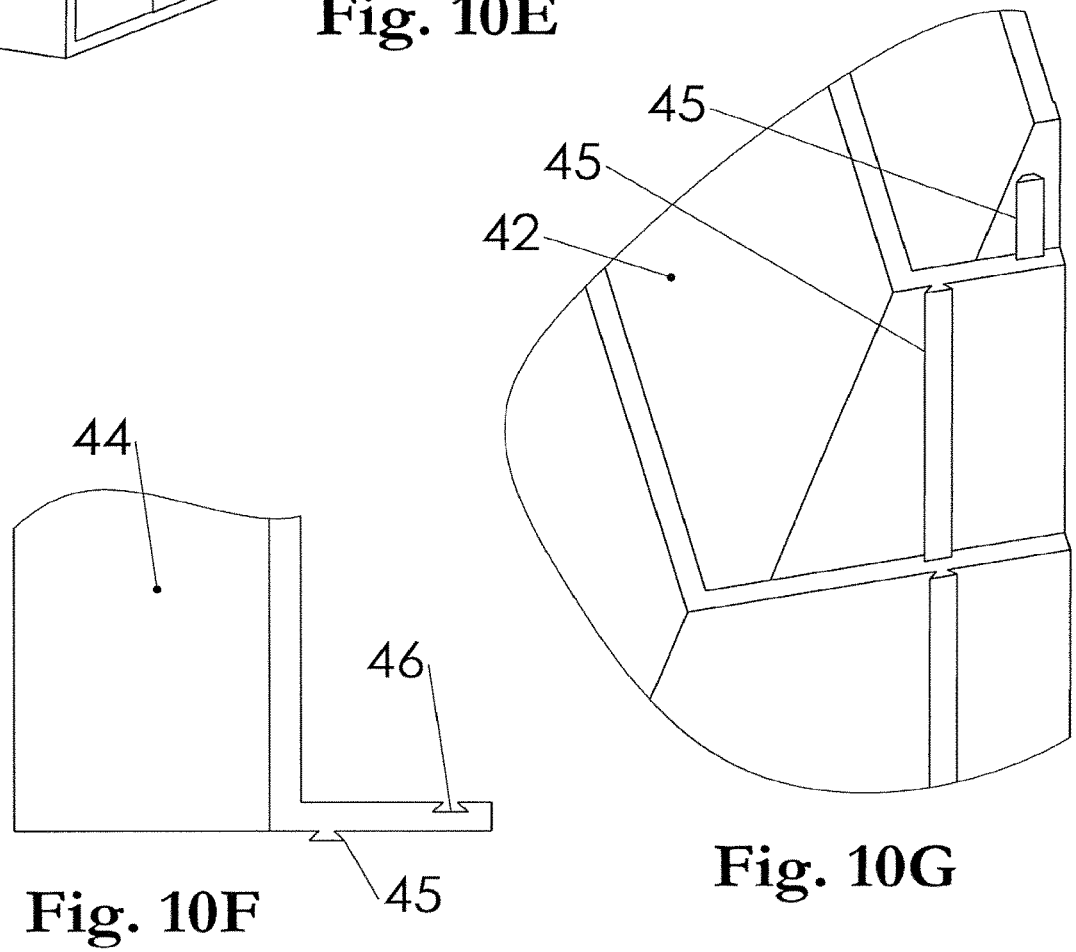
Fig. 10F
Fig. 10G

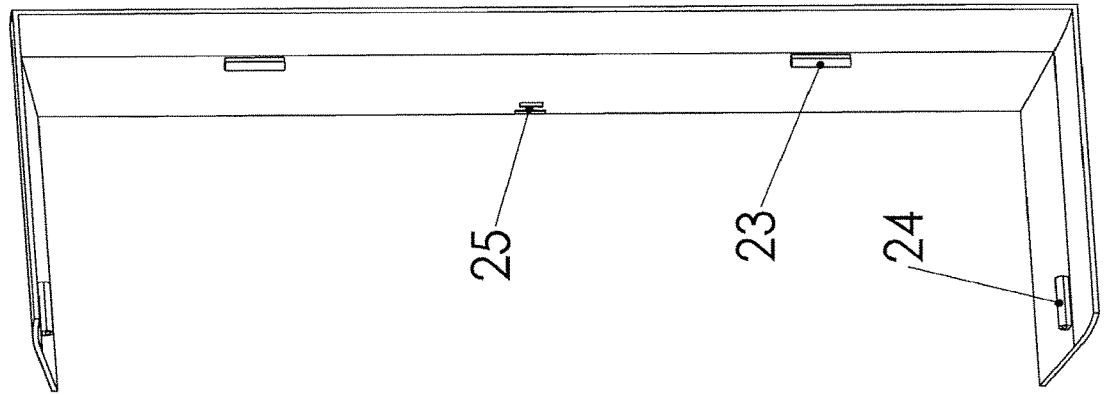
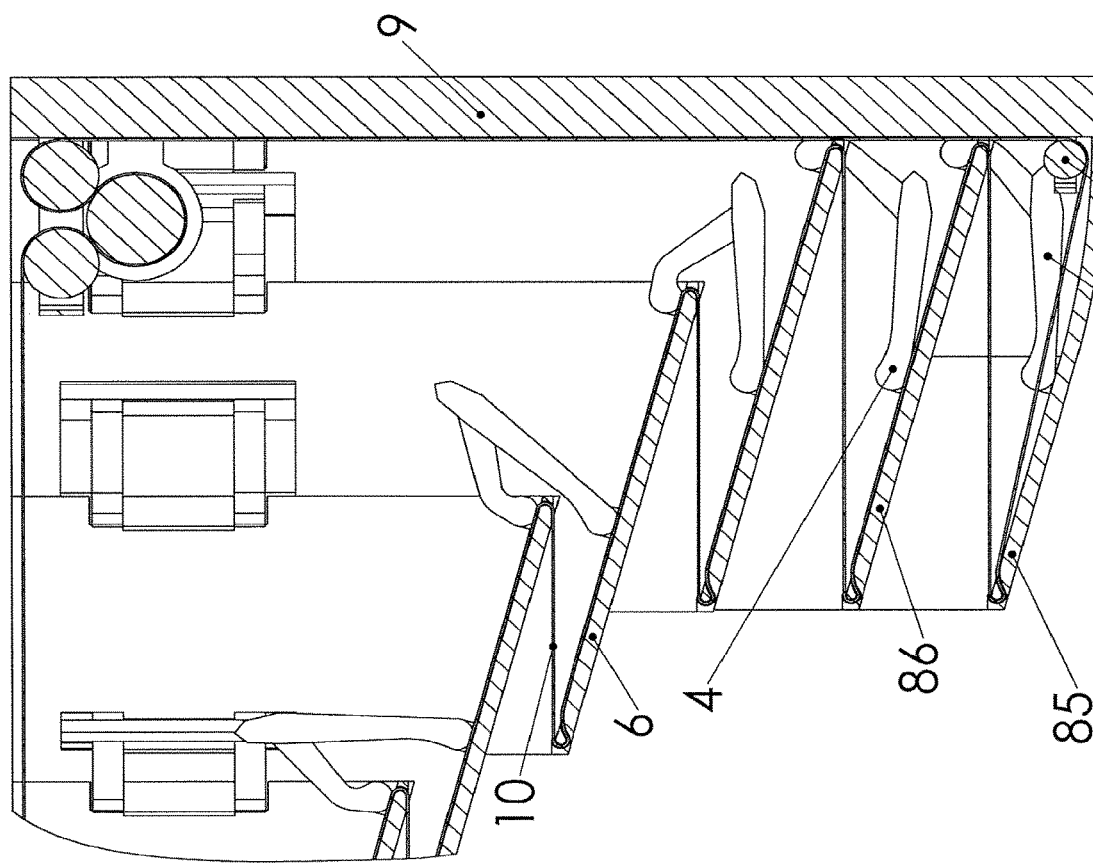

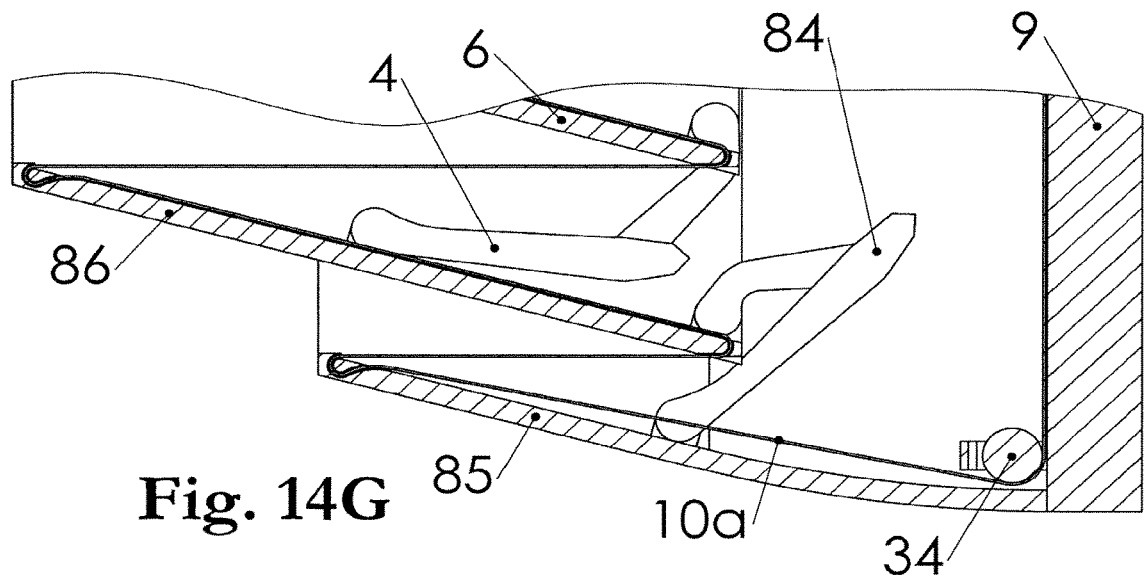
Fig. 14G
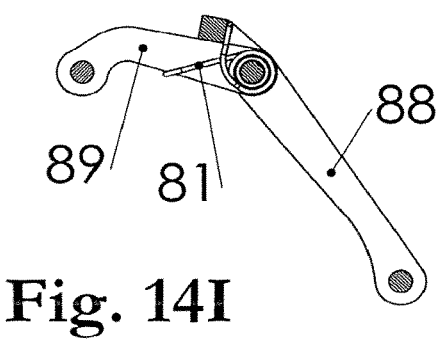
Fig. 14H
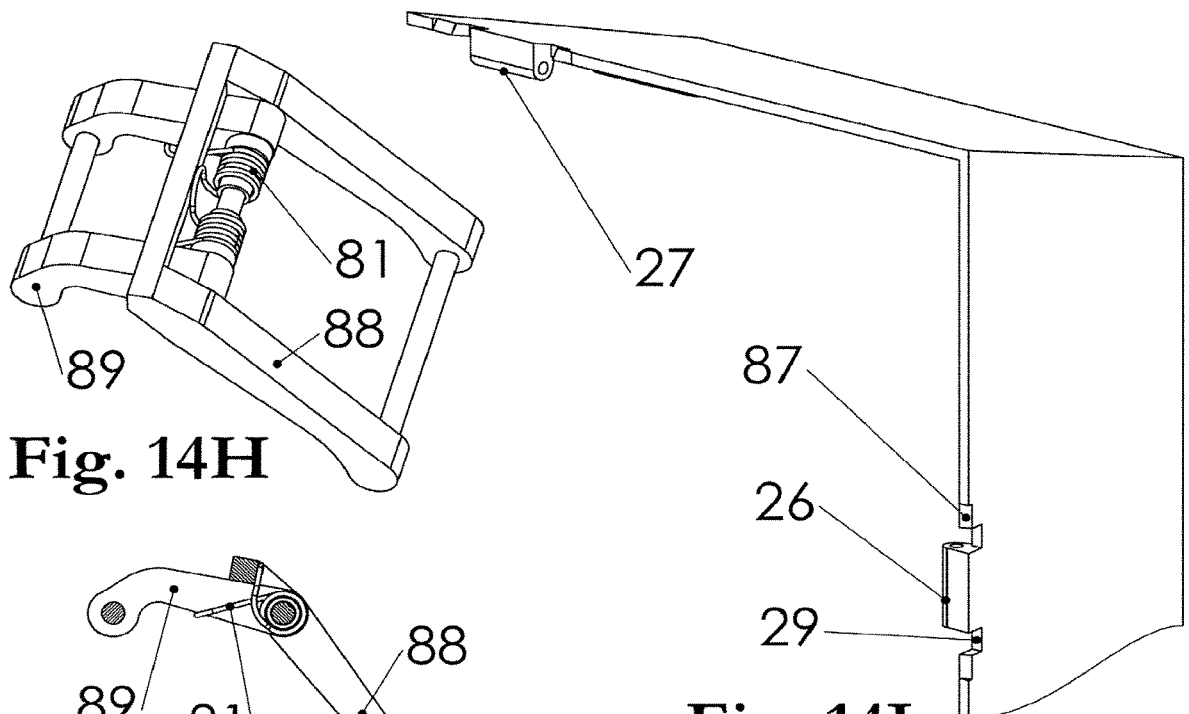
Fig. 14I
Fig. 14J

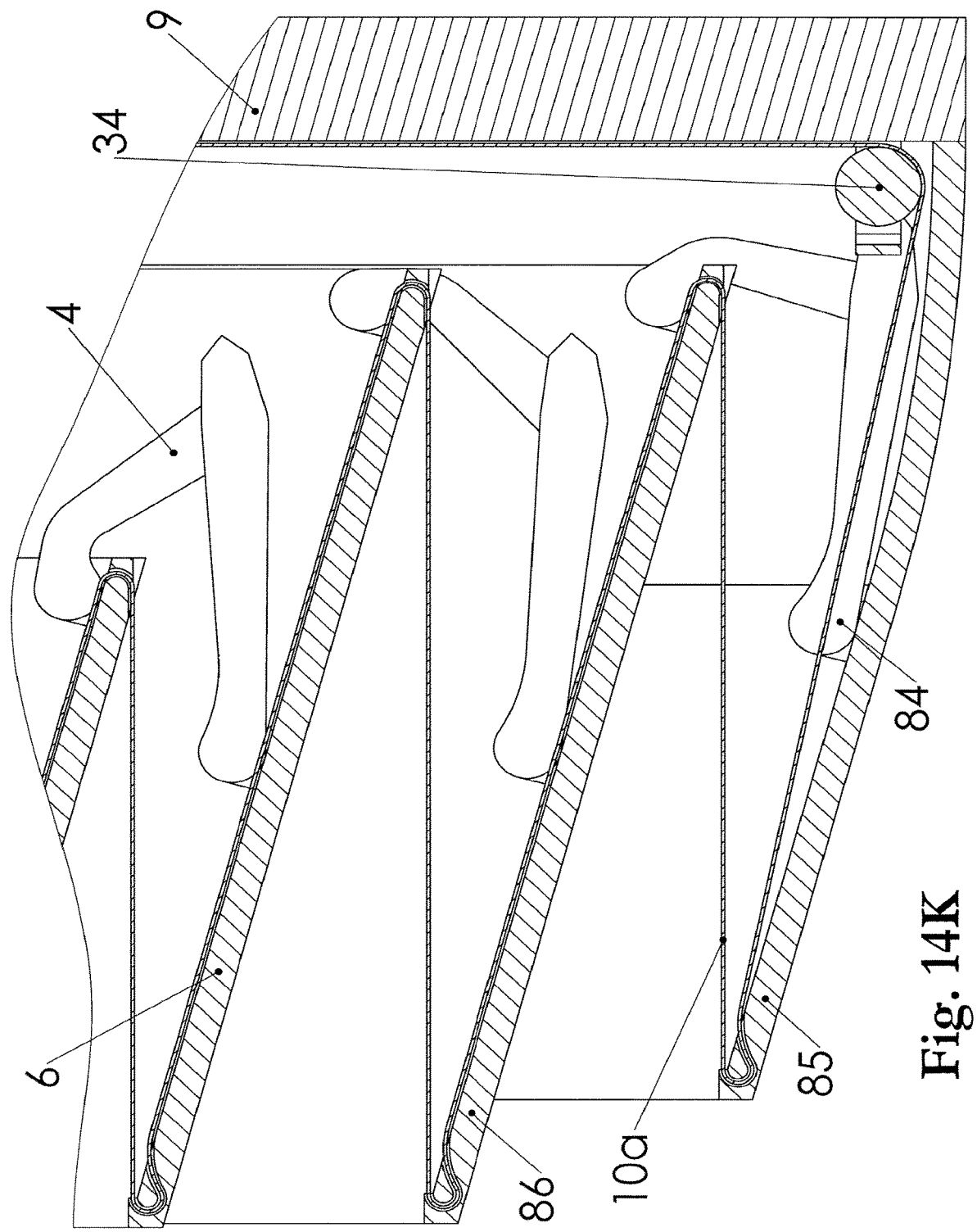

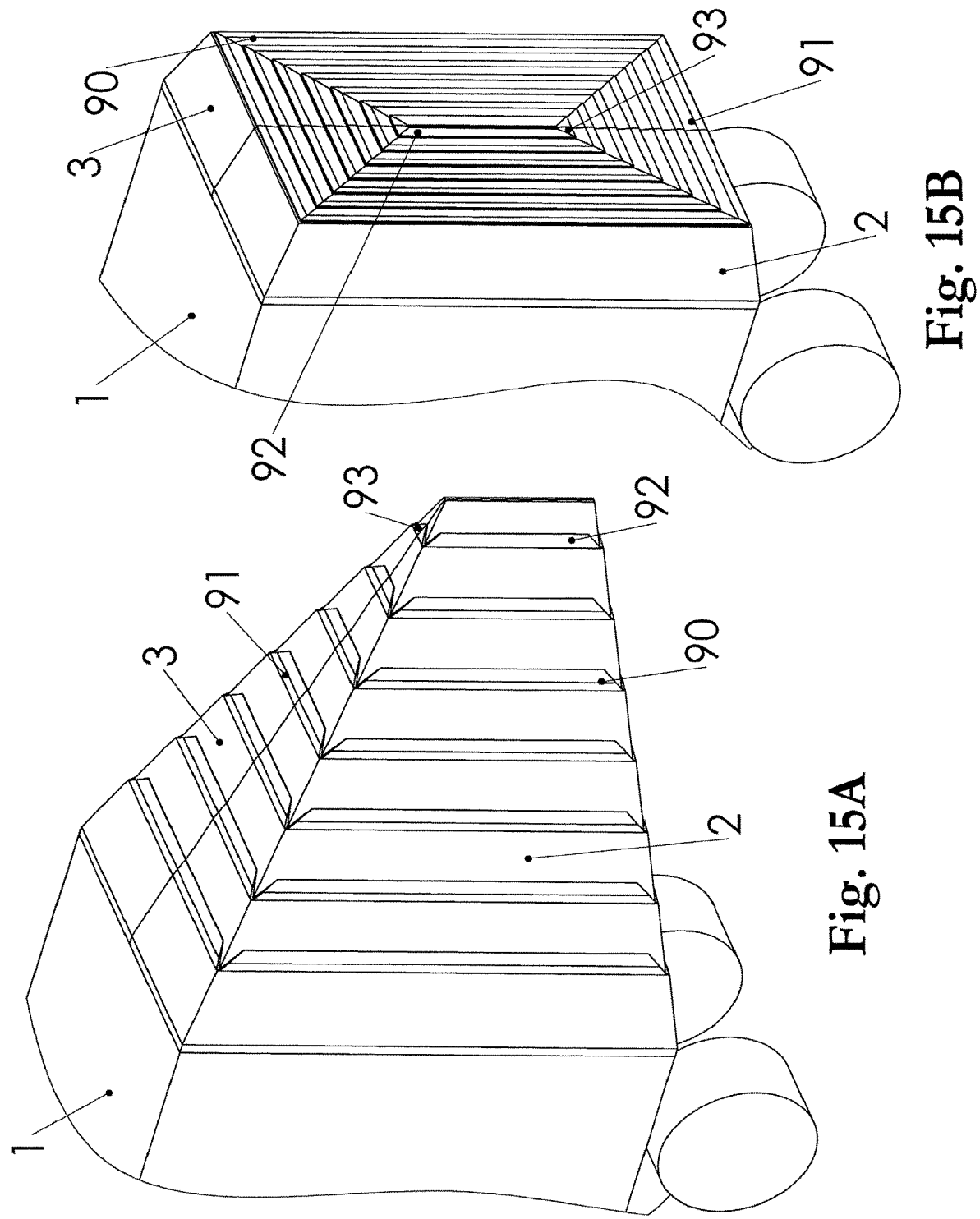

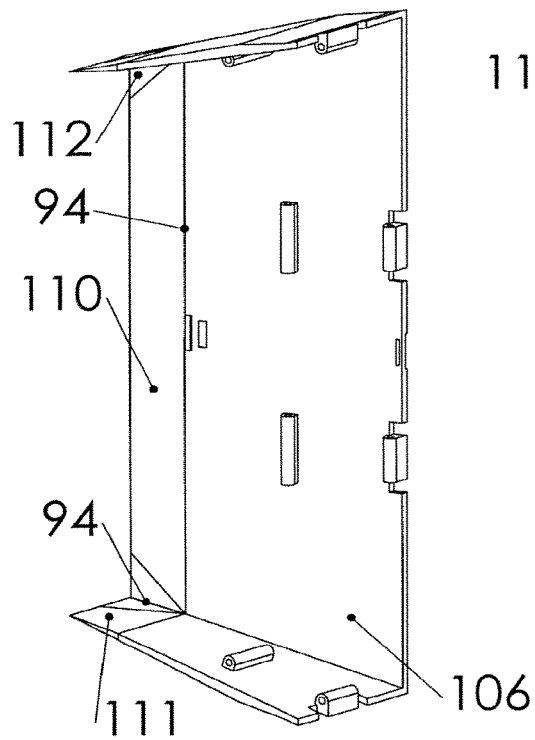
Fig. 16K
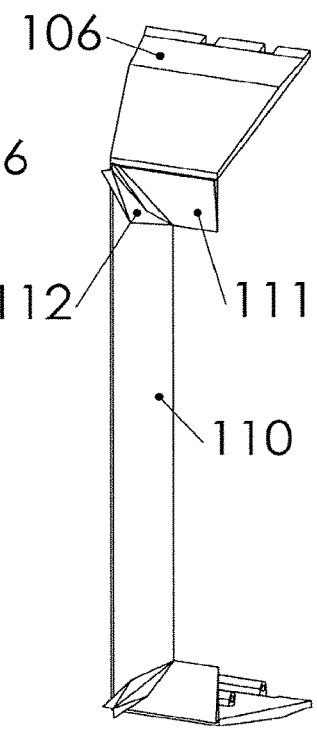
Fig. 16L
Fig. 16M
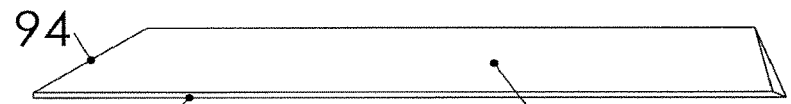
Fig. 16O
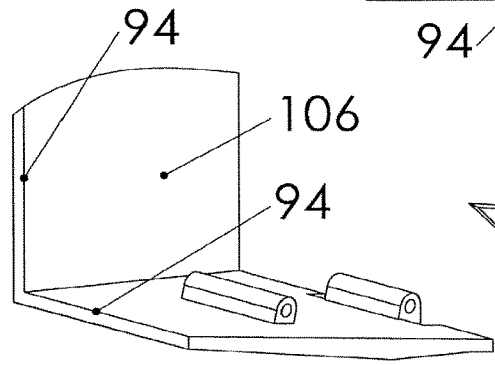
Fig. 16N
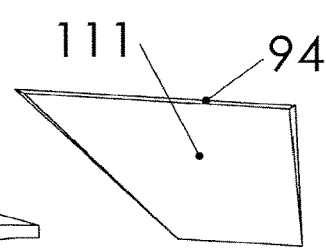
Fig. 16P
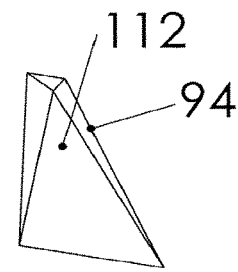
Fig. 16Q

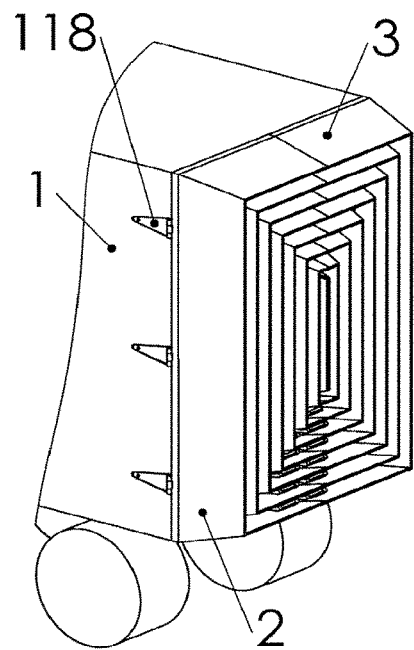
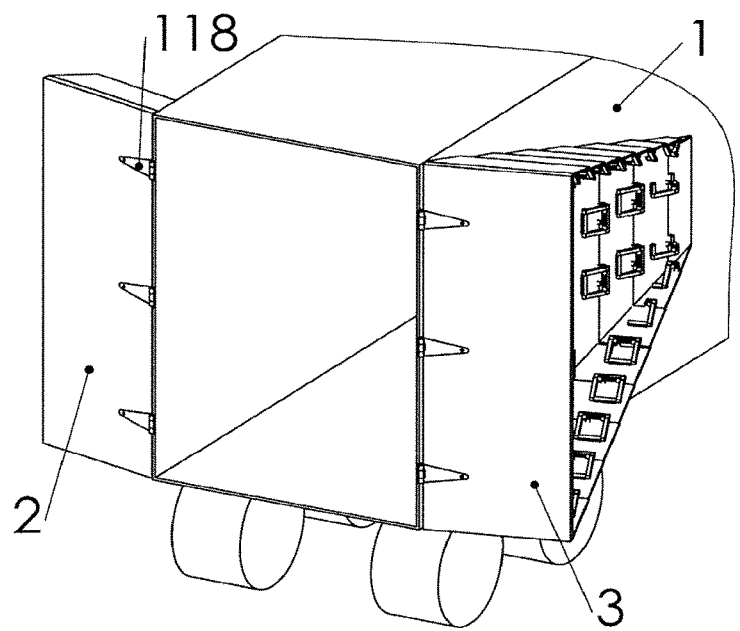
Fig. 17A  Fig. 17B
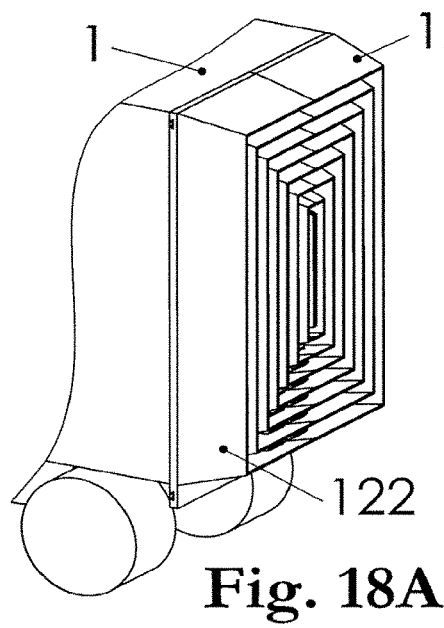
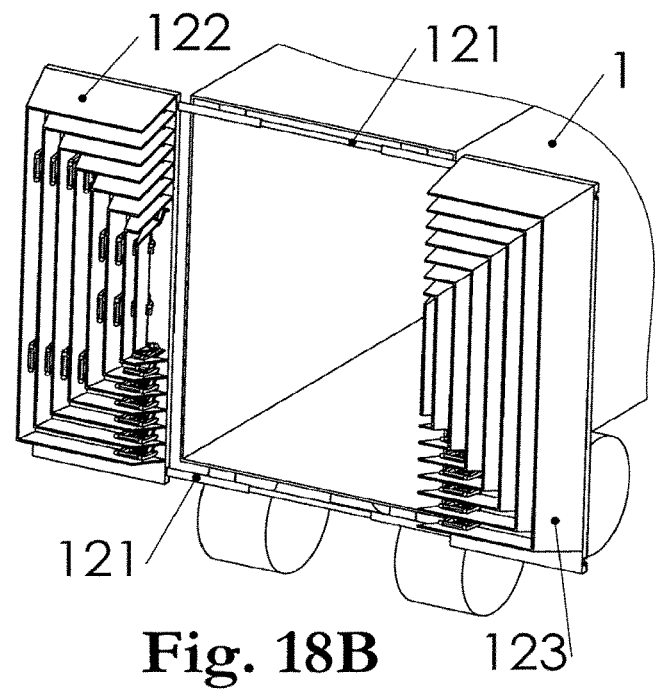
Fig. 18A  Fig. 18B

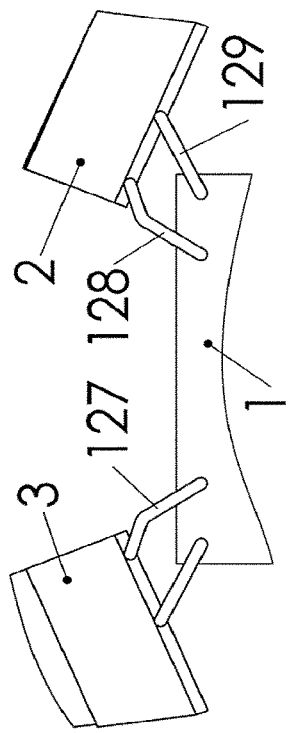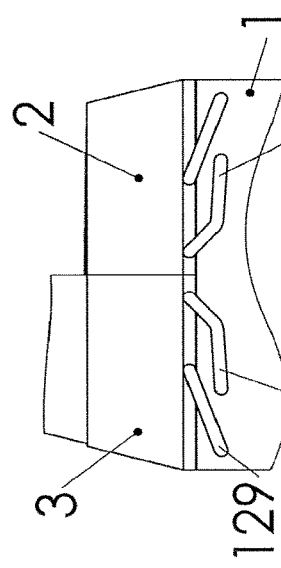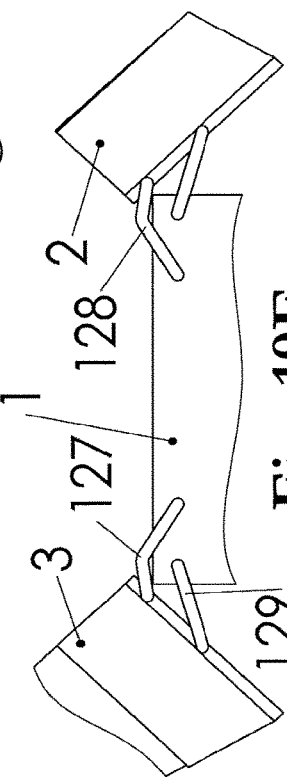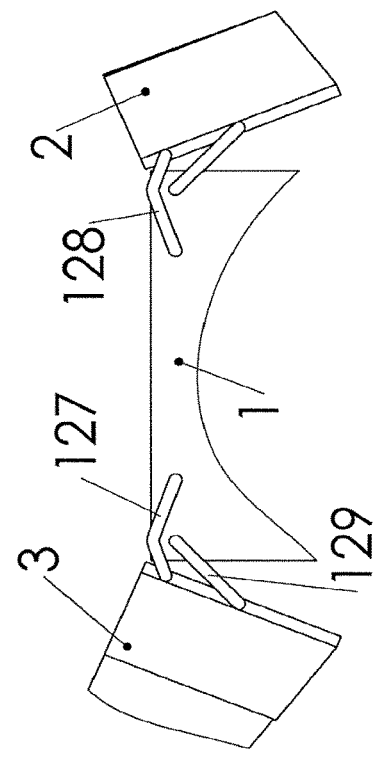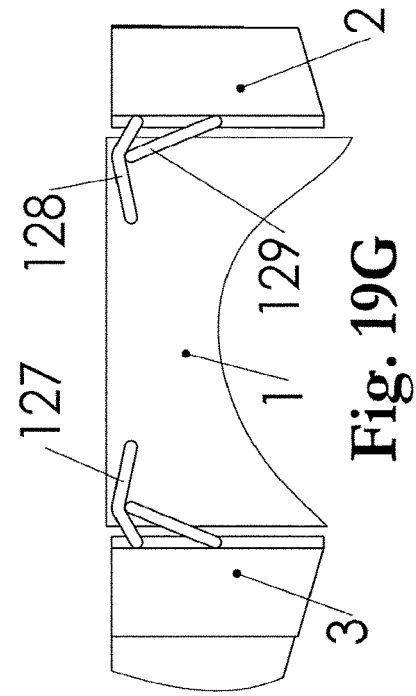

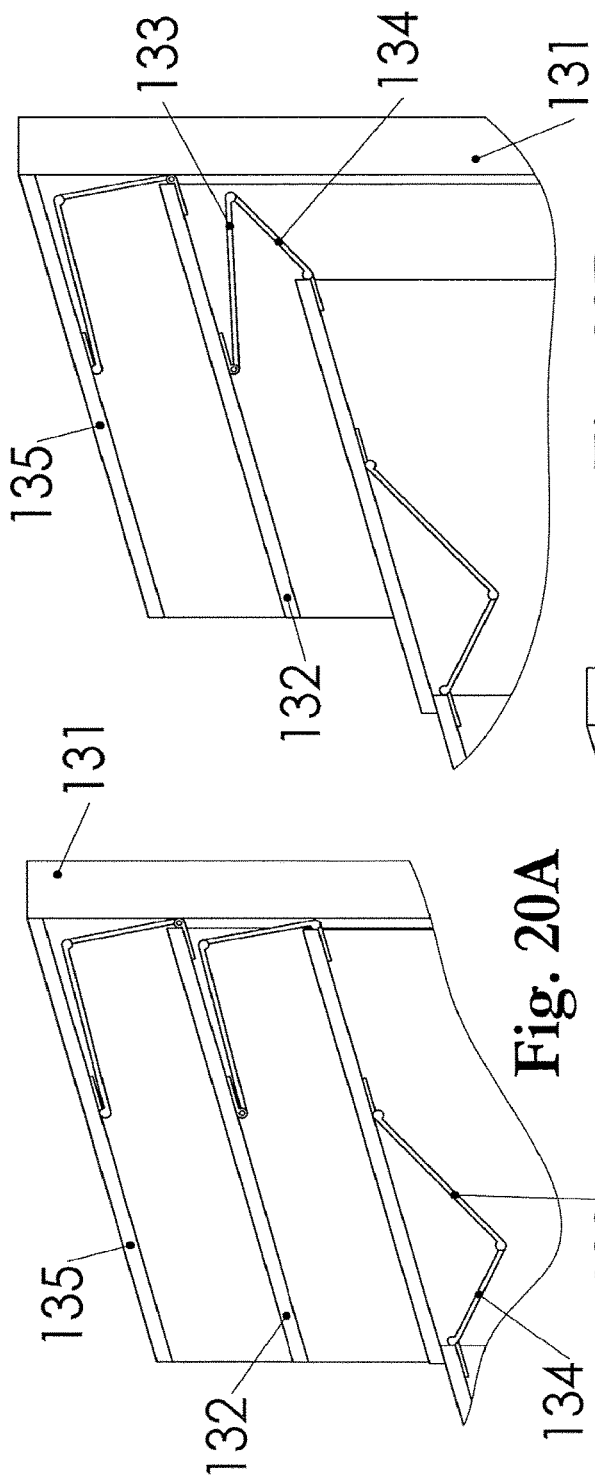

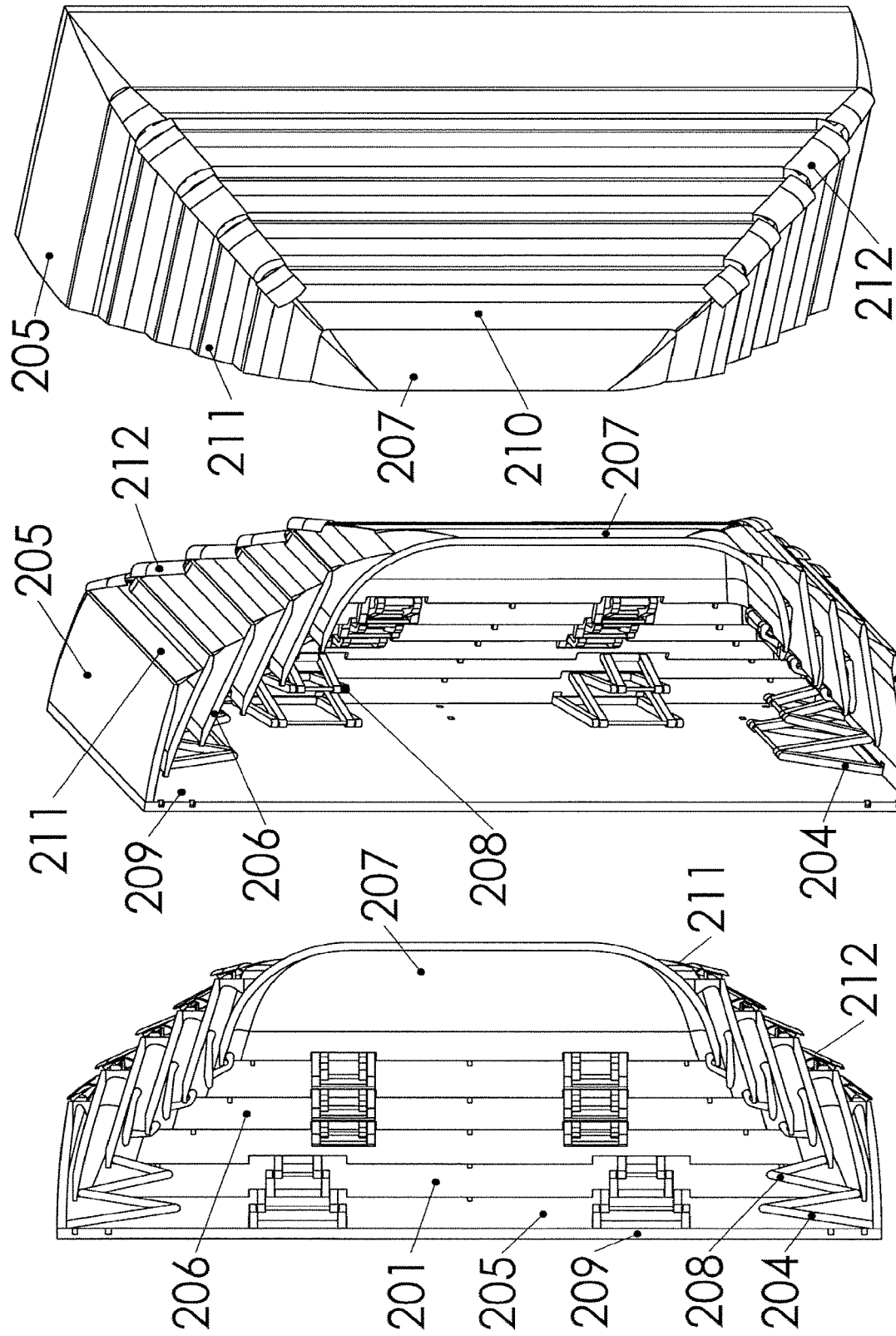

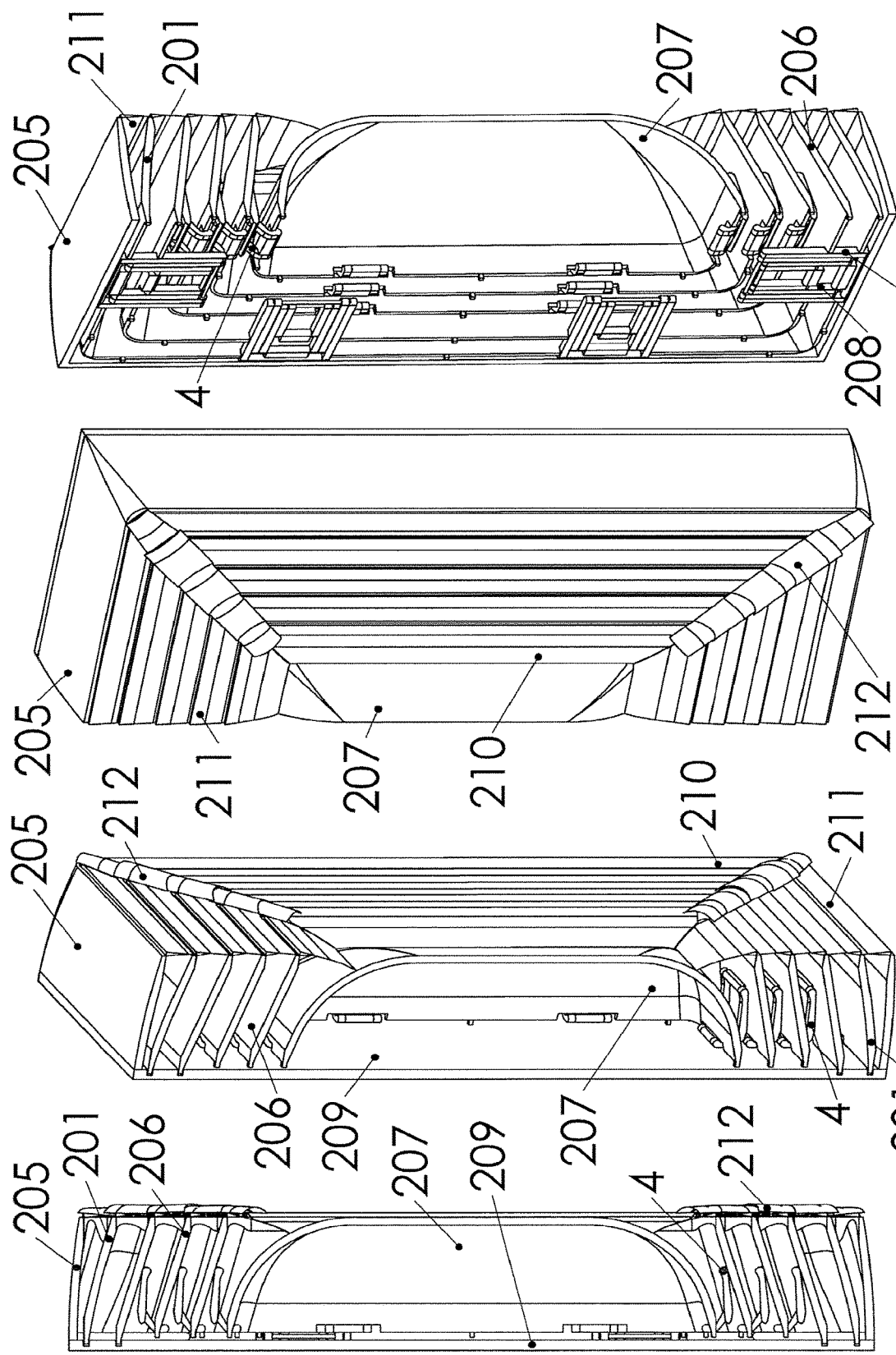

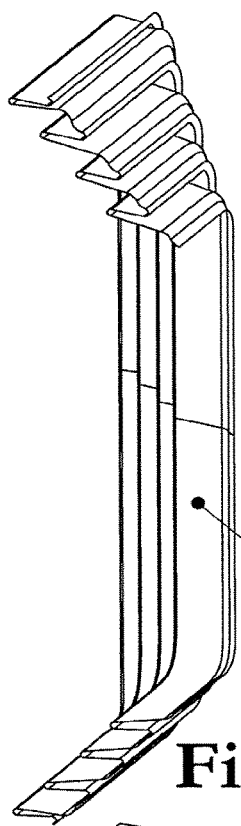
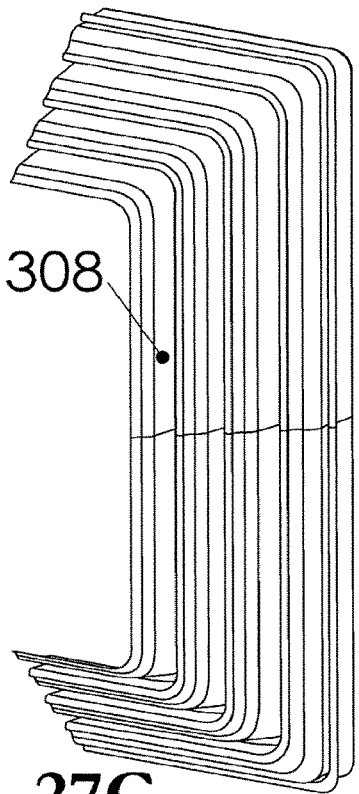
Fig. 27A  Fig. 27B  Fig. 27C
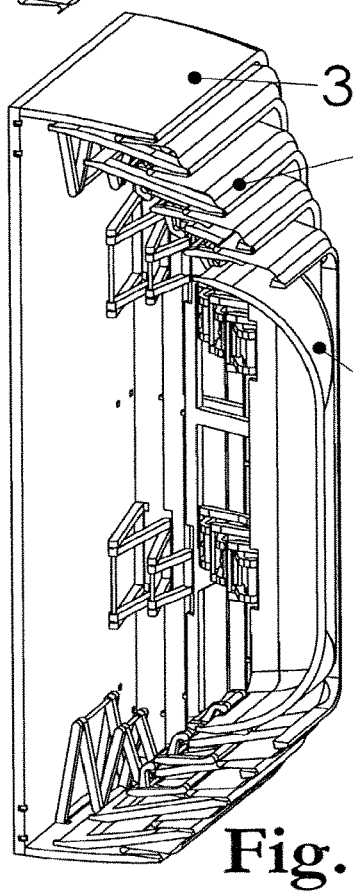
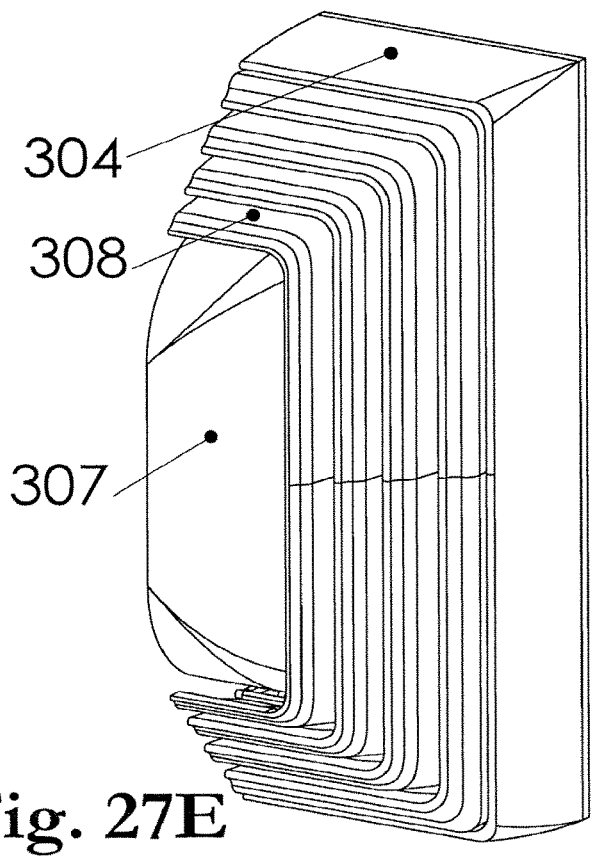
Fig. 27D  Fig. 27E

AERODYNAMIC DRAG REDUCING APPARATUS

This application is a continuation of U.S. patent application Ser. No. 15/810,646, filed Nov. 13, 2017, which is a continuation of U.S. patent application Ser. No. 15/230,604, filed Aug. 8, 2016, now U.S. Pat. No. 9,815,507, which is a continuation of U.S. patent application Ser. No. 14/147,856, filed Jan. 6, 2014, now abandoned, which is a continuation of U.S. patent application Ser. No. 13/306,706, filed Nov. 29, 2011, now U.S. Pat. No. 8,622,461, which is a continuation of U.S. patent application Ser. No. 12/872,133, filed Aug. 31, 2010, now abandoned, which is a continuation of U.S. patent application Ser. No. 12/132,585, filed Jun. 3, 2008, now U.S. Pat. No. 7,784,854, which is a continuation of U.S. patent application Ser. No. 11/425,854, filed Jun. 22, 2006, now U.S. Pat. No. 7,380,868, which claims the benefit of U.S. Provisional Patent Application Ser. No. 60/705,029, filed Aug. 3, 2005, U.S. Provisional Patent Application Ser. No. 60/705,026, filed Aug. 2, 2005, and U.S. Provisional Patent Application Ser. No. 60/694,865, filed Jun. 29, 2005, U.S. Provisional Patent Application Ser. No. 60/705,026, filed Aug. 2, 2005, and U.S. Provisional Patent Application Ser. No. 60/705,029, filed Aug. 3, 2005, which applications are hereby incorporated by reference in their entireties.

FIELD OF THE INVENTION

The present invention relates to an aerodynamic drag reducing apparatus for use with vehicles having downstream surfaces that are not streamlined. Examples include: over-the-road trucks and truck trailers, vans and minivans, motor homes and travel trailers, and pickup trucks. In vehicles such as pickup trucks, one non-streamlined surface is near the center of the vehicle. The present invention is suitable for use with vehicles having rear doors.

BACKGROUND OF THE INVENTION

It is known that a significant amount of aerodynamic drag is created when a vehicle travels at typical velocities on a modern roadway. This is partly due to areas of low pressure that act on the rear surfaces of the vehicle. The low pressure becomes more pronounced as airflow over the vehicle separates from the vehicle surfaces. The phenomenon of airflow separation is also well known in the design of aircraft wings and, in this case, causes the wing to stall.

Vehicles with blunt rear ends are especially affected by airflow separation, often starting at the abrupt transition to the rear—near vertical surface. The low pressure that the airflow separation causes is compounded by the relatively large area that the low pressure acts over as compared with more streamlined vehicles.

The low air pressure acting on the rear surfaces of a moving vehicle produces a force that resists the forward motion of the vehicle. This force is opposed by the vehicle's engine and requires power that is typically produced by burning fuel. Any reduction in aerodynamic drag results in a reduction in fuel consumption.

In a period of high fuel prices, increasing fuel efficiency is a growing concern. Aerodynamic improvements are especially valuable since they can be combined with other improvements such as engine efficiency and reduced chassis weight. Increasing fuel efficiency also provides the valuable benefit of increasing the range a given vehicle can travel between refueling.

The present invention uses the technique of tapering the rear surfaces of a vehicle. The same technique is in use with other vehicles such as streamlined cars and airplanes. It has also been applied to over-the-road trucks where it is known as a "boat-tail".

BRIEF SUMMARY OF THE INVENTION

The present invention is concerned with providing an aerodynamic drag reducing apparatus, which reduces energy consumption as described above. More specifically, this is achieved by adding gently sloping surfaces downstream of rear facing surfaces of the vehicle with the goal of keeping the airflow attached. Keeping the airflow attached results in less aerodynamic drag and reduced fuel consumption.

On certain vehicles, simply adding the required additional surfaces would result in a substantial increase to the vehicle length. This length would be acceptable in many cases on the open road in uncongested traffic, but would be impractical in crowded urban roadways, parking lots, campgrounds, and loading docks. To address this, the present invention has two primary configurations. The first is an extended configuration that reduces drag and fuel consumption, especially at highway speeds. The second is a retracted configuration that provides much less, if any, drag reduction, but results in a vehicle that is practical in crowded areas. This combination of configurations in the same apparatus is especially useful since zones of higher speed driving are often not congested. These high-speed zones are also where the drag reducing potential is the highest. Likewise, congested areas often have reduced speed with less drag reducing potential, but in these cases, the retracted configuration may be required for maneuvering in traffic.

In order to easily and conveniently convert between the retracted configuration and the extended configuration, the present invention employs shapes that nest. The largest such shape is either attached or closest to the vehicle when the apparatus is in the extended configuration. The shapes gradually become smaller as their position in the extended configuration is farther from the vehicle. When extended, the collection of shapes either forms an enclosed or mostly enclosed volume or provides a framework that can be covered by a fabric. In the latter case, the combination of framework and fabric forms an enclosed or mostly enclosed volume.

A further objective of the present invention is to provide a mechanism to support the nested shapes while they are retracted, extended, and in any transitional position. If fabric is used, it is also supported by the mechanism. This mechanism is comprised of a series of linkages between successive nested shapes. In certain forms of the invention, the linkages are spring-loaded which results in two stable configurations—fully extended and fully retracted. This feature aids in keeping the apparatus in one of the two desired configurations. There are also features in the apparatus that prevent the various parts from reaching an undesired configuration, such as over-extension.

An optional feature of the present invention provides a method of motorizing the extension and retraction. This allows for the remote extension and retraction of the apparatus for convenience.

Another optional feature is covers that keep elements such as mud, snow, and ice from reaching and collecting on interior surfaces and parts of the apparatus.

To accommodate vehicles with rear doors, an optional feature of the present invention is to have the overall aerodynamic shape split into two halves. These halves can be opened, providing access to the rear doors of the vehicle. This optional feature requires a support panel or framework that holds the first nested shape and any optional motorized extension and retraction mechanism. The support panel is mounted on a hinge, linkage, or linear slide. The framework can be moved away from the rear door(s) of the vehicle to allow access. Alternatively, the rear door of the vehicle itself may be incorporated in the apparatus by serving as the support panel. An alternative to having the apparatus in two halves would be to have a single whole apparatus mounted on a support panel, door, or framework that is mounted on a hinge, linkage, or linear slide. In this case, the whole apparatus would be moved away from the rear door(s) of the vehicle.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1A is a perspective view from the left rear corner. The configuration shown is fully extended with trailer doors closed.

FIG. 1B is a perspective view from the left rear corner. The configuration shown is fully retracted with trailer doors closed.

FIG. 1C is a perspective view from the left rear corner. The configuration shown is fully retracted on the left half and fully extended on the right with both trailer doors closed.

FIG. 1D is a partial perspective view from the right rear corner. The configuration shown is fully retracted on the left half and fully extended on the right with both trailer doors opened.

FIG. 1E is a partial perspective view from the left rear corner. The configuration shown is fully retracted on the left half and fully extended on the right with both trailer doors opened.

FIG. 1G is a partial perspective view from the left rear corner of the same basic form mounted on the rear of an over-the-road trailer. The configuration shown has both halves partially extended with the right trailer door closed and the left trailer door open.

FIG. 1H is a perspective view showing the right apparatus partially extended.

FIG. 1I is a perspective view showing the right apparatus fully extended.

FIGS. 2A through 2H show the linkage assembly and components. The linkage assemblies are used to hold the panel assemblies in place. In particular:

FIG. 2A is a perspective view showing the linkage assembly in its fully extended position.

FIG. 2B is a second perspective view showing the linkage assembly in its fully extended position.

FIG. 2C is a cross section of the linkage assembly showing the linkage assembly fully extended. The section cut is perpendicular to the linkage rotation axis and is shown in FIG. 2X.

FIG. 2D is a perspective view showing the linkage assembly in a collapsed position.

FIG. 2E is a cross section of the linkage assembly showing the linkage assembly in a collapsed position. The section cut is perpendicular to the linkage rotation axis and is shown in FIG. 2X.

FIG. 2F is a perspective view showing the torsion spring component. The spring, as installed, tends to move the linkage to a fully extended configuration.

FIG. 2G is a perspective view showing the linkage component that mounts toward the interior of a panel assembly.

FIG. 2H is a perspective view showing the linkage component that mounts toward the upstream edge of a panel assembly.

FIGS. 3A through 3F show several variations of the basic panel assembly and their features. These panel assembly variations are used together to form the basic apparatus. Each of the panel assemblies has provisions to mount several of the extension-retraction linkages mentioned above and are referred to as "linkage assemblies" when discussed below. These panels, in fact, become part of that linkage chain in the overall apparatus. When relative placements are discussed below, they are in reference to the placements in a fully extended apparatus. In the form shown in these figures, the panel assemblies each have provisions to guide an extension-retraction web. The web exerts forces on the guides that cause the apparatus to extend and retract. In particular:

FIG. 3A is a perspective view showing the panel assembly farthest upstream. This panel assembly typically does not move during the extension and retraction of the apparatus. This panel assembly could be fixedly mounted on the support panel or mounting framework. It has provisions to rotatably mount several linkage assemblies, which hold the next panel assembly immediately downstream.

FIG. 3B is a perspective view showing a typical panel assembly representative of all panel assemblies in the basic apparatus with the exception of the farthest upstream and farthest downstream panel assemblies. These panel assemblies have provisions to rotatably mount two sets containing several linkage assemblies each. The first set is mounted toward the upstream edge of the panel assembly and is used to hold the linkage assembly that is also connected to the panel assembly immediately upstream. The second set is mounted in the interior of the panel assembly and is used to hold the linkage assembly that is also connected to the panel assembly immediately downstream. In this particular view, the two sets of mounts are at the same elevation. In the form shown, the panel assembly has notches to allow the upstream linkage assemblies to swing through their required range of motion. The notches, as shown here, are not visible from the exterior of the apparatus when it is fully deployed.

FIG. 3C is a perspective view showing a variation of the typical panel assembly discussed in the preceding paragraph. The variation illustrated locates the upstream and downstream linkage mounts at different rather than the same elevation.

FIG. 3D is a perspective view showing the panel assembly farthest downstream. It has provisions to rotatably mount several linkage assemblies. Each of these linkage assemblies also attach to the panel assembly immediately upstream. In the form shown, this panel has an extension-retraction, web-guiding feature in addition to two web mounting features. The first web-mounting feature holds the end of the web closest to the web guiding features in the panel assemblies. The second web-mounting feature holds the end of the web closest to the extension-retraction actuation motor. In the form shown, this panel assembly has notches to allow the linkage assemblies to swing through their required range of motion.

FIG. 3E is an enlarged partial perspective view of a typical panel assembly showing the pivoting linkage mounting surfaces and notches mentioned above.

FIG. 3F is an enlarged partial section view of a typical panel assembly showing the linkage mounts, notches, and web guides mentioned above. The section cut is through the vertical center of the panel assembly and is shown in FIG. 3X.

FIGS. 4A through 4C show the extension-retraction web, its routing, related hardware, and attachment points. In particular:

FIG. 4A is a partial perspective view showing the web, the extension-retraction drive motor and pulley, the web corner pulley, and web-to-panel attachment points. The method of retracting the apparatus simply involves shortening the length of the longest straight section of web that attaches farthest downstream on the farthest downstream panel assembly.

FIG. 4B is a section view of a typical basic partially extended apparatus showing different configurations of link assemblies, the extension-retraction web routing, the web attachment points and web pulleys. It also shows a linkage extending past the usual boundary of the apparatus half. The section cut is through the vertical center of a typical apparatus and is shown in FIG. 4X.

FIG. 4C is a reduced scale version of FIG. 4B showing only the web and the centers of the web pulleys and centers of the panel web guides. The section cut is through the vertical center of a typical apparatus and is shown in FIG. 4X.

FIGS. 6A and 6B illustrate the methods used to keep the various linkage assemblies from interfering with each other when transitioning between the extended and retracted configurations. In particular:

FIG. 6A is a perspective view showing the smallest, most crowded two sets of panel assemblies, located farthest downstream and illustrates that staggering the elevation of the linkage assemblies lets each pass through the center plane without interfering with the opposing linkage assembly. It also shows that interference can be avoided by placing links that run in a horizontal plane lower than the operating range of links that run in a vertical plane.

FIG. 6B is a partial perspective view showing two sets of adjacent panel assemblies and illustrates that interference can be avoided by placing links that run in a vertical plane farther inboard than the operating range of links that run in a horizontal plane.

FIGS. 7A and 7B show a basic form of the present invention with the addition of vortex generators. In particular:

FIG. 7A is a partial perspective view showing a typical panel assembly with vortex generators attached.

FIG. 7B is a partial perspective view of fully extended right and left hand apparatuses with vortex generators attached. The apparatuses are mounted on an over-the-road trailer. The view is from the right rear corner of the trailer.

FIG. 8A is a perspective view from the left rear corner. The configuration shown is fully extended with trailer doors closed.

FIG. 8B is a perspective view from the left rear corner. The configuration shown is fully retracted with trailer doors closed.

FIG. 8C is a perspective view from the left rear corner. The configuration shown has the left apparatus fully retracted and right apparatus fully extended and both trailer doors open.

FIG. 8D is a perspective view showing the right rear underside corner of the trailer. The configuration shown has the left apparatus fully retracted and right apparatus fully extended and both trailer doors open.

FIG. 9A is a perspective view from the left rear corner. The configuration shown is fully extended with trailer doors closed.

FIG. 9B is a perspective view from the left rear corner. The configuration shown is fully retracted with trailer doors closed.

FIG. 9C is a perspective view from the left rear corner. The configuration shown has the left apparatus fully retracted and the right apparatus fully extended and both trailer doors closed.

FIG. 9D is a perspective view showing the right rear corner. The configuration shown has the left apparatus fully retracted and right apparatus fully extended and both trailer doors open.

FIGS. 10A through 10E show a form of the present invention with linear sliding joints forming a connection between neighboring panel assemblies on the right and left lower horizontal panels. Linkage assemblies as described above connect the right and left upper sloping panels and both vertical panels. In this form, the aerodynamic drag reducing apparatus is in two halves, split right and left. The right and left halves are shown mounted to the rear of an over-the-road trailer in various configurations. The right and left halves can be opened for access to the rear of the trailer. The extension-retraction web and its related features are not shown, but could be included as described above. In particular:

FIG. 10A is a perspective view from the left rear corner. The configuration shown is fully extended with trailer doors closed.

FIG. 10B is a perspective view from the left rear corner. The configuration shown is fully retracted with trailer doors closed.

FIG. 10C is a perspective view from the left rear corner. The configuration shown has the left apparatus fully retracted and right apparatus fully extended and both trailer doors closed.

FIG. 10D is a perspective view showing the right rear corner. The configuration shown has the left apparatus fully retracted and right apparatus fully extended and both trailer doors open.

FIG. 10E is an enlarged partial perspective view from the left rear corner. The configuration shown has the left apparatus fully retracted and right apparatus fully extended and both trailer doors closed. The details of the linear sliding joints are visible.

FIG. 10F is an enlarged partial rear elevation view on a typical panel assembly used in the preceding paragraphs. The details of the separate halves of the linear joint are visible.

FIG. 10G is an enlarged partial perspective view of the left half of the above apparatus. The view is from the rear underside slightly left of center. The details of the linear sliding joints are visible.

FIG. 11A shows both halves fully extended.

FIG. 11B shows both halves fully retracted.

FIG. 11C shows the left apparatus fully retracted and right apparatus fully extended.

FIG. 12A is a perspective view from the left rear corner. The configuration shown is fully extended.

FIG. 12B is a perspective view from the left rear corner. The configuration shown is fully retracted.

FIG. 12C is a rear elevation view. The configuration shown is fully extended. This figure illustrates that the surfaces of the panel assemblies do not need to be perpendicular or parallel to each other.

FIG. 12D is a perspective view showing the interior of the apparatus in a fully extended configuration. The linkage assemblies shown in this form are optional and serve the purpose of driving each adjacent pair of panels into either the retracted or extended configuration as mentioned above in the discussion on FIG. 5. The linkage assembly also forms a travel-stop preventing over extension and over retraction. A pair of linkage assemblies and a connection between them also coordinates the movement between the right and left sides and reduces the chance of binding.

FIG. 12E is an enlarged partial front elevation view showing about half of the aerodynamic drag reducing apparatus. The half shown here is mirrored somewhere near the cutting curve. This view together with FIG. 12C illustrates that linear sliding surfaces between adjacent panel assemblies can be implemented on more than one side of such an apparatus.

FIG. 12G shows the panel assembly mounted farthest upstream. It shows linkage attachment points and linear sliding joints.

FIG. 12H shows a typical panel assembly—a plurality of which are used in different sizes between the panel assemblies farthest upstream and farthest downstream. It shows linkage attachment points, linear sliding joints, and notches. The notches allow the linkage assemblies to move through their range of motion. The notches, as shown here, are not visible from the exterior of the apparatus when it is fully deployed.

FIG. 12I shows the panel assembly mounted farthest downstream. It shows linkage attachment points, linear sliding joints, and notches. The purpose of the notches is the same as discussed in the preceding paragraph.

FIGS. 13B and 13C are perspective views from the left rear corner of the tanker trailer. In particular:

FIG. 13B shows the apparatus fully extended.

FIG. 13C shows the apparatus fully retracted.

FIGS. 13D through 13F are partial section views. The views' section cut is taken through the vertical and longitudinal plane of symmetry of the tanker trailer. The section cut is shown in FIG. 13X. In particular:

FIG. 13D shows the apparatus fully extended.

FIG. 13E shows the apparatus fully retracted.

FIG. 13F shows the apparatus partially extended.

FIG. 13G shows the apparatus in a fully extended configuration.

FIG. 13H shows the panel assembly farthest downstream. Also shown are the linkage attachment points and linkage clearance notches.

FIG. 13I shows a typical panel assembly—a plurality of which are used in different sizes between the panel assemblies farthest upstream and farthest downstream. It shows linkage attachment points, notches, and grooves. The notches allow the linkage assemblies to move through their range of motion. The notches, as shown here, are not visible from the exterior of the apparatus when it is fully deployed. In addition to the notches going through the panel on its upstream edge, shallow grooves are shown on the interior surfaces. These shallow grooves allow space for the linkage assemblies to occupy when the apparatus is in its retracted configuration.

FIG. 13J shows the apparatus in a fully retracted configuration.

FIGS. 14A through 14K and FIG. 14X show a variation of the basic form of the present invention. When relative placements are discussed below, they are in reference to the placements in a fully extended apparatus. The present variation incorporates a smooth transition across the apparatus and the vehicle or trailer. The smooth transition, as shown in these figures, is formed into the panel assembly farthest upstream. The components and their functions are similar or identical to the basic form as shown in FIGS. 1A through 1I, FIGS. 3A through 3F, FIG. 5, and FIGS. 6A and 6B. As in the basic form, the aerodynamic drag reducing apparatus is in two halves, split right and left. The right and left halves are opened for access to the rear of the trailer. The slight changes required by this variation are further described below. In particular:

FIGS. 14A through 14C show a variation of the basic form of the present invention mounted on the rear of an over-the-road trailer in two configurations. In particular:

FIG. 14A is a partial perspective view from the left rear corner. The configuration shown is fully extended with trailer doors closed.

FIG. 14B is a partial perspective view from the left rear corner. The configuration shown is fully retracted with trailer doors closed.

FIG. 14C is a partial side elevation view from the left. The configuration shown is fully retracted with trailer doors closed and illustrates the smooth transition across the trailer and apparatus.

FIG. 14D is a perspective view showing the right apparatus fully retracted. It is similar to FIG. 1F with the exception of the panel assembly farthest upstream. This panel assembly has curved surfaces that are tangent to their corresponding exterior trailer surfaces.

FIG. 14E is a partial section view of a partially extended apparatus. It is similar to FIG. 4B with the exception of the panel assembly farthest upstream, a special set of more compact extension-retraction linkage assemblies, a slightly different web corner pulley location, and a slightly different apparatus extension configuration. The linkage assemblies between the panel assembly farthest upstream and the adjacent panel assembly are specially designed to fit into the more compact space available when this form of the apparatus is in the retracted configuration. The section cut is through the vertical center of the apparatus and is shown in FIG. 14X.

FIG. 14F is a perspective view showing the panel assembly farthest upstream. It is similar to the panel assembly shown in FIG. 3A with the exception of the curved surfaces.

FIG. 14G is a partial section view of a partially extended apparatus. It is similar to FIG. 14E with the exception of a different apparatus extension configuration. The more compact linkage assembly mentioned above is shown at its closest point to the second farthest upstream panel assembly. Small notches were added to this panel assembly to allow the more compact linkage assemblies to swing through their required range of motion. The small notches are not visible from the exterior of the apparatus when it is fully deployed. The section cut is through the vertical center of the apparatus and is shown in FIG. 14X.

FIG. 14H is a perspective view showing the more compact linkage assembly in its fully extended position. This linkage has the same spacing between its rotational mounts when fully extended as the less compact linkage shown in FIGS. 2A and 2B. It also has the same collapsing range. It could therefore replace the less compact linkage if small notches, as mentioned above, were added to the upstream edge of the remaining panel assemblies.

FIG. 14I is a cross section of the more compact linkage assembly showing the linkage assembly fully extended. The section cut is perpendicular to the linkage rotation axis and is similar to section cut shown in FIG. 2X.

FIG. 14J is an enlarged partial perspective view of the exterior and the upstream edge of the second farthest upstream panel assembly. The linkage pivoting surfaces near the upstream edge, the former notches, and the added shallow notches are shown.

FIG. 14K is an enlarged partial section view of a partially extended apparatus. It is similar to FIG. 14E with the exception of a different apparatus extension configuration. The more compact linkage assembly mentioned above is shown at its closest point to the farthest upstream panel assembly. This view also illustrates the extension-retraction web routing between panel assemblies. If the web were drawn tighter in the areas shown in this view, the upstream edge of the downstream panel assemblies would be drawn towards the adjacent downstream edge of the upstream panel assemblies. This would have the cumulative effect of extending the apparatus. The section cut is through the vertical center of the apparatus and is shown in FIG. 14X.

FIG. 14X is an elevation view showing the interior of the apparatus. It also shows the section cut used to create FIGS. 14E, 14G, and 14K.

FIGS. 15A through 15L show an optional configuration consisting of covers added to the basic configuration. The covers serve two purposes. The first purpose is to cover the openings that expose the interior portions of the apparatus when it is in the fully retracted configuration. This is a valuable feature in that it keeps elements such as dirt, mud, snow, and ice from reaching and accumulating in the interior of the apparatus. At a certain amount, accumulations of such elements could interfere with the proper operation of the apparatus. The second purpose served by these covers is providing a smoother transition from the edge of one panel assembly to the panel assembly immediately downstream. With the exception of these covers and their related hinge lines, the components and their functions are identical to the basic form as shown in FIGS. 1A through 1I, FIGS. 3A through 3F, FIG. 5, and FIGS. 6A and 6B. As in the basic form, the aerodynamic drag reducing apparatus is in two halves, split right and left. The right and left halves open for access to the rear of the trailer. The slight changes required by these optional doors are further described below. In particular:

FIG. 15A is a partial perspective view from the left rear corner. The configuration shown is fully extended with trailer doors closed. The optional covers are shown laying flat over the panel assembly immediately downstream.

FIG. 15B is a partial perspective view from the left rear corner. The configuration shown is fully retracted with trailer doors closed. The optional covers are shown with their interior surfaces laying near vertical and covering the opening that would otherwise be there.

FIG. 15C is a perspective view showing the right apparatus fully extended. It is identical to FIG. 1I with the exception of the covers.

FIG. 15D is an enlarged partial elevation view showing the interior of the right apparatus. This view illustrates the partial smoothing the covers provide over the joints between the panel assemblies. In the apparatus as shown, the panel assembly farthest downstream when the apparatus is fully extended is also shorter than the others in the downstream direction. This view illustrates that a smaller cover is used to cover the joint in front of the short panel.

FIG. 15E is a partial elevation showing the interior of the right apparatus in a partially extended configuration. The view shows panel assemblies that are fully extended, partially extended, and fully retracted with respect to their immediate neighbor. The view also shows the covers in contact with the panel assembly immediately downstream. This view illustrates that the covers could be actuated by a simple torsional spring along their hinge line. As the apparatus extends, the panel assemblies will push the covers into their open position. As the apparatus retracts, the torsional springs will return the covers over the openings.

FIG. 15F is a partial perspective view showing the exterior of the left apparatus. The apparatus extension configuration is the same as that shown in FIG. 15E. This view illustrates that unless fully extended or retracted, an opening remains at the exterior corners of the apparatus.

Figure 3A:
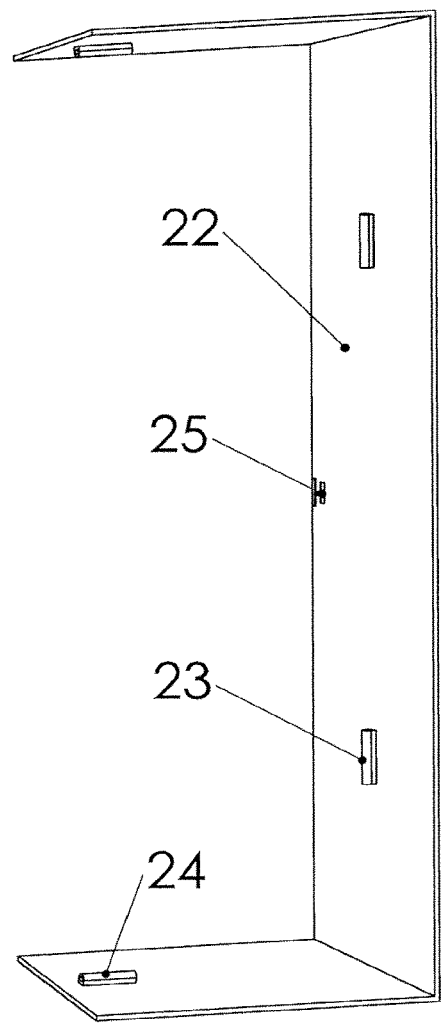
Figure 2X:
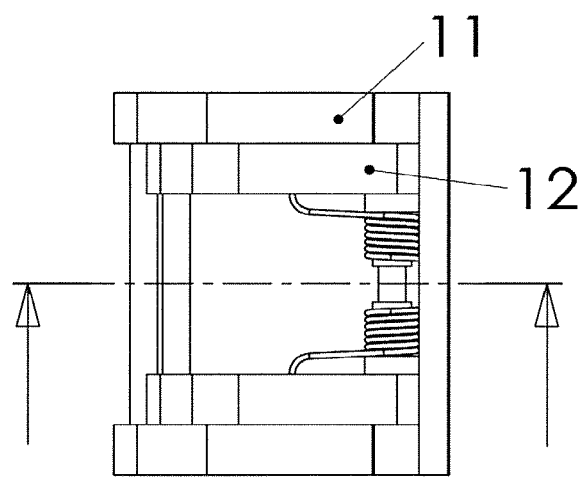
FIG. 2X is a plan view of the linkage assembly. It also shows the section cut used to create FIG. 2C and FIG. 2E.
Figure 3X:
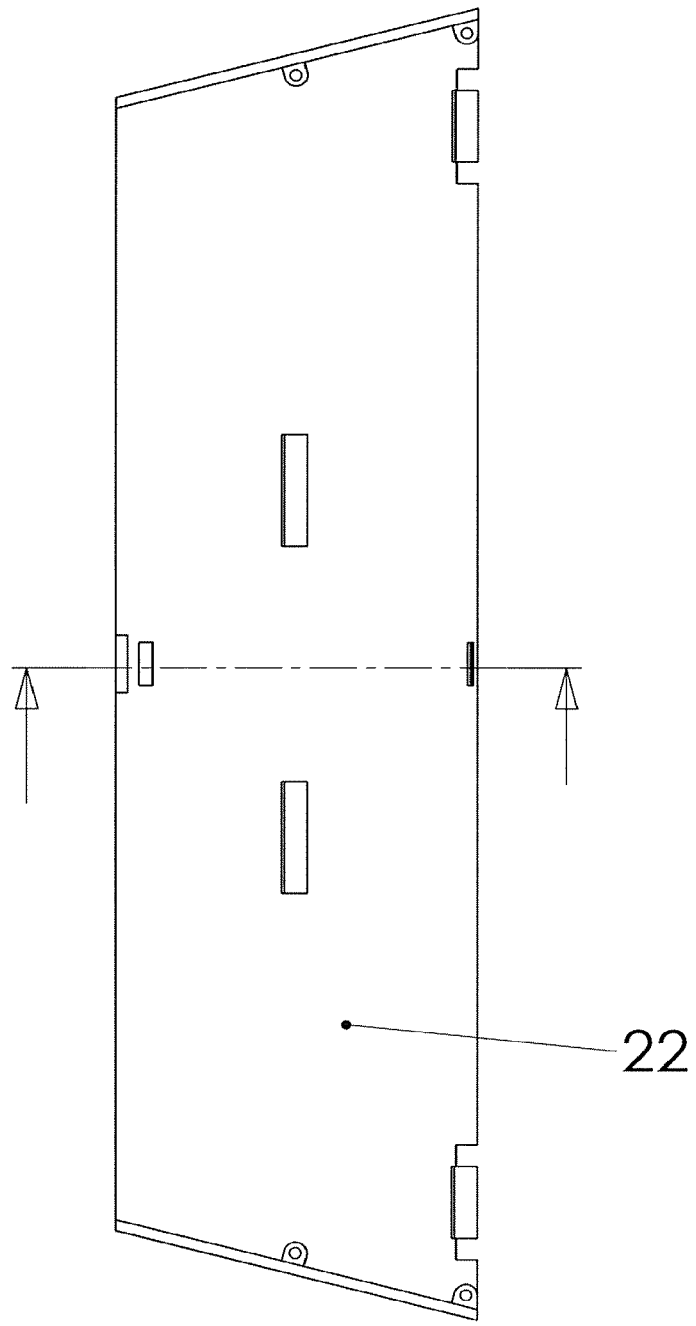
FIG. 3X is an elevation view showing the interior of a typical panel assembly. It also shows the section cut used to create FIG. 3F.
Figure 15C:
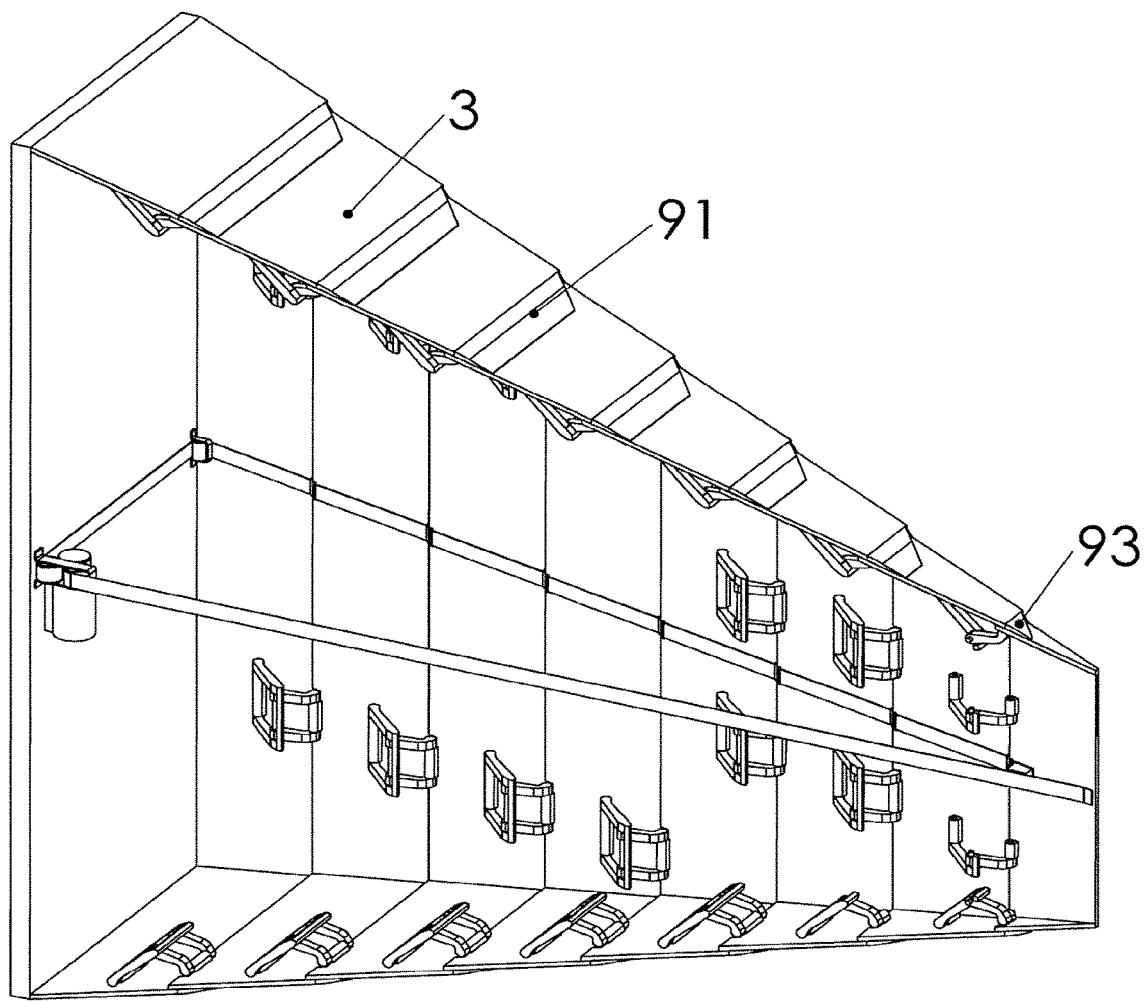
Figure 15D:
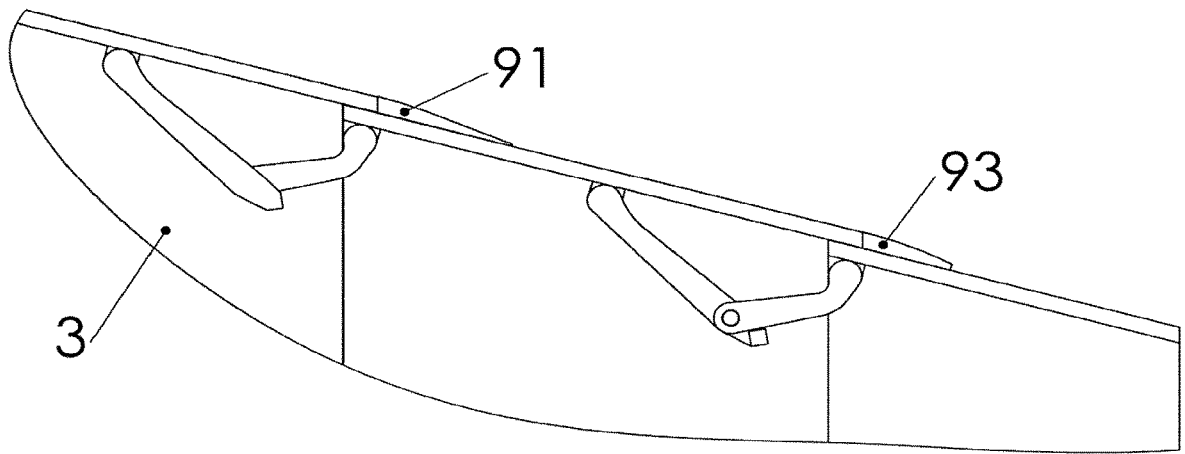
Figure 15E:
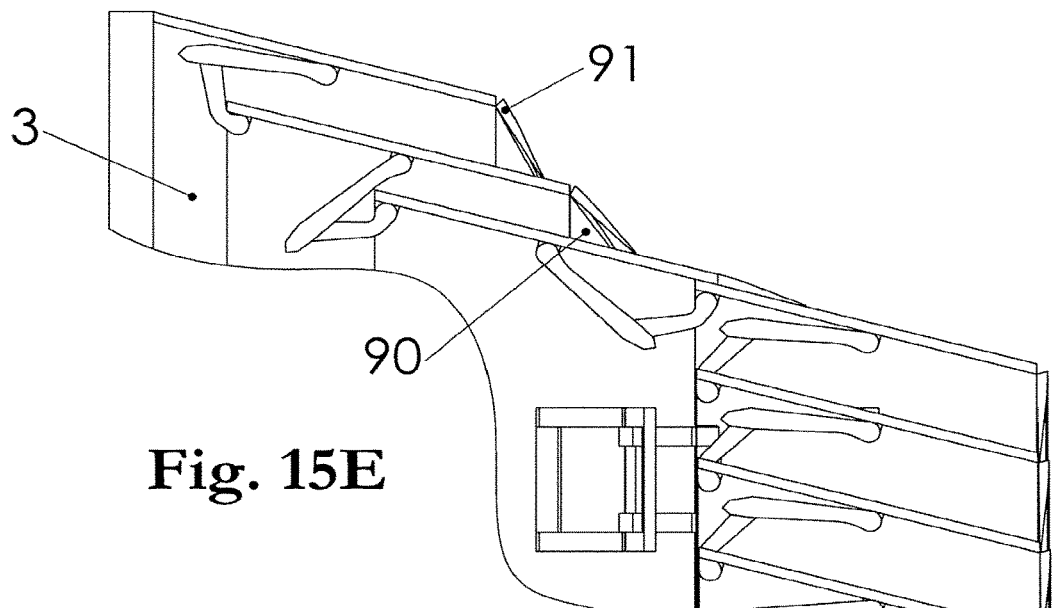
Figure 15F:
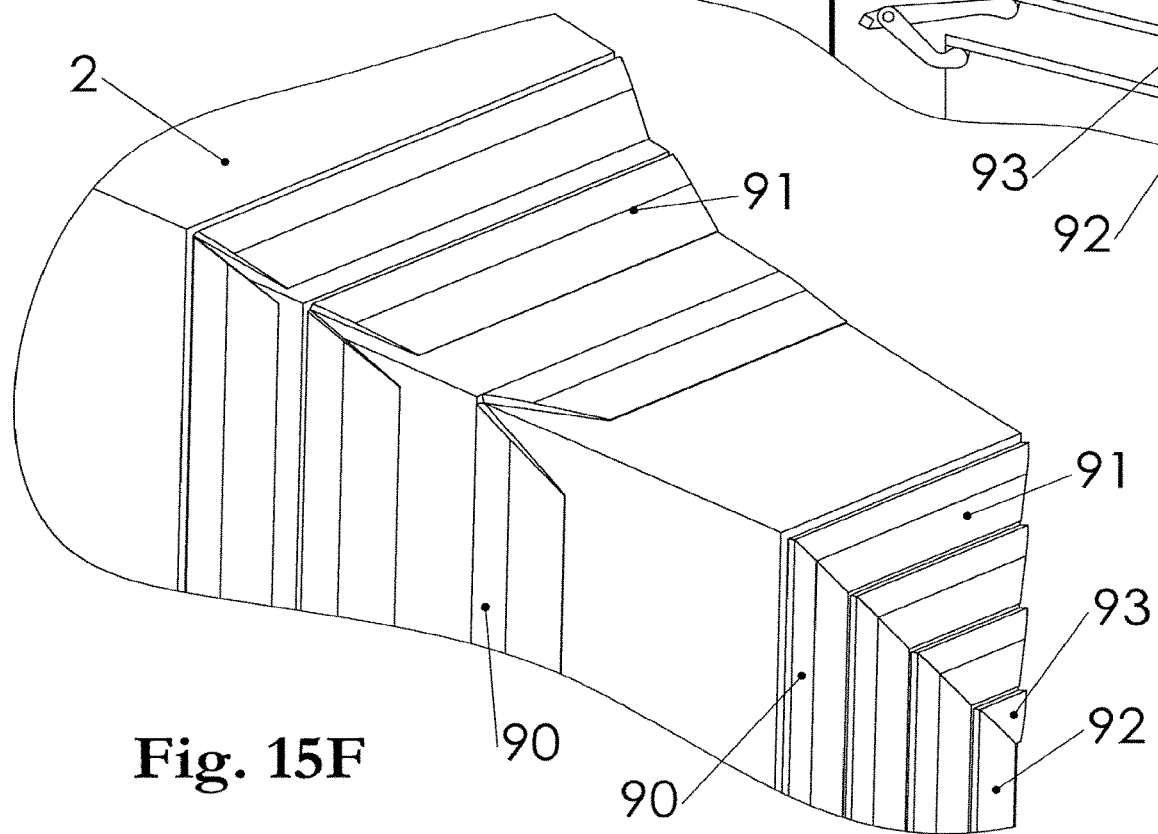
Figure 15G:
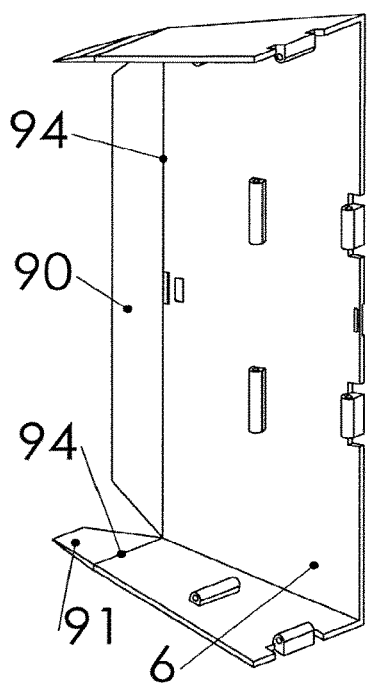
Figure 15H:
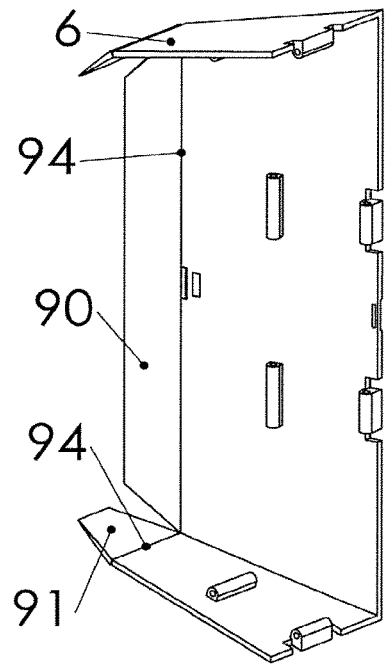
Figure 15I:
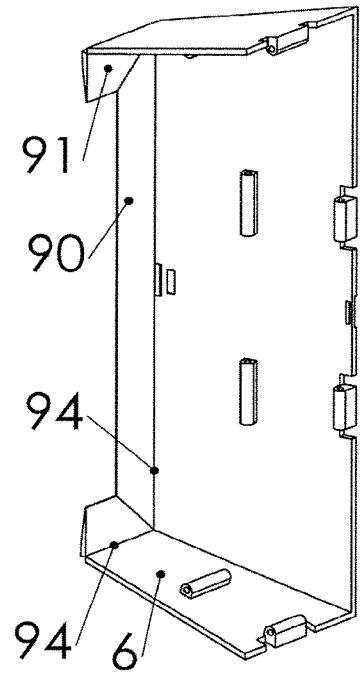

FIGS. 15G through 15I are perspective views showing the interior of a typical panel assembly with typical covers installed. With the exception of the covers and their related hinge lines, the panel assemblies have identical features and functions as those shown in FIGS. 3B and 3C. In particular:

FIG. 15G shows the covers in a configuration where the apparatus is fully extended.

FIG. 15H shows the covers in a configuration where the apparatus is partially extended.

FIG. 15I shows the covers in a configuration where the apparatus is fully retracted.

Figure 15J:
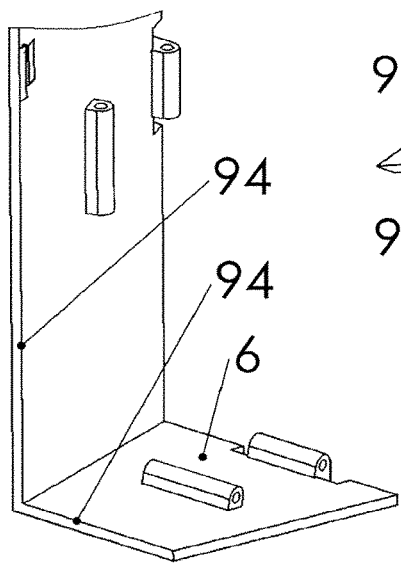

FIG. 15J is a partial perspective view showing interior surfaces of a typical panel assembly and the cover hinge lines.

Figure 15K:
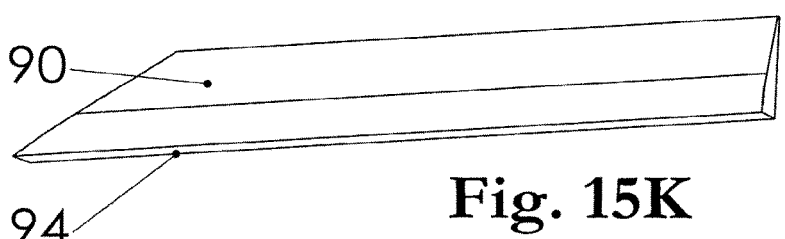

FIG. 15K is a perspective view of a cover showing the hinge line that connects it to the panel assemblies. This cover is typical of those running in a vertical direction in the form of the apparatus shown here. Both ends of this cover meet adjacent covers that have hinge lines that are not collinear with its own. The ends of this cover meet the ends of the adjacent covers only in the closed position. The ends of this cover are cut to whatever angle is needed to match the adjacent covers in the retracted configuration of the apparatus.

Figure 15L:
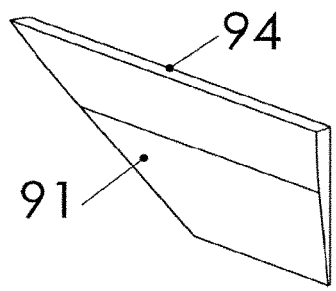

FIG. 15L is a perspective view of a cover showing the hinge line that connects it to the panel assemblies. This cover is typical of those running in a horizontal direction in the form of the apparatus shown here. One end of this cover meets another cover with a hinge line collinear to its own. This end is cut perpendicular to the hinge line. The opposite end of this cover meets another cover only in the closed position. This end of this cover is cut to whatever angle is needed to match the adjacent cover in the retracted configuration of the apparatus.

Figure 14A:
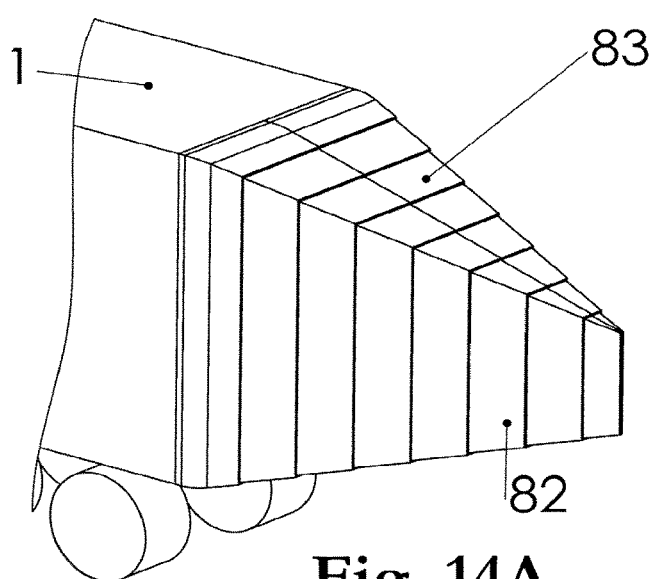
Figure 14B:
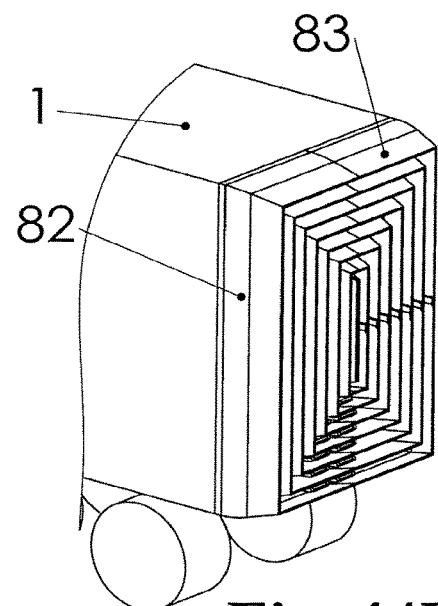
Figure 14C:
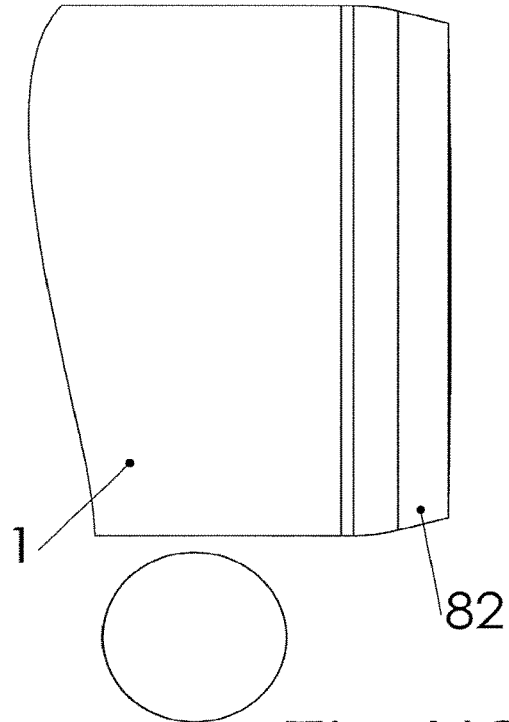
Figure 14D:
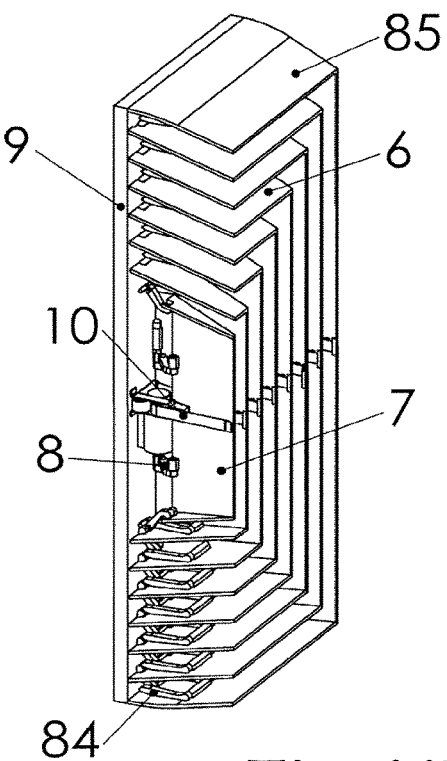
Figure 14X:
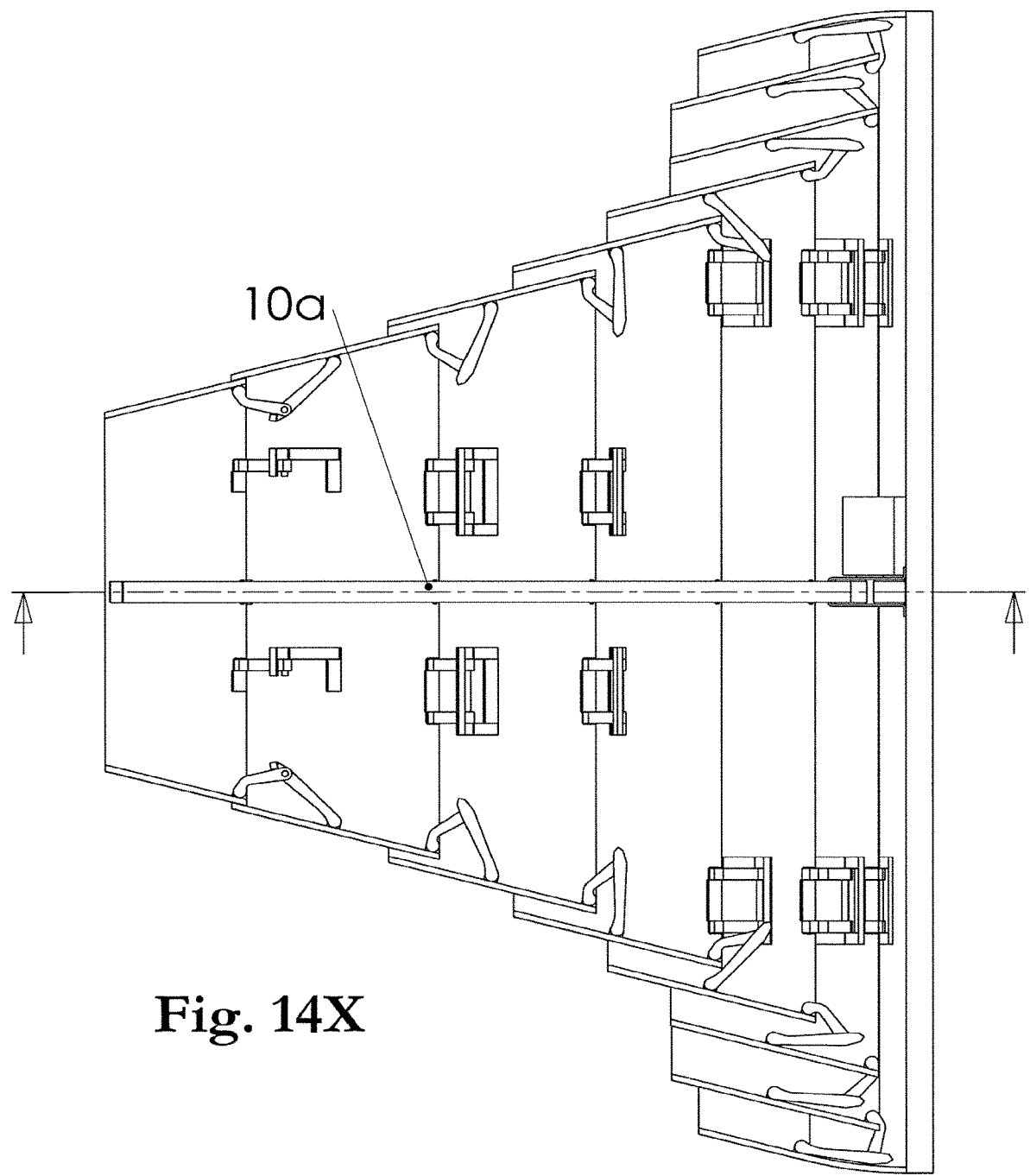
Figure 16A:
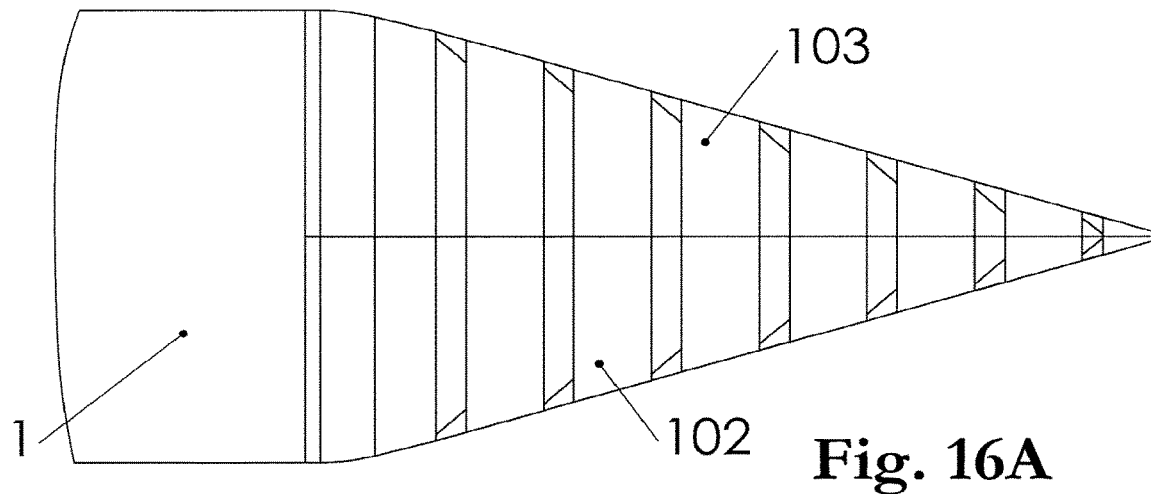
Figure 16B:
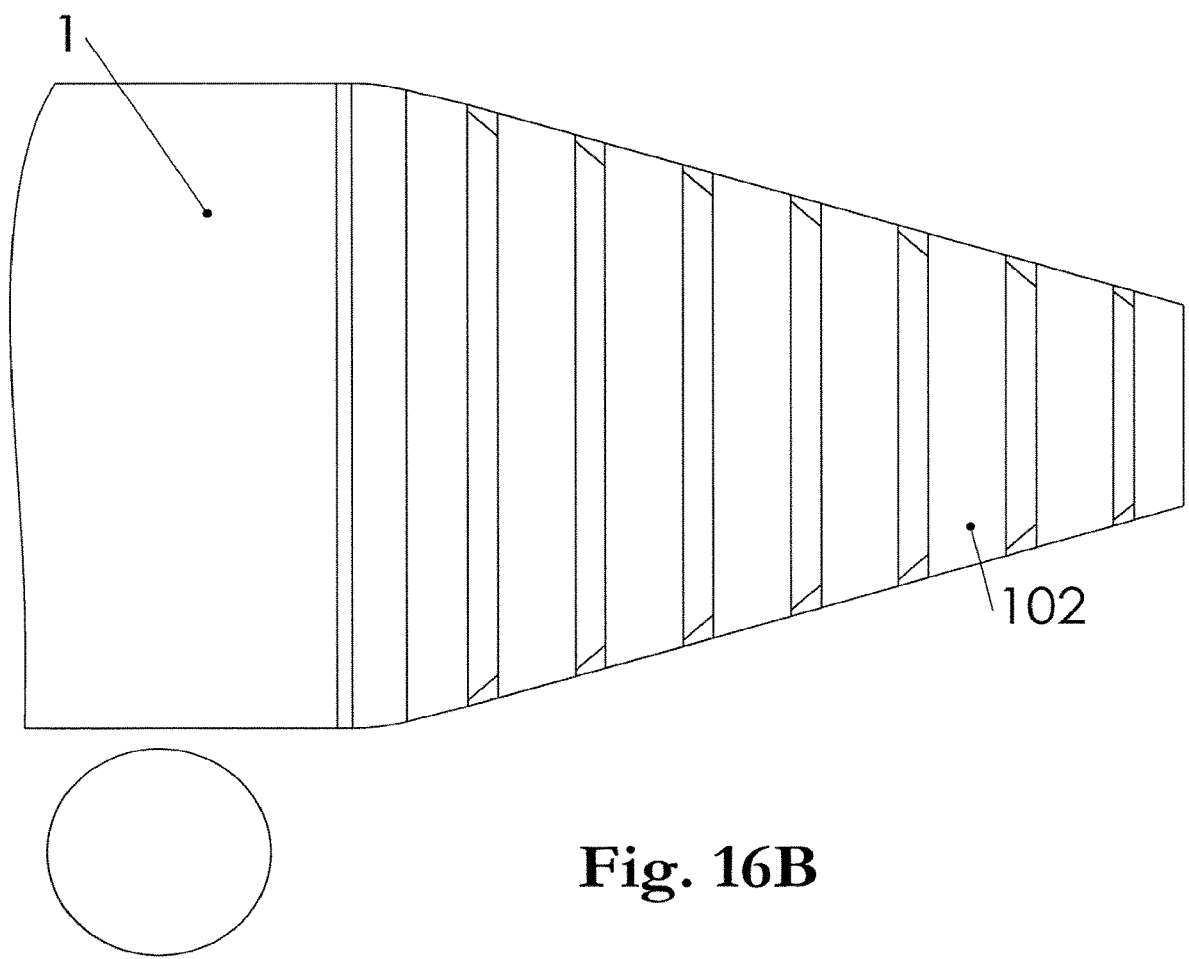
Figure 16C:
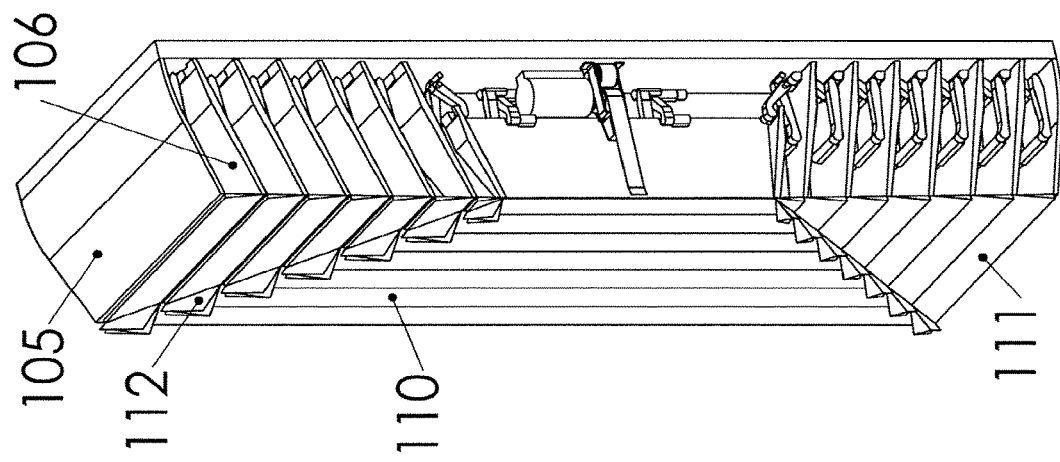

FIGS. 16A through 16Q show a form of the present invention that is completely smooth on its exterior surface when the apparatus is in the extended configuration. This form employs a panel in the farthest upstream position similar to that shown in FIGS. 14A through 14G. It likewise uses a set of compact linkage assemblies as shown in FIG. 14H. This form also uses covers similar to those shown in FIGS. 15A through 15I. In addition to these covers, corner covers are used to form completely smooth exterior corners when the apparatus is in the extended configuration. In addition to the features above, each panel assembly has an exterior surface that is shaped to blend in with the covers to form a completely smooth exterior surface when the apparatus is in the extended position. The covers with the exception of the corner covers also keep the elements from reaching the interior of the apparatus. As in the basic form, the aerodynamic drag reducing apparatus is in two halves, split right and left. The right and left halves open for access to the rear of the trailer. The modifications to the basic form required by the present form are further described below. In particular:

FIGS. 16A through 16C show the apparatus mounted on the rear of an over-the-road trailer in the fully extended configuration. In particular:

FIG. 16A is a partial top plan view illustrating completely smooth exterior sides of the apparatus.

FIG. 16B is a partial elevation view from the left illustrating the completely smooth top and bottom of the apparatus.

FIG. 16C is a partial perspective view from the left rear corner. It illustrates the completely smooth corner edges.

Figure 16D:
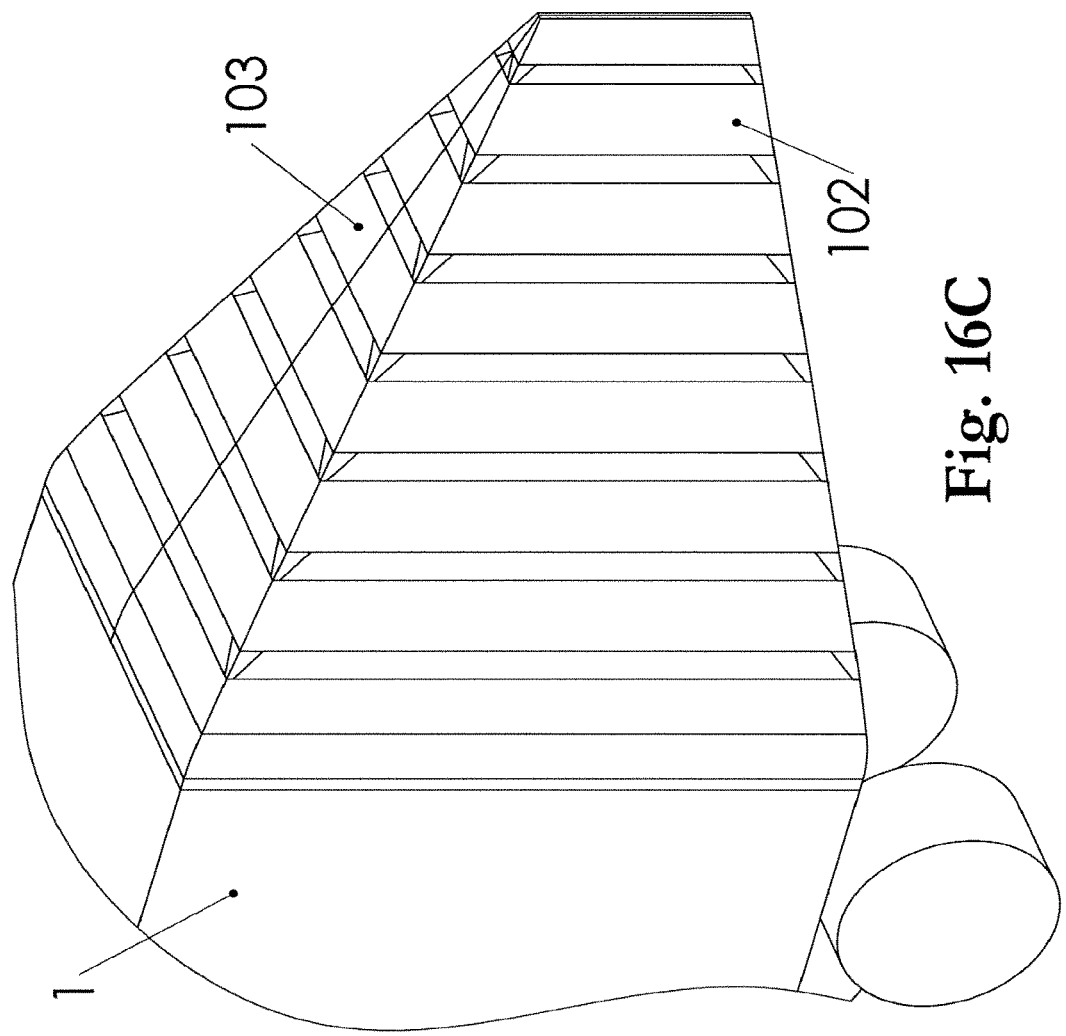

FIG. 16D is a perspective view showing the interior and rear of the left hand apparatus in a retracted configuration. The non-corner covers are shown lying with their interior surfaces on a vertical plane. The corner covers are showing protruding beyond the rest of the apparatus.

Figure 16F:
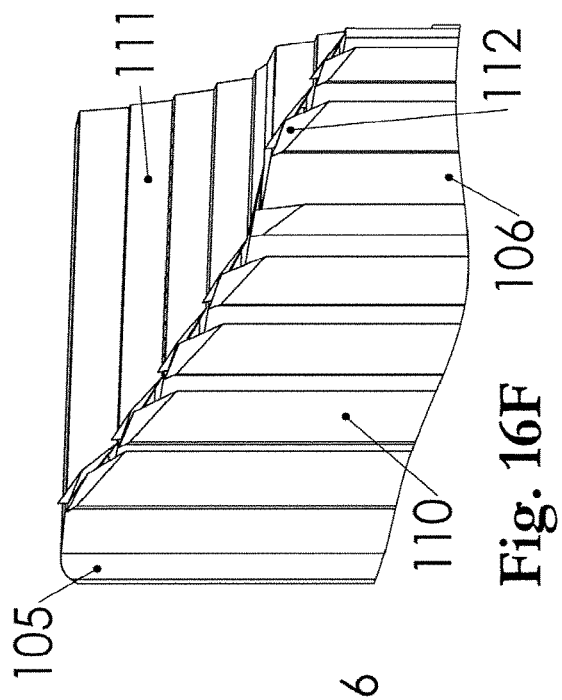
Figure 16G:
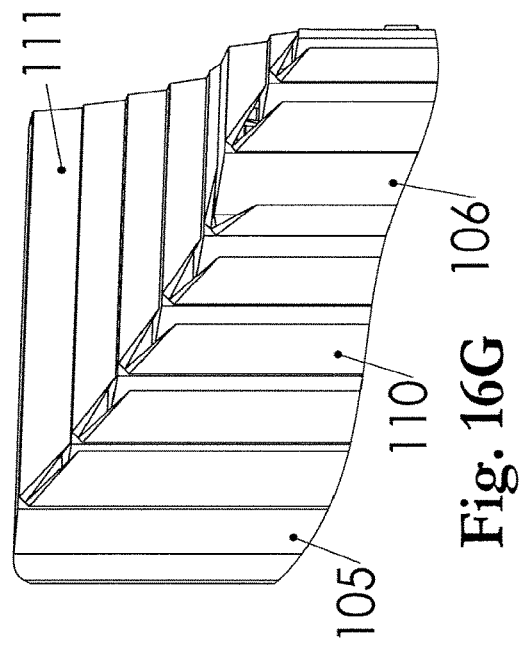
Figure 16E:
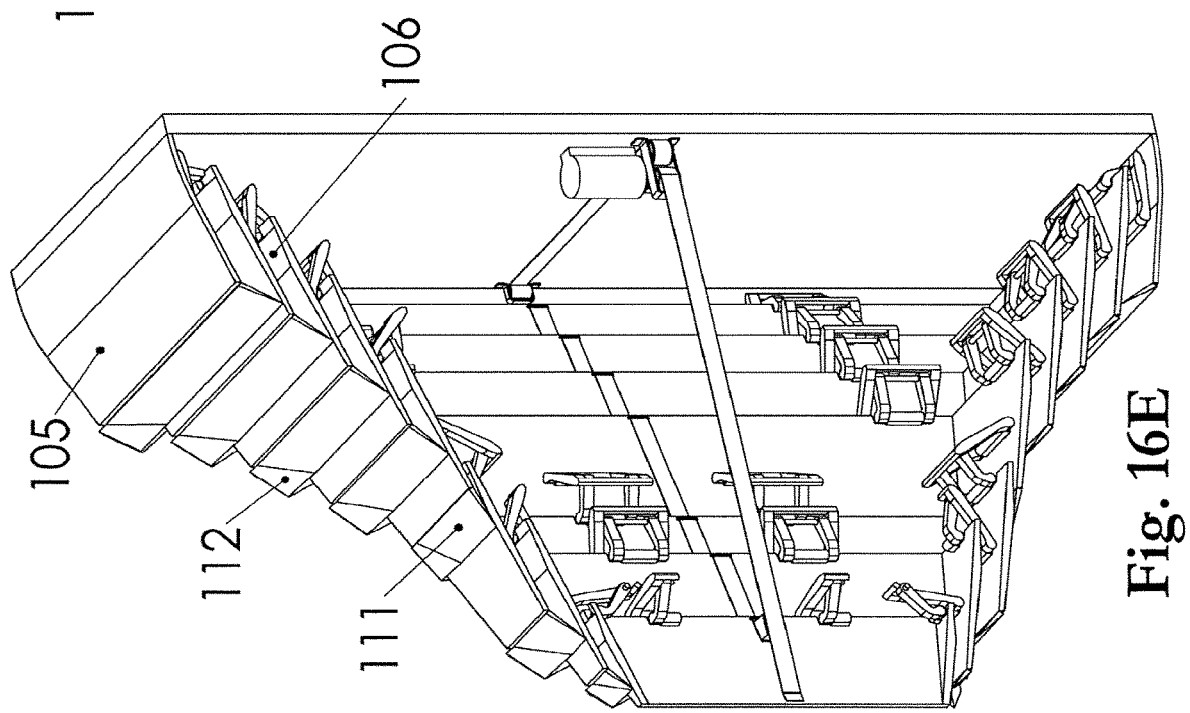

FIGS. 16E through 16G (and FIGS. 16I and 16J) show the left hand apparatus in the same partially extended configuration. In particular:

FIG. 16E is a perspective view showing the interior of the apparatus.

FIG. 16F is a perspective view showing the exterior of the apparatus.

FIG. 16G is the same view as FIG. 16F, but with the corner covers removed.

Figure 16H:
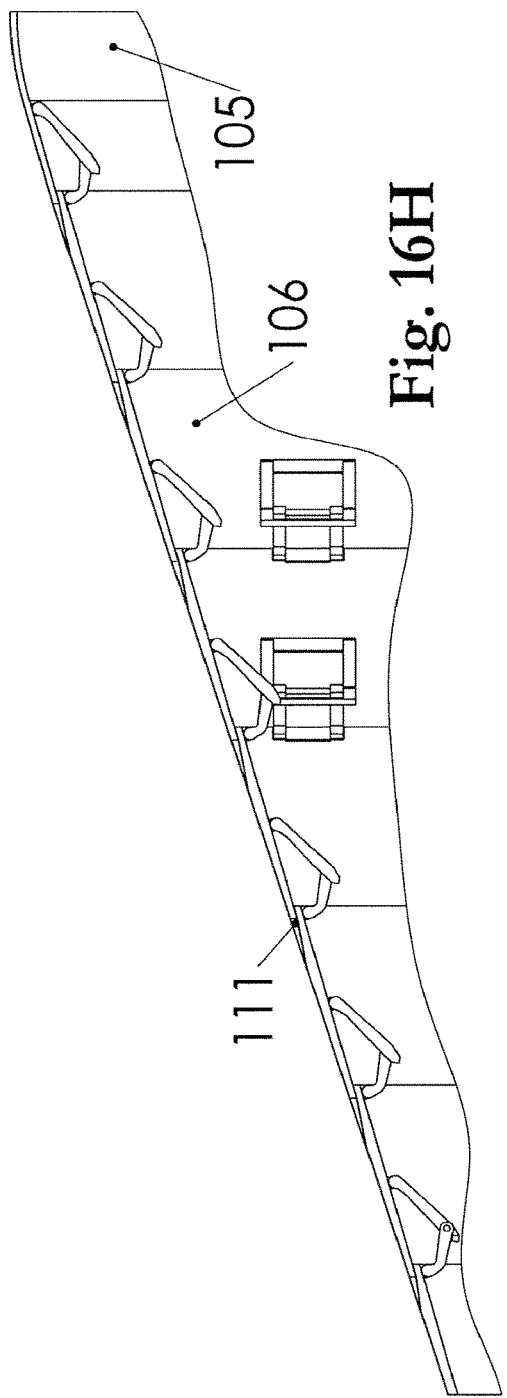

FIG. 16H is a partial side elevation view showing the interior of the left hand apparatus. This view illustrates an exterior panel assembly and cover shape that results in the overall apparatus having a completely smooth exterior shape when fully deployed.

Figure 16J:
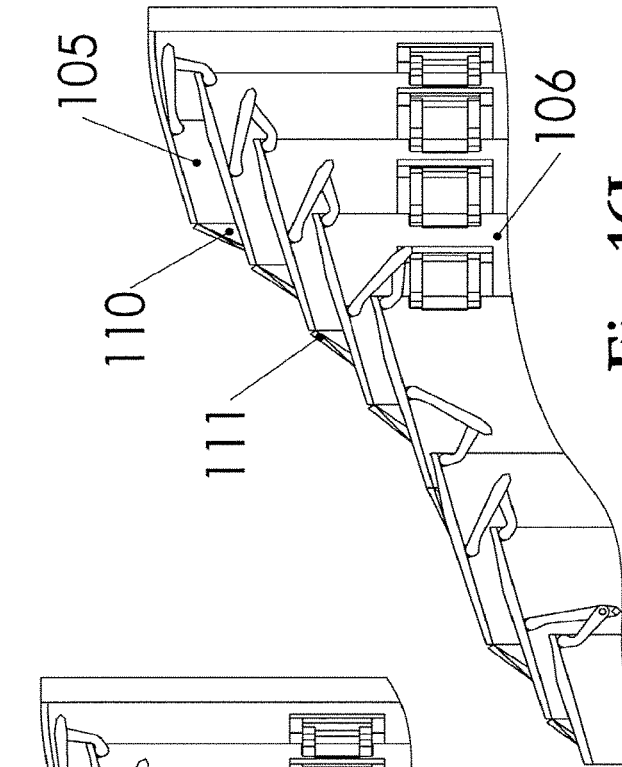
Figure 16I:
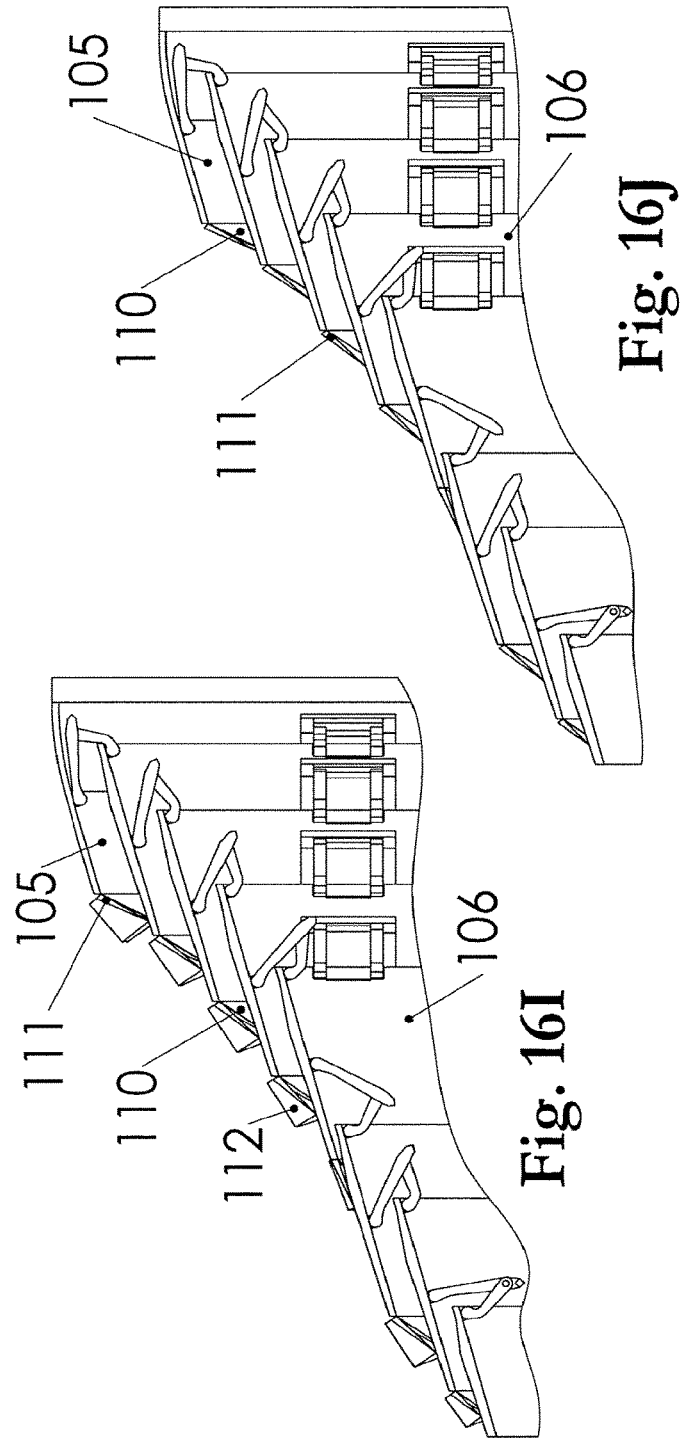

FIGS. 16I and 16J (and FIGS. 16E through 16G) show the left hand apparatus in the same partially extended configuration. In particular:

FIG. 16I is a partial side elevation view showing the interior of the left hand apparatus.

FIG. 16J is the same view as FIG. 16I, but with the corner covers removed.

FIGS. 16K through 16M are perspective views showing a typical panel assembly with typical covers installed. The views are similar to FIGS. 15G through 15I with the addition of corner covers and specially shaped exterior surfaces on the panel assemblies. In particular:

FIG. 16K shows the covers in a configuration where the apparatus is fully extended.

FIG. 16L shows the covers in a configuration where the apparatus is partially extended.

FIG. 16M shows the covers in a configuration where the apparatus is fully retracted.

FIG. 16N is a partial perspective view showing interior surfaces of a typical panel assembly and the cover hinge lines.

FIG. 16O is a perspective view of a cover showing the hinge line that connects it to the panel assemblies. This cover shares the same features and functions as the cover shown in FIG. 15K with the exception of a slightly different cross sectional shape and additional hinge lines to connect to the corner covers.

FIG. 16P is a perspective view of a cover showing the hinge line that connects it to the panel assemblies. This cover shares the same features and functions as the cover shown in FIG. 15L with the exception of a slightly different cross sectional shape and additional hinge lines to connect to the corner covers.

FIG. 16Q is a perspective view showing the interior surface of a typical corner cover and the hinge lines that connect it with the non-corner covers mentioned in the preceding two paragraphs.

FIGS. 17A and 17B show the present invention in its basic form using a hinged opening to gain access to the rear of the vehicle or trailer. In particular:

FIG. 17A is a partial perspective view from the left rear corner showing the apparatus on the back of an over-the-road trailer. The configuration shown has the apparatus fully retracted with the doors closed.

FIG. 17B is a partial perspective view from the right rear corner showing the apparatus on the back of an over-the-road trailer. The configuration shown has the apparatus fully retracted on the left door and fully extended on the right door. The doors are both open.

FIGS. 18A and 18B show the present invention in its basic form using telescoping linear slides to move the doors sideways in order to provide access to the rear opening of the trailer. Both views show the apparatus mounted on the rear of an over-the-road trailer with the apparatus fully retracted. In particular:

FIG. 18A is a partial perspective view from the left rear corner showing both doors closed.

FIG. 18B is a partial perspective view from the right rear corner showing both doors opened.

Figure 18C:
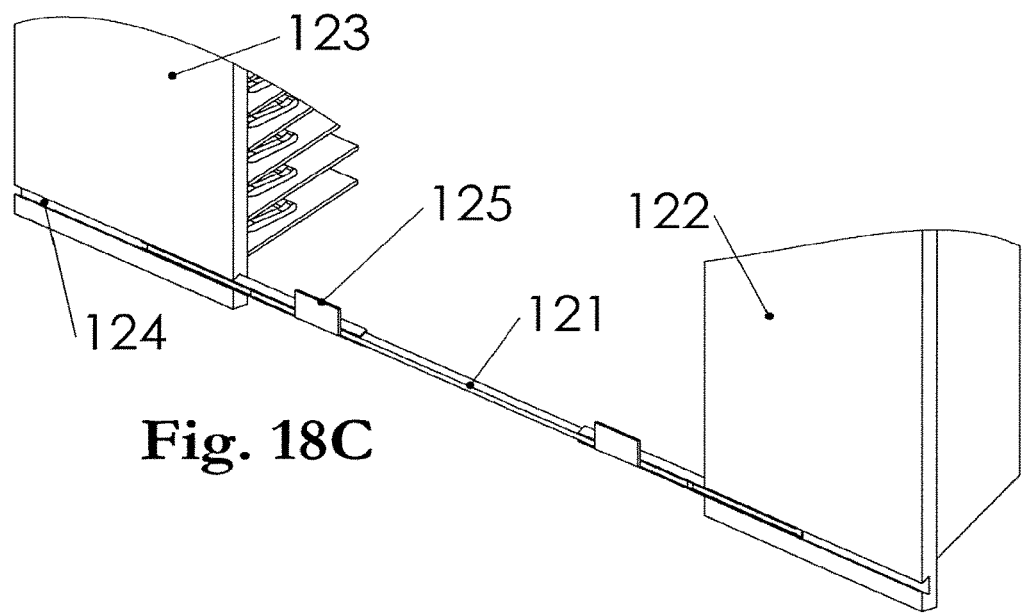

FIG. 18C is an enlarged partial perspective view from the direction of the trailer looking rearward. The view shows two of the apparatuses in a basic form mounted to a telescoping linear rail. The configuration shown has both apparatuses fully retracted and both doors open.

Figure 19A:
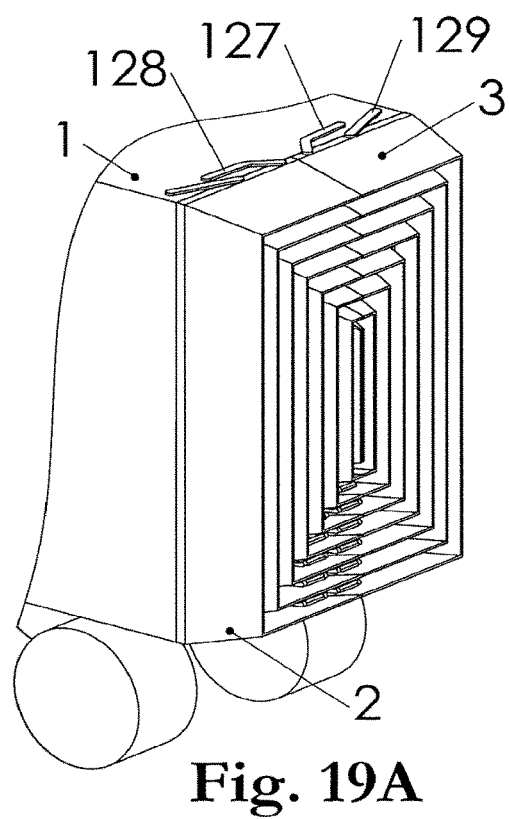

FIGS. 19A through 19G show the present invention in its basic form mounted to the rear of an over-the-road trailer. In these views an articulated linkage is used to open the doors and gain access to the rear opening of the trailer. In particular:

FIG. 19A is a partial perspective view from the left rear corner. The configuration shown is the apparatuses fully retracted and the doors closed.

Figure 19B:
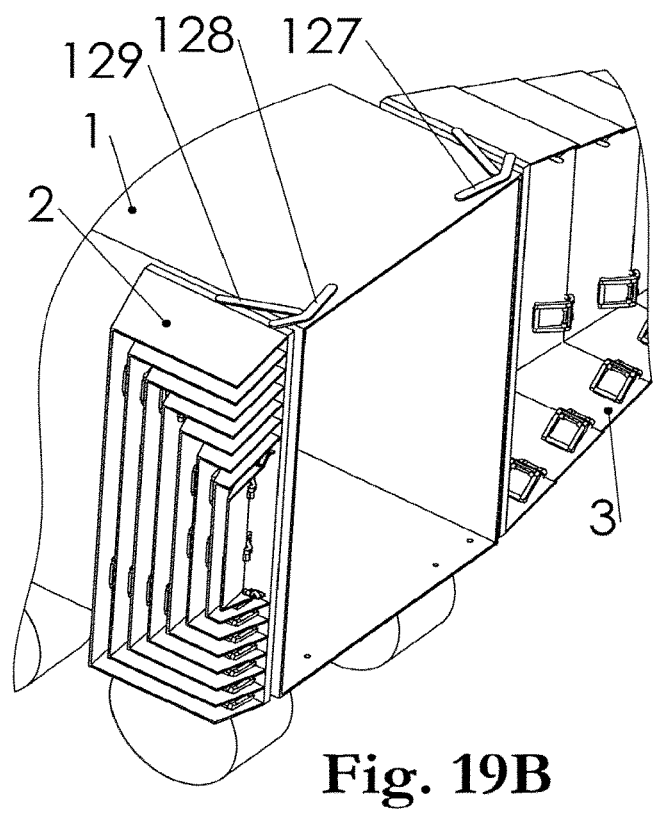

FIG. 19B is a partial perspective view from the upper left rear corner. The configuration shown is the left apparatus fully retracted and the right apparatus fully extended. Both doors are fully opened.

FIGS. 19C through 19G are top plan views illustrating the action of the articulated linkage. The configuration shown is the right apparatus fully extended and the left apparatus fully retracted. In particular:

FIG. 19C shows the doors fully closed.

FIG. 19D shows the doors partially opened.

FIG. 19E shows the doors opened farther than in FIG. 19D.

FIG. 19F shows the doors opened farther than in FIG. 19E.

FIG. 19G shows the doors fully opened.

Figure 2D:
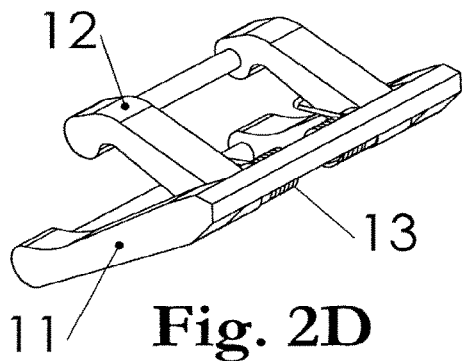
Figure 2H:
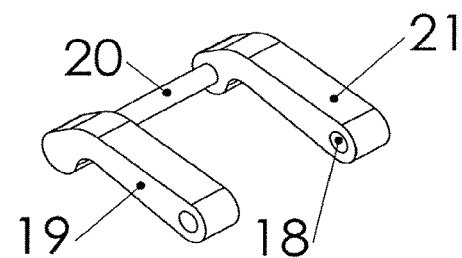
Figure 2E:
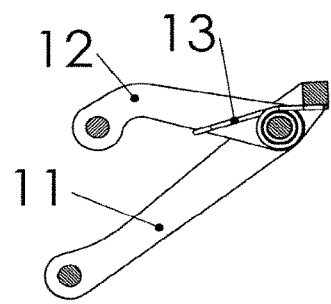
Figure 2F:
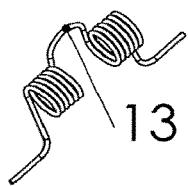
Figure 2G:
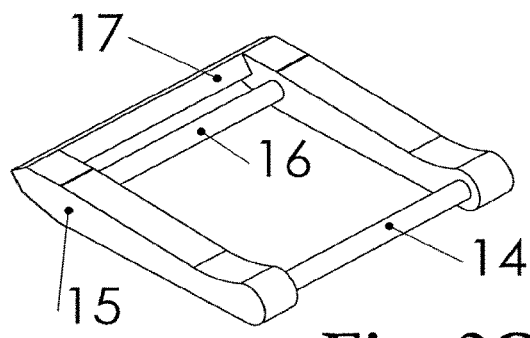

FIGS. 20A through 20E show a form of the present invention that substitutes hinged panels for the linkage assemblies such as those shown in FIGS. 2A and 2B. The notches on the leading edge of the panel assemblies have also been removed. Instead of the notches, the entire upstream edge of the panel assembly has been trimmed, allowing the hinged panels connecting to the upstream panel assembly to occupy a small space in front of the upstream edge. In comparison, this reduces the overlap from one panel assembly to the next when fully deployed. The hinged panel assemblies are used on the top, bottom, right, and left sides. The five figures are all partial elevation views showing the interior of the left hand apparatus. The figures all show the highest hinged panel assembly in the fully retracted configuration and the lowest hinged panel assembly in the fully extended configuration. As with the linkage assemblies, the hinged panel assemblies could use springs and hinge stops to keep the apparatus stable in the fully extended and fully retracted positions. This form of the invention will allow a similar web extension-retraction system, providing the hinged panels assemblies are interrupted to allow the web to pass through. The term "hinged panels" is used for descriptive purposes. In fact, the "hinged panels" are linkage assemblies in their own right. The hinged panels could range in length from rather short to close to the length of the corresponding panel assembly. The minimum workable length for each successive group of hinged panels is determined by strength considerations. The maximum workable length is determined by the need to avoid interference with the panel assemblies in all configurations. In particular:

FIG. 20A shows the center hinged panel assembly in the fully retracted configuration.

FIG. 20B shows the center hinged panel assembly in the slightly extended configuration.

FIG. 20C shows the center hinged panel assembly extended farther than in FIG. 20B.

Figure 20D:
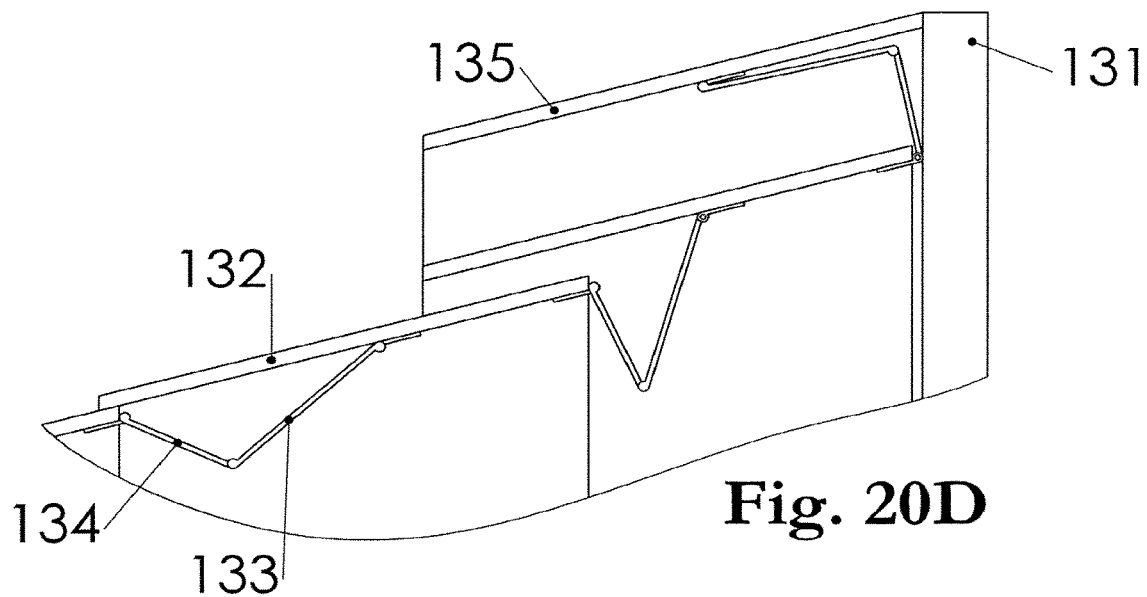

FIG. 20D shows the center hinged panel assembly extended farther than in FIG. 20C.

Figure 20E:
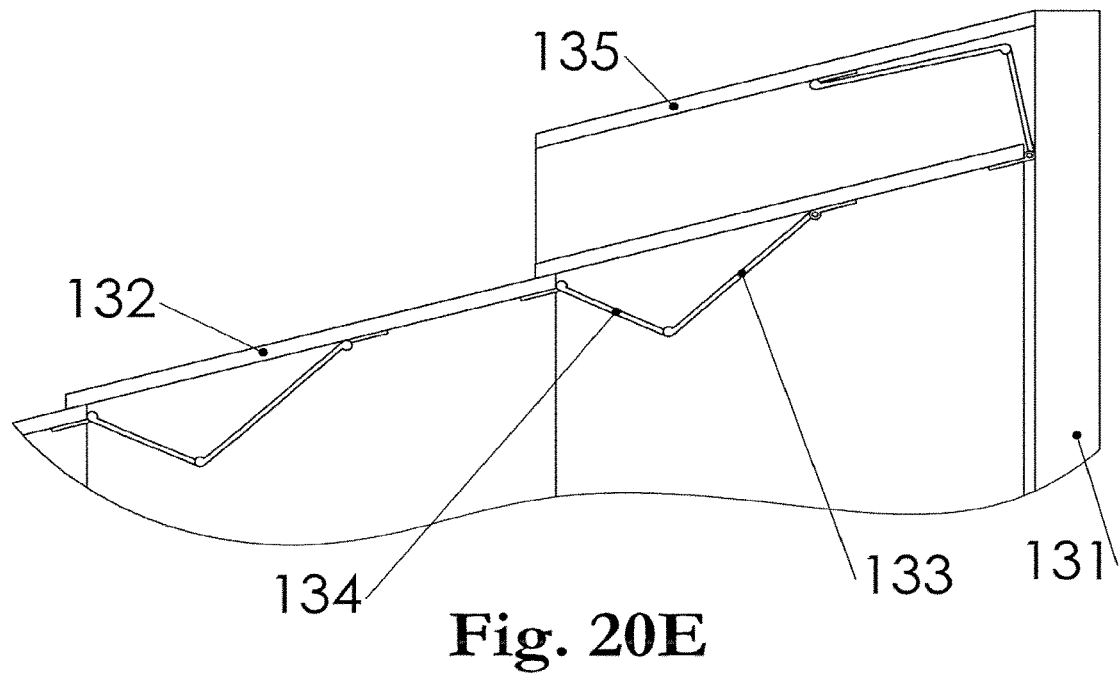

FIG. 20E shows the center hinged panel assembly fully extended configuration.

Figure 21A:
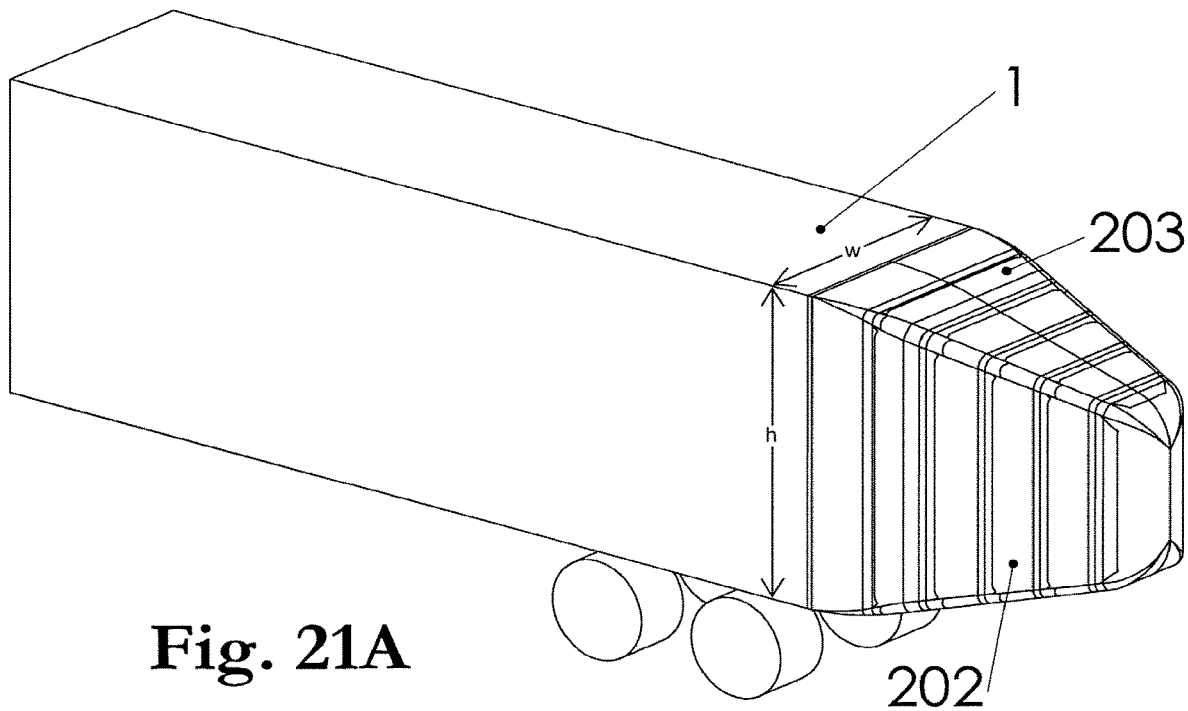
Figure 21B:
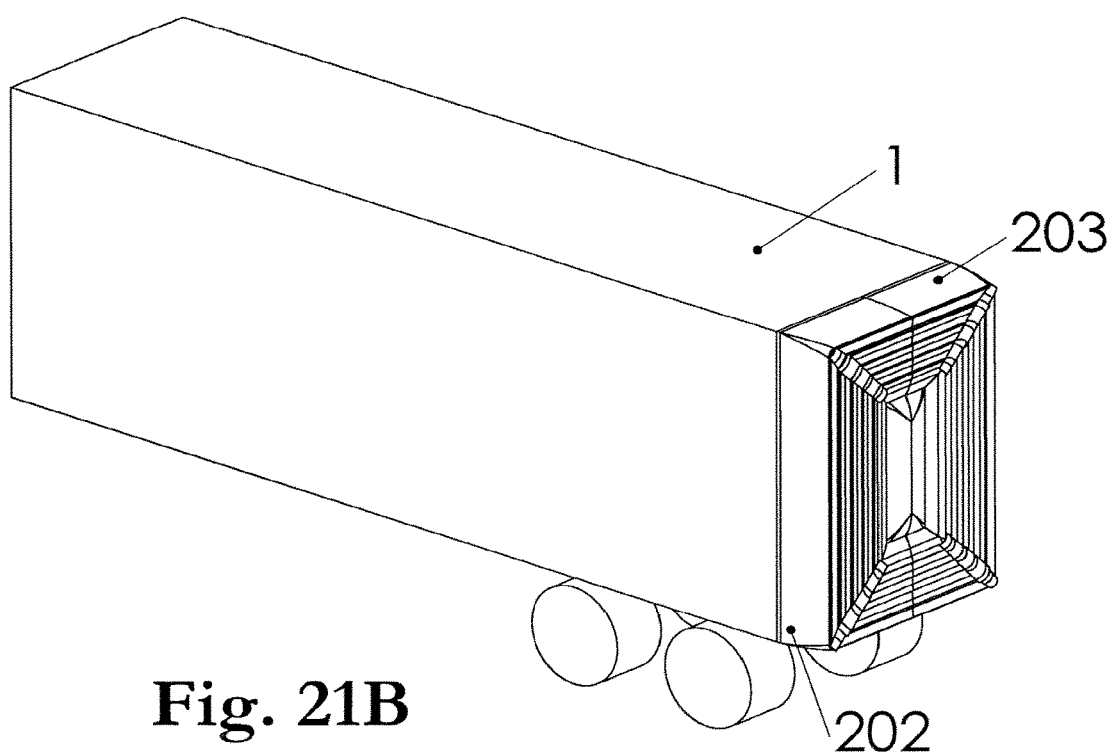
Figure 21C:
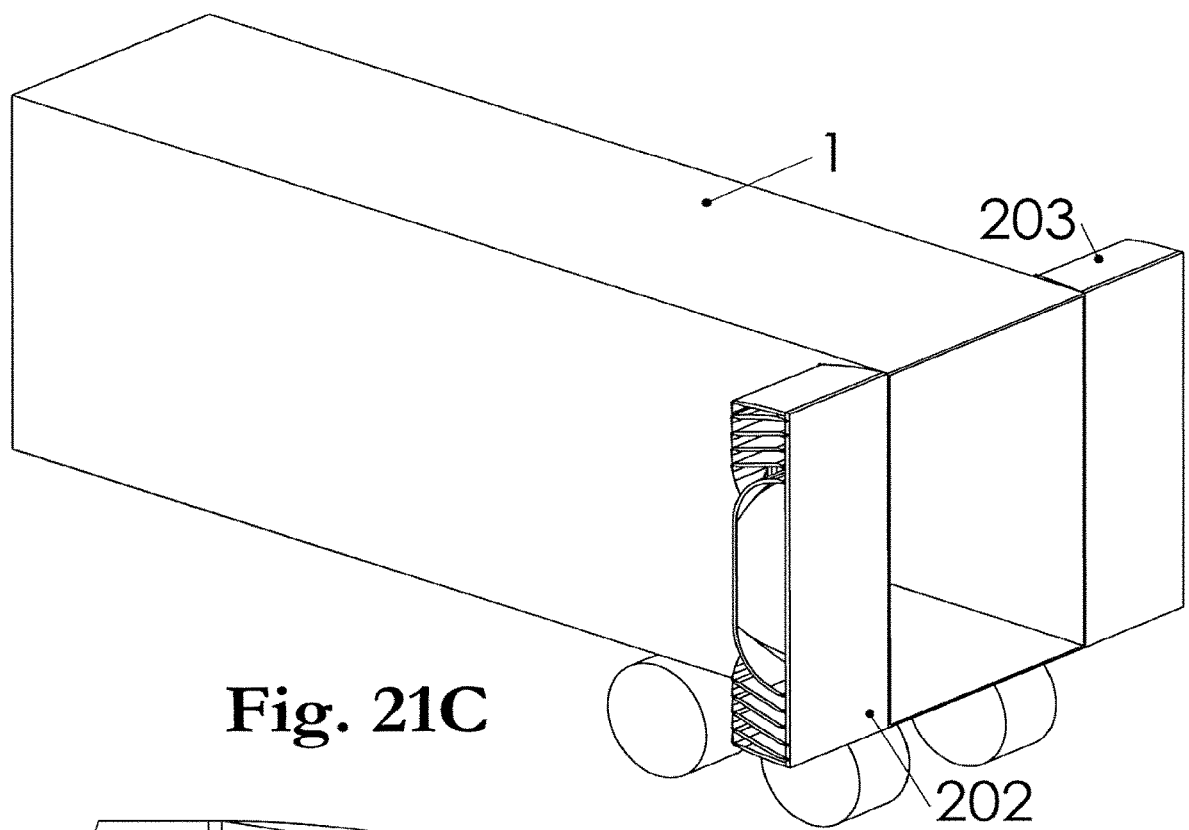
Figure 21D:
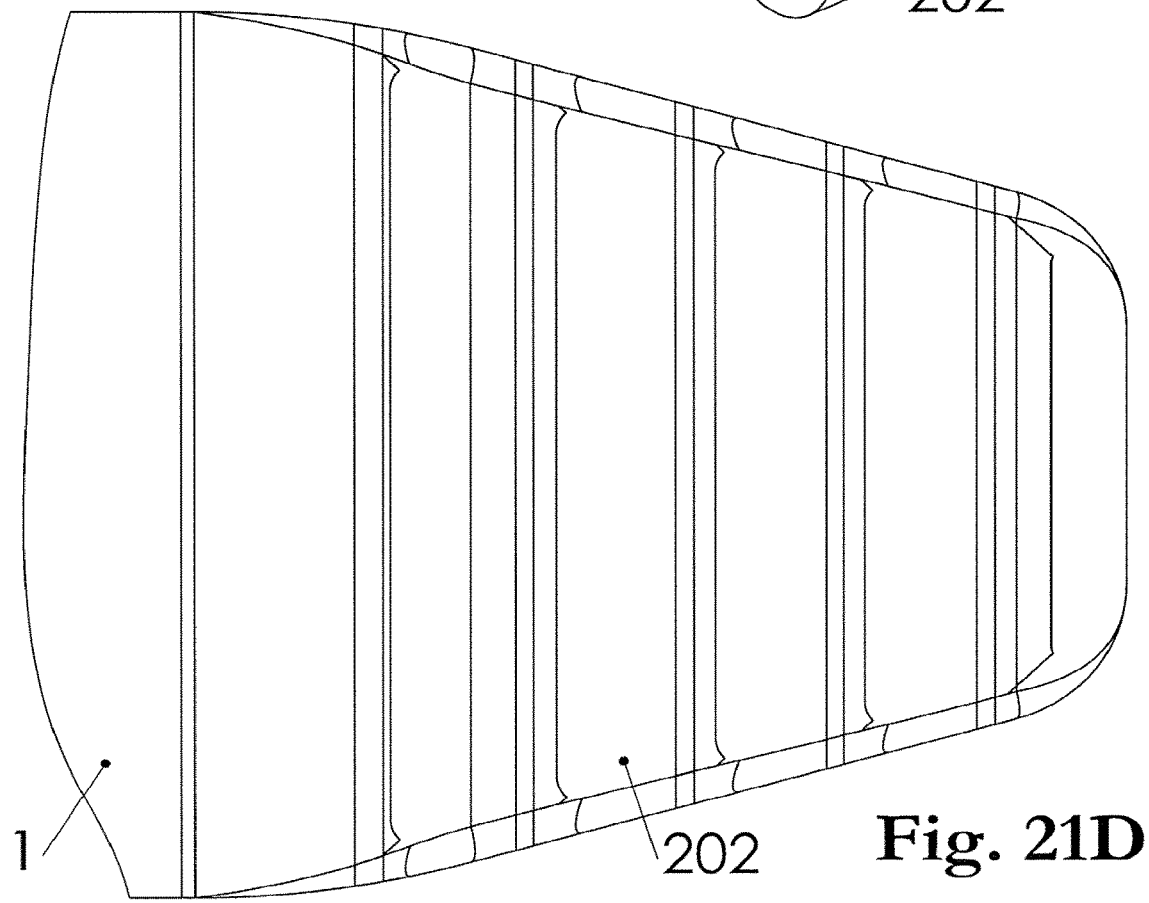
Figure 21E:
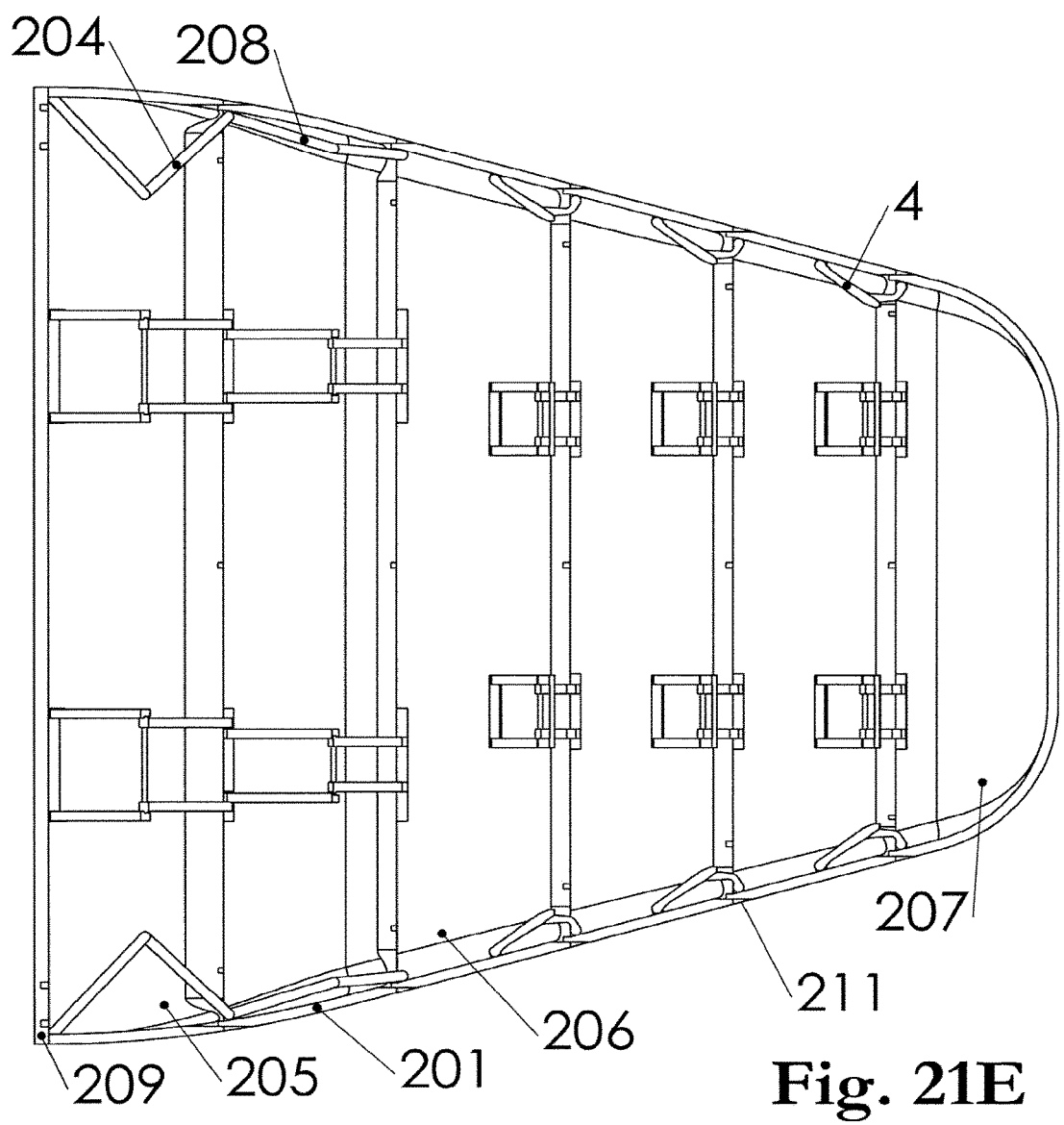
Figure 21F:
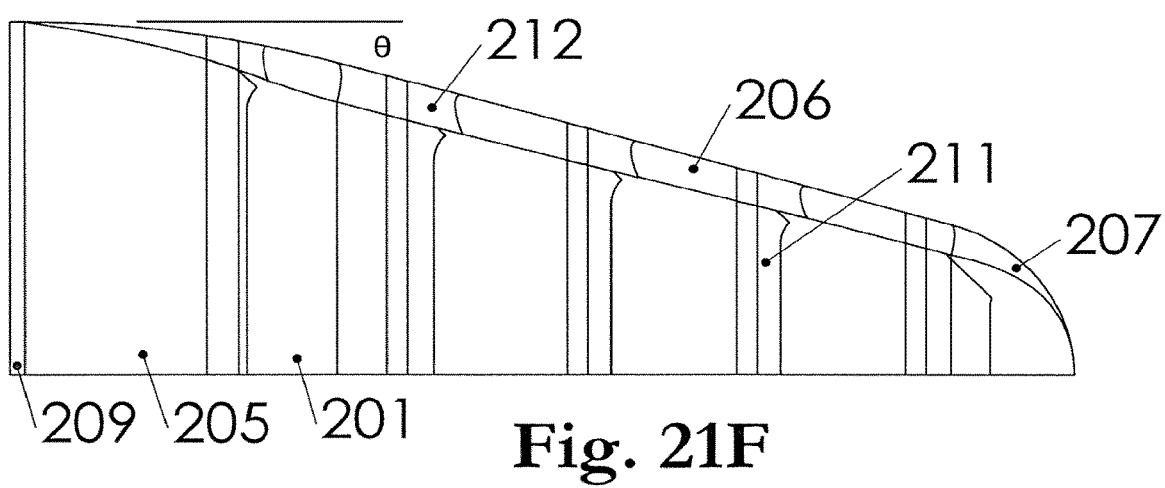
Figure 21N:
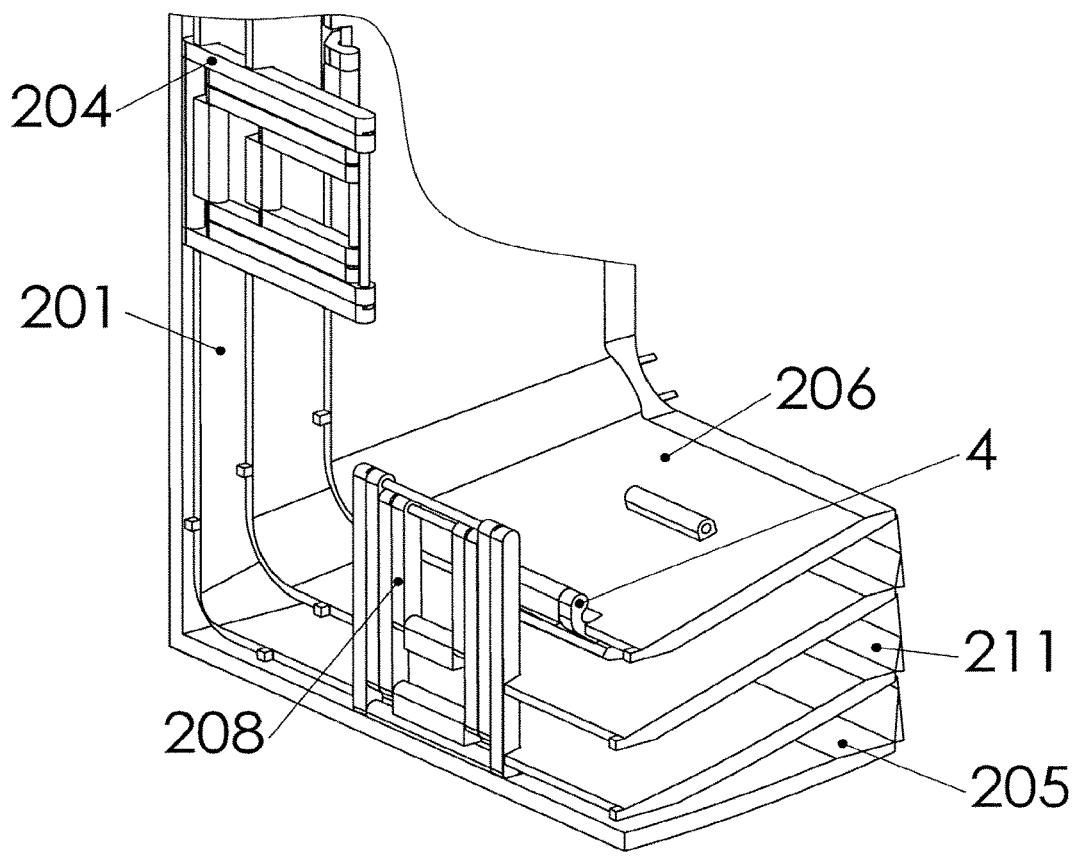
Figure 21O:
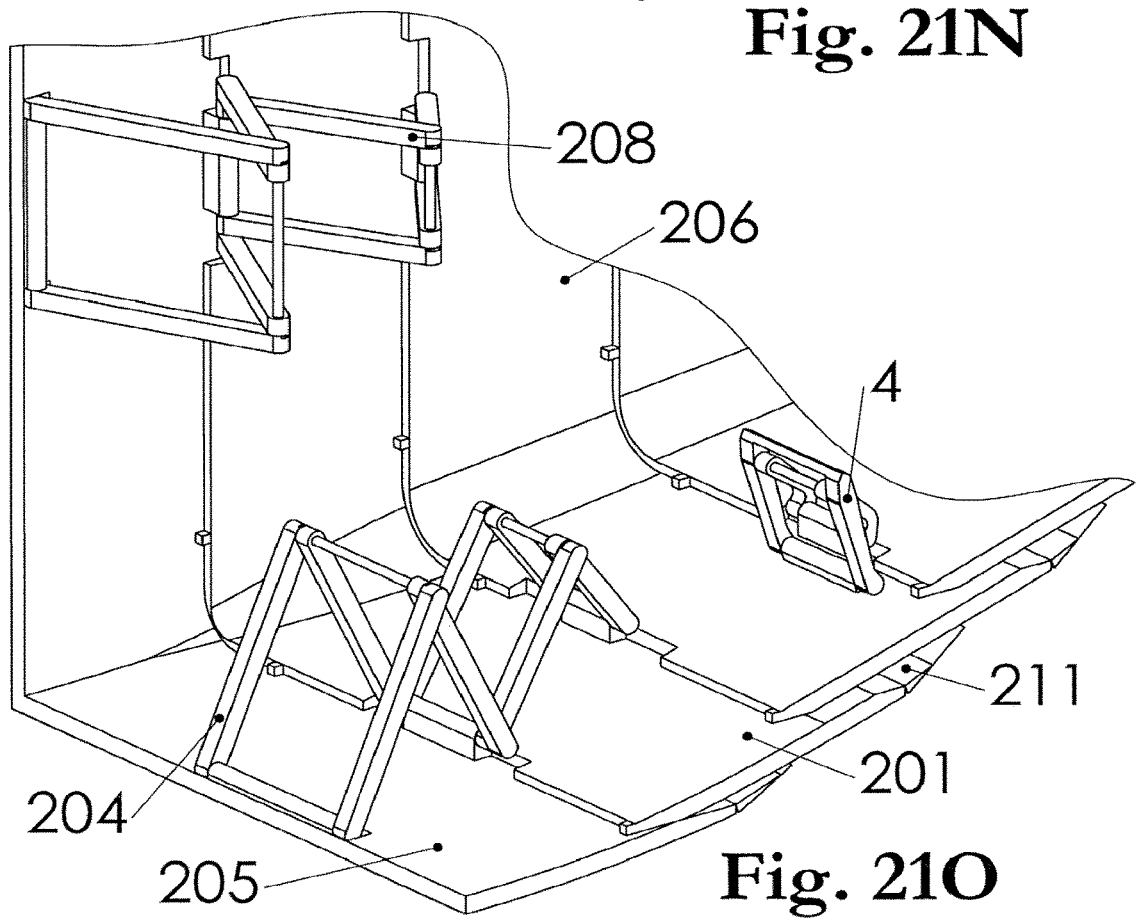

FIGS. 21A through 21O show a form of the present invention that is completely smooth on its exterior surface when the apparatus is in the extended configuration. The present form incorporates a smooth transition across the apparatus and the vehicle or trailer similar to, but more gradual than, those shown in FIGS. 14A through 14G and FIGS. 16A through 16J. This form also uses covers similar to those shown in FIGS. 15A through 15I and FIGS. 16A through 16M. Furthermore, this form incorporates corner covers similar in purpose to those shown in FIGS. 16A through 16F, but hinging on the panel assemblies rather than the horizontal and vertical covers. The gradual transition from the vehicle surfaces occurs over several of the farthest upstream panel assemblies and results in the panel assemblies being closer to each other. As the transition is made more gradual, the affected panels become closer to each other. At some point, practical linkage assemblies cannot be made compact enough to fit in-between the panel assemblies in the retracted configuration. This form of the invention addresses this limitation by replacing the affected linkage assemblies with those shown in the figures below. As in the basic form, the aerodynamic drag reducing apparatus is in two halves, split right and left. The right and left halves open for access to the rear of the trailer. The modifications to the basic form required by the present form are further described below. In particular:

FIGS. 21A through 21D show the apparatus mounted on the rear of an over-the-road trailer. In particular:

FIG. 21A is a perspective view from the left rear corner. The configuration shown is fully extended with trailer doors closed.

FIG. 21B is a perspective view from the left rear corner. The configuration shown is fully retracted with trailer doors closed.

FIG. 21C is a perspective view from the left rear corner. The configuration shown is fully retracted with trailer doors opened.

FIG. 21D is an enlarged partial elevation view from the left illustrating the completely smooth and gradually transitioning top and bottom of the apparatus.

FIG. 21E is a side elevation view showing the interior of the right hand apparatus. This view illustrates an exterior panel assembly and horizontal cover shape that results in the overall apparatus having a completely smooth exterior shape when fully deployed. The shape of the vertical features of the panel assembly and the shape of the vertical cover, although not shown, are similar to those shown here.

FIG. 21F is a top plan view of the right hand apparatus illustrating the completely smooth and gradually transitioning exterior sides of the apparatus.

FIGS. 21G through 21I show the right hand apparatus in the same partially extended configuration. In particular:

FIG. 21G is a side elevation view showing the interior of the apparatus.

FIG. 21H is a perspective view showing the interior, rear, and top of the apparatus.

FIG. 21I is a perspective view showing the exterior of the apparatus from the top, right, and rear.

FIGS. 21J through 21N show the right hand apparatus in the same fully retracted configuration. In particular:

FIG. 21J is a side elevation view showing the interior of the apparatus.

FIG. 21K is a perspective view showing the interior, rear, and top of the apparatus.

FIG. 21L is a perspective view showing the exterior of the apparatus from the top, right, and rear.

FIG. 21M is a perspective view showing the interior of the apparatus. The trailer door has been removed in this view to show more fully the interior features. The view is from the front, top, and left.

FIG. 21N is an enlarged partial perspective view showing the interior of the apparatus. The trailer door has been removed in this view to show more fully the interior features. The view's perspective is the same as that of FIG. 21M.

FIG. 21O is an enlarged partial perspective view showing the interior of the apparatus. The trailer door has been removed in this view to show more fully the interior features. The apparatus is in a partially extended configuration. The view's perspective is the same as that of FIG. 21N.

Figure 22A:
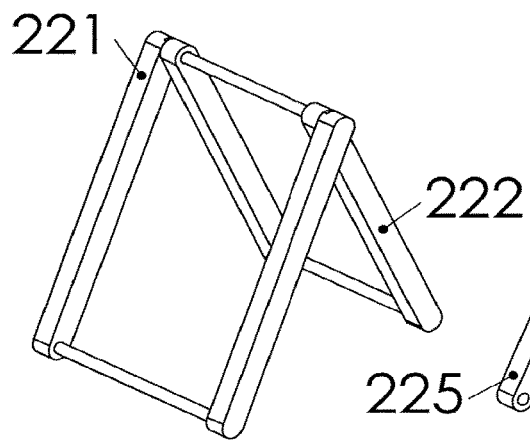

FIGS. 22A through 22E show the linkage assemblies and their components first introduced in FIG. 21E. These linkage assemblies are used to hold the second and third panel assemblies in place. In particular:

FIG. 22A is a perspective view of the first linkage assembly in a partially extended configuration.

Figure 22B:
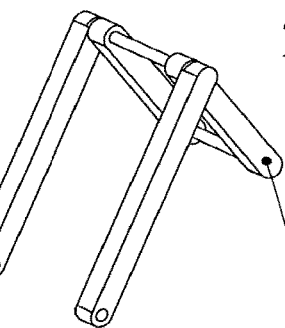

FIG. 22B is a perspective view of the second linkage assembly in a partially extended configuration.

Figure 22C:
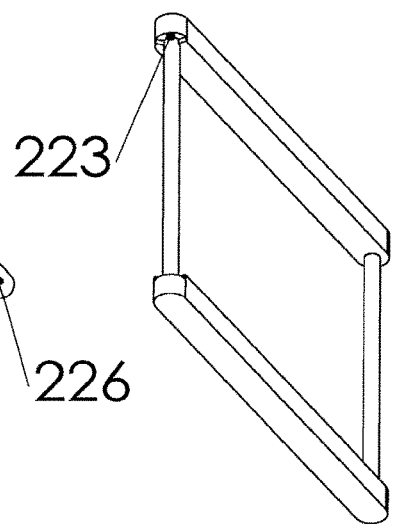

FIG. 22C is a perspective view of the longer link of the first linkage assembly. The pocket serving as a travel stop is illustrated.

Figure 22D:
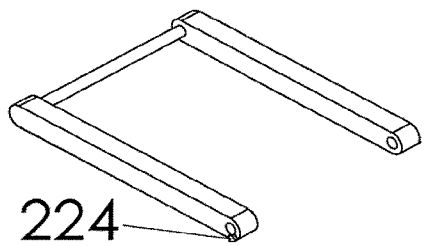

FIG. 22D is a perspective view of the shorter link of the first linkage assembly. The protrusion serving as a travel stop is illustrated.

Figure 22E:
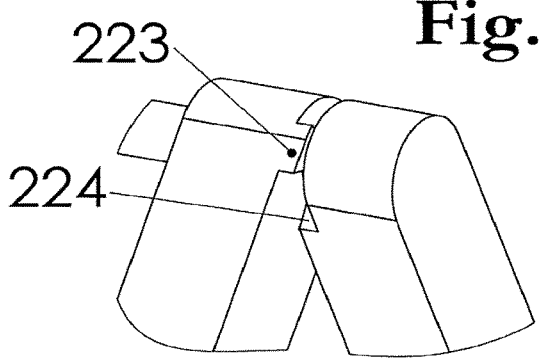

FIG. 22E is an enlarged partial perspective view showing the travel stop protrusion and travel stop pocket typical in the above two linkage assemblies. The joint is in a partially extended configuration.

Figure 23A:
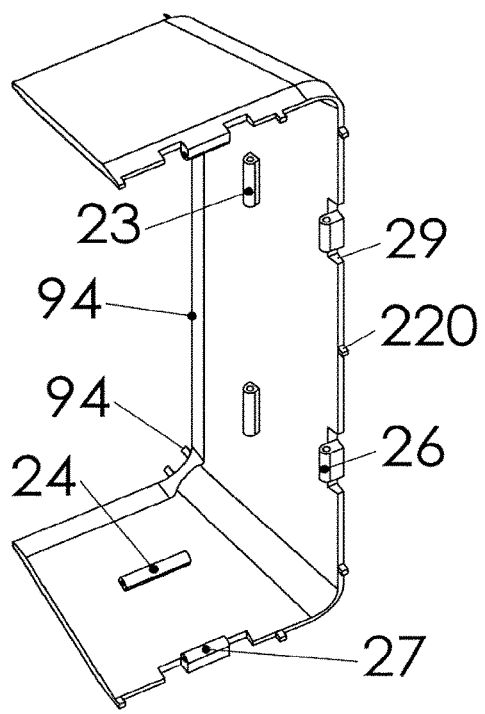

FIGS. 23A through 23D show several variations of the panel assemblies first introduced in FIG. 21A. These panel assemblies are similar to those shown in FIGS. 3A through 3E except as noted. In particular:

FIG. 23A is a perspective view showing a panel assembly similar to those shown in FIGS. 3B, 3C, and 15J. The present panel assembly differs in that it has rounded corners and protrusions for mounting the corner cover described below. The panel assembly includes hinge lines for horizontal and vertical covers.

Figure 23B:
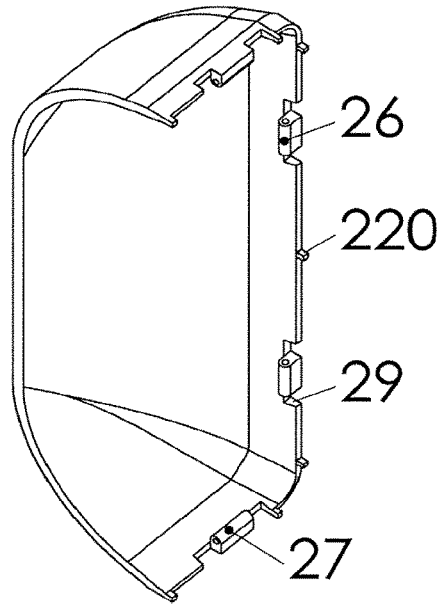

FIG. 23B is a perspective view showing the panel assembly farthest downstream. It is similar to the one shown in FIG. 3D except for the addition of rounded surfaces.

Figure 23C:
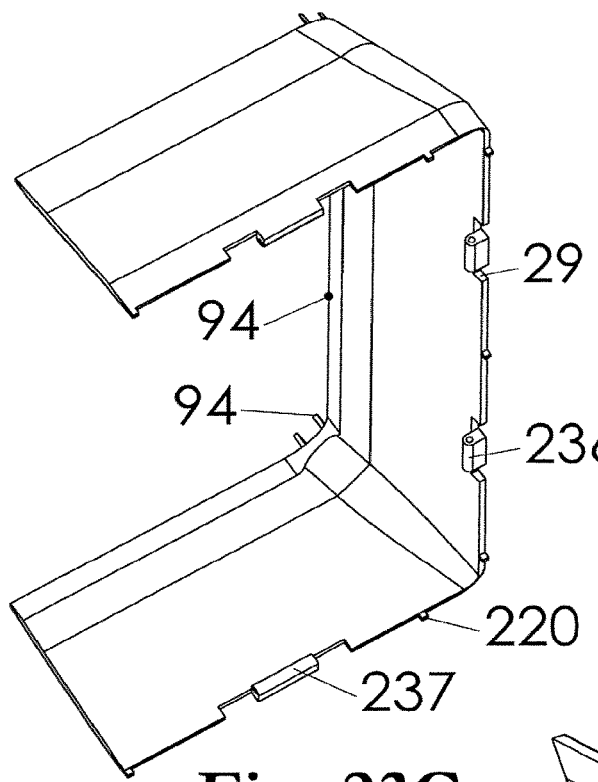

FIG. 23C is a perspective view showing the panel assembly next to the one farthest upstream. It is different from the one shown in FIG. 23A in that it only mounts to the linkage assemblies at its upstream edge. This also means it is not a part of the linkage chain as discussed earlier, but merely mounts to the joint that is common to both linkage assemblies shown in FIGS. 22A and 22B. It is also different in that it has curved exterior surfaces that are part of the smooth transition to the trailer. The panel assembly includes hinge lines for horizontal, vertical, and corner covers.

Figure 23D:
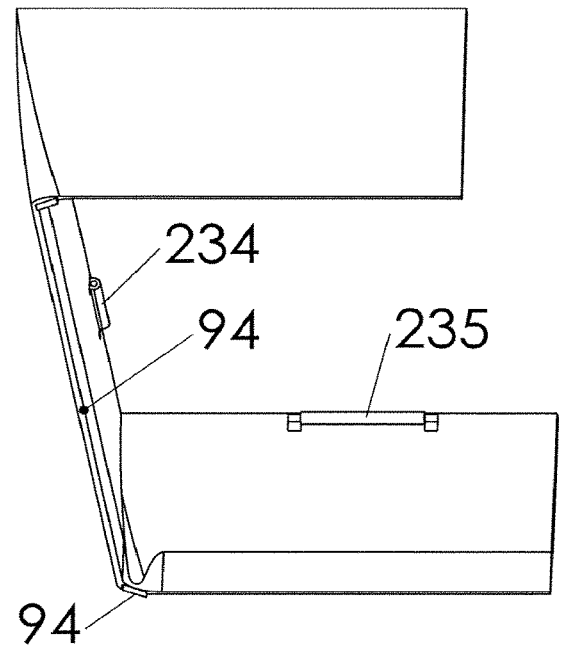

FIG. 23D is a perspective view showing the panel assembly farthest upstream. It is similar to those shown in FIGS. 3A, 11I, and 14F except that the linkage attachment point is near its upstream edge. It is also different in that it has exterior surfaces with compound curvature. Furthermore, hinge attachments are added near the trailing edge for use with the horizontal, vertical, and corner covers.

Figure 23E:
Figure 23F:
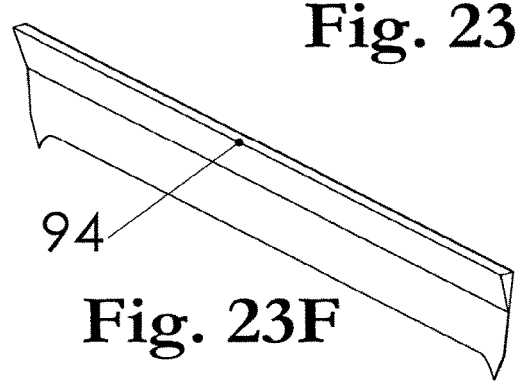
Figure 23G:
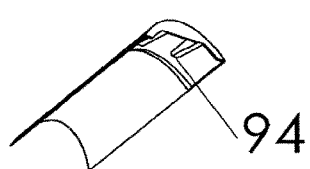

FIGS. 23E through 23G show perspective views of typical covers first introduced in FIGS. 21A through 21O. Each cover has a single hinge line connecting it to the appropriate panel assembly. In particular:

FIG. 23E shows a horizontal cover similar to those shown in FIGS. 15L and 16P.

FIG. 23F shows a vertical cover similar to those shown in FIGS. 15K and 16O.

FIG. 23G shows a corner cover.

Figure 23H:
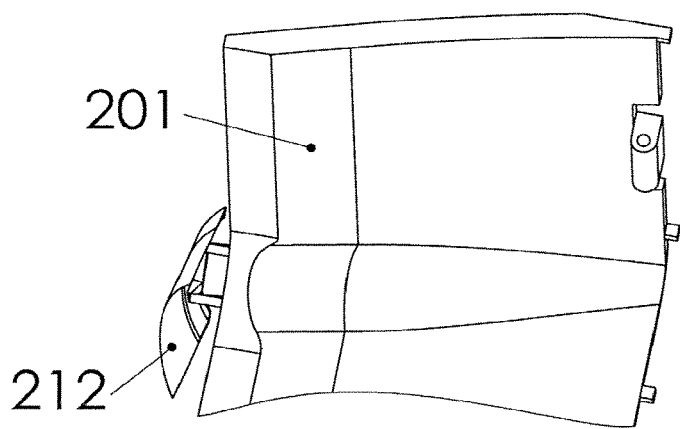

FIG. 23H shows a partial perspective view of a typical corner cover as shown in FIG. 23G mounted to a typical panel assembly first introduced in FIGS. 21A through 21O. The configuration shown is near fully retracted. The view is from the inside of the panel assembly looking outward.

Figure 24A:
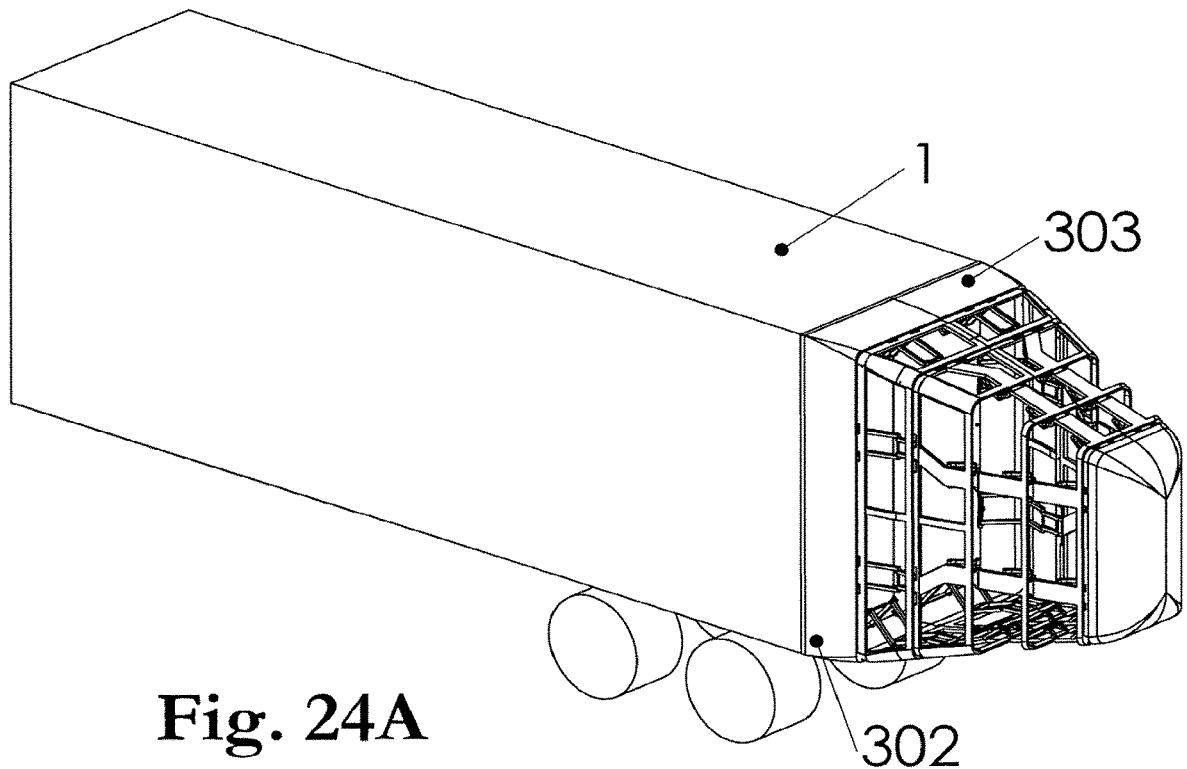
Figure 24B:
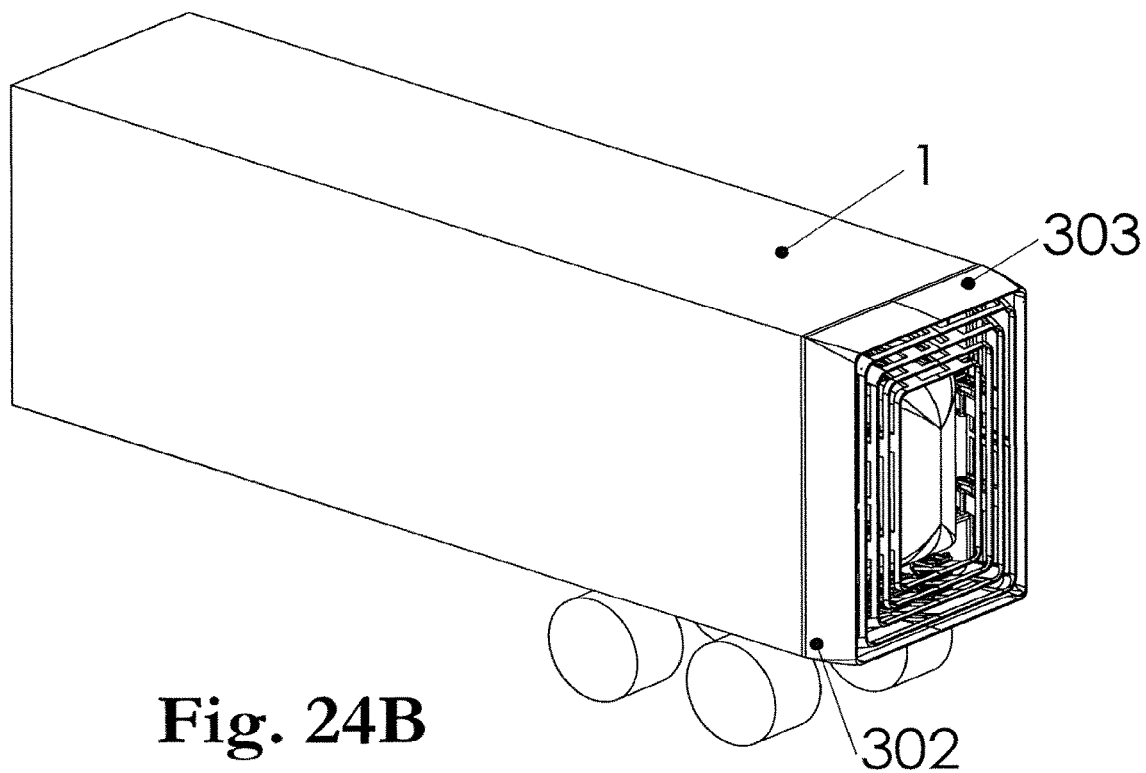

FIGS. 24A through 24D illustrate a form of the present invention where the rigid components form only a framework and not an enclosed volume when fully extended. The aerodynamic shape is formed by fabric (not shown in these figures) which is attached to and takes its shape from the framework. All of the previously mentioned forms of the invention may be adapted to serve as a framework used in conjunction with fabric. A particular form with the apparatus split in two halves, right and left, was chosen for the purpose of illustration. In particular:

FIGS. 24A and 24B are perspective views from the left rear corner showing the present form of the drag reducing apparatus attached to an over-the-road trailer with the trailer doors closed. In particular:

FIG. 24A shows the apparatus fully extended. The fabric mentioned above is not shown. The fabric takes the form of a smooth surface joining the outermost features of the framework. The exterior appearance of the apparatus with the fabric shown would be similar to FIG. 21A with the internal features of the apparatus hidden by the fabric.

Figure 27F:
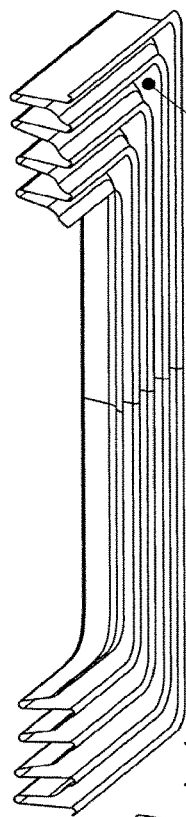
Figure 27G:
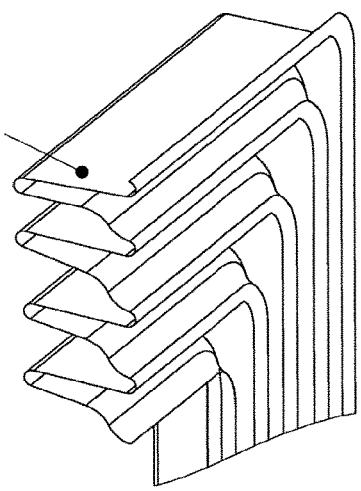
Figure 27H:
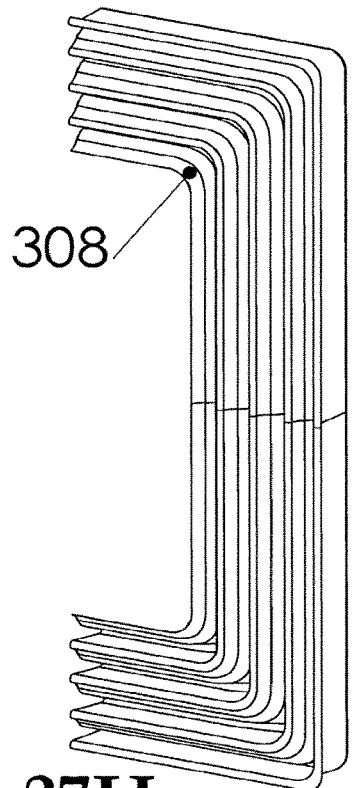

FIG. 24B shows the apparatus fully retracted. The fabric mentioned above is not shown. The fabric in this retracted configuration has the form of a bellows, as shown in FIGS. 27F through 27H, attached to the trailing edges of the framework.

Figure 24C:
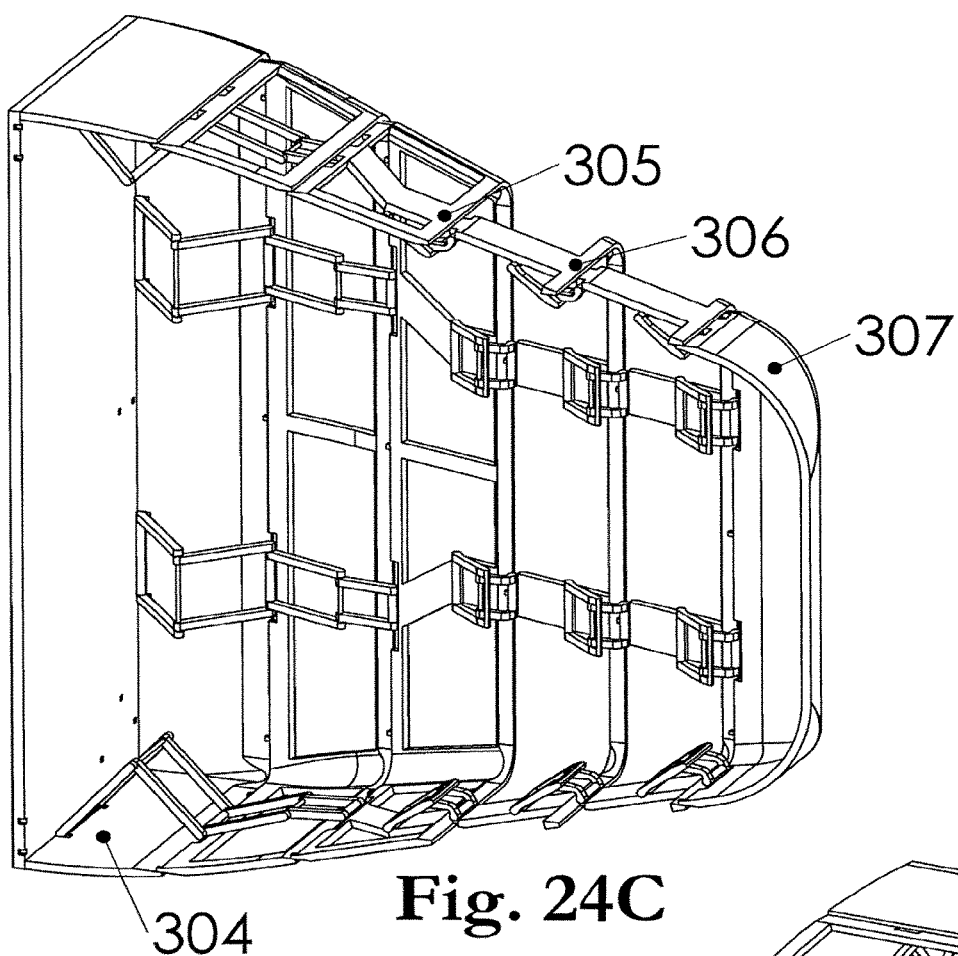
Figure 24D:
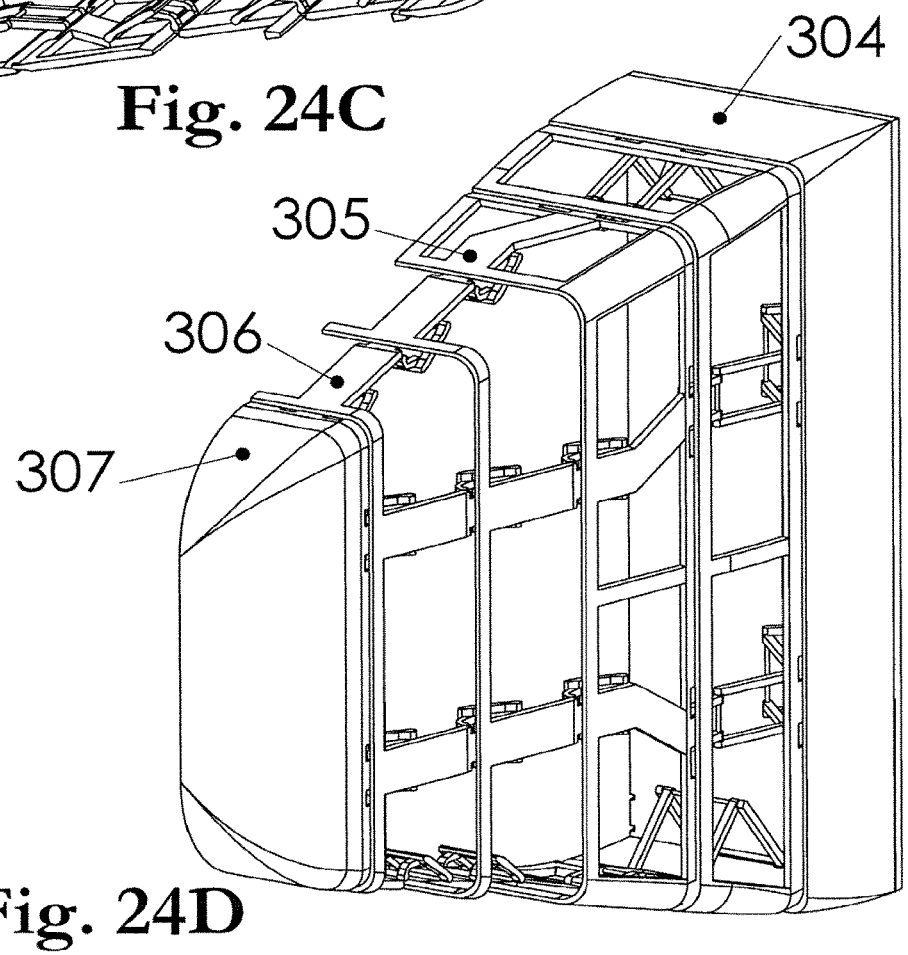

FIGS. 24C and 24D are perspective views showing the right hand apparatus in a fully extended configuration. The fabric mentioned above is not shown. The exterior appearance of the apparatus with the fabric shown would be similar to FIGS. 21D and 21F. In particular:

FIG. 24C is a view from the left rear corner showing primarily the inside of the apparatus.

FIG. 24 D is a view from the right rear corner showing primarily the outside of the apparatus.

Figure 25A:
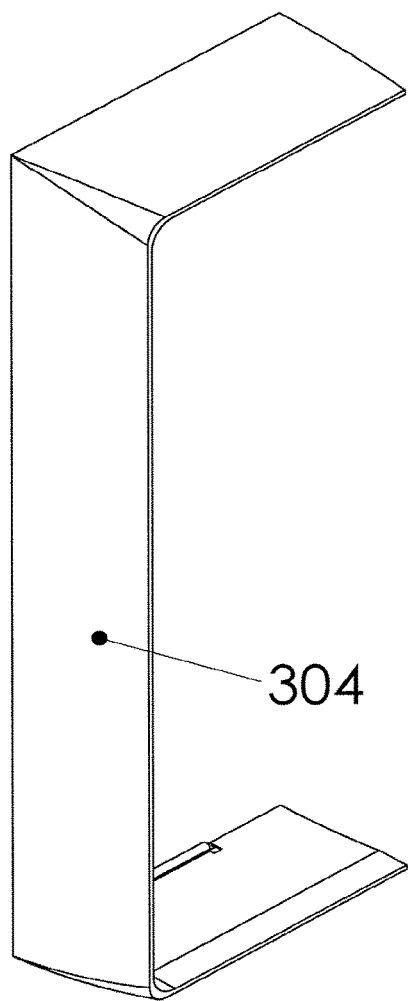

FIGS. 25A through 25D illustrate the component framework and panel assembly types which may be used in the present form of the invention. The combinations of types and their forms may be varied. The views are from the left rear corner of the components from the left hand apparatus. In particular:

FIG. 25A shows the farthest upstream section as a panel assembly. This illustrates that panel assemblies and fabric covered frames may be mixed in the same apparatus.

Figure 25B:
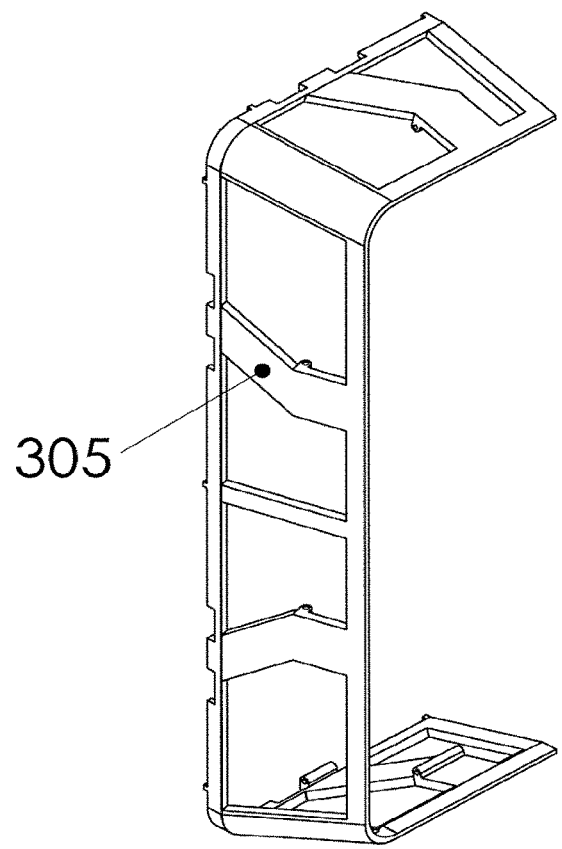

FIG. 25B shows a framework whose leading edge, corners, and trailing edge define the adjacent shape of the apparatus.

Figure 25C:
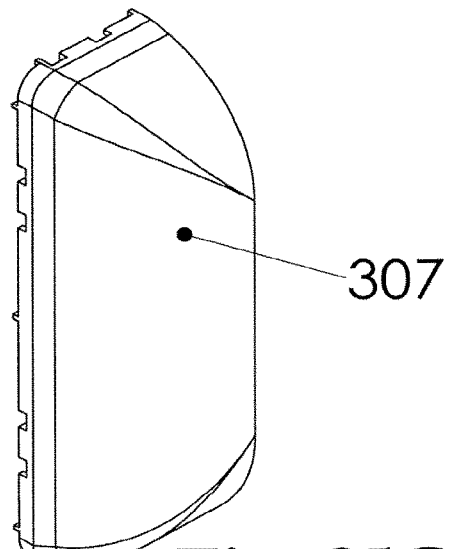

FIG. 25C shows the farthest downstream section as a panel assembly.

Figure 25D:
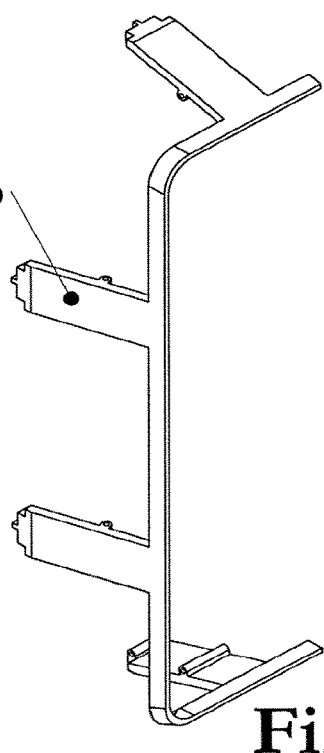

FIG. 25D shows a framework whose trailing edge defines the adjacent shape of the apparatus.

Figure 26A:
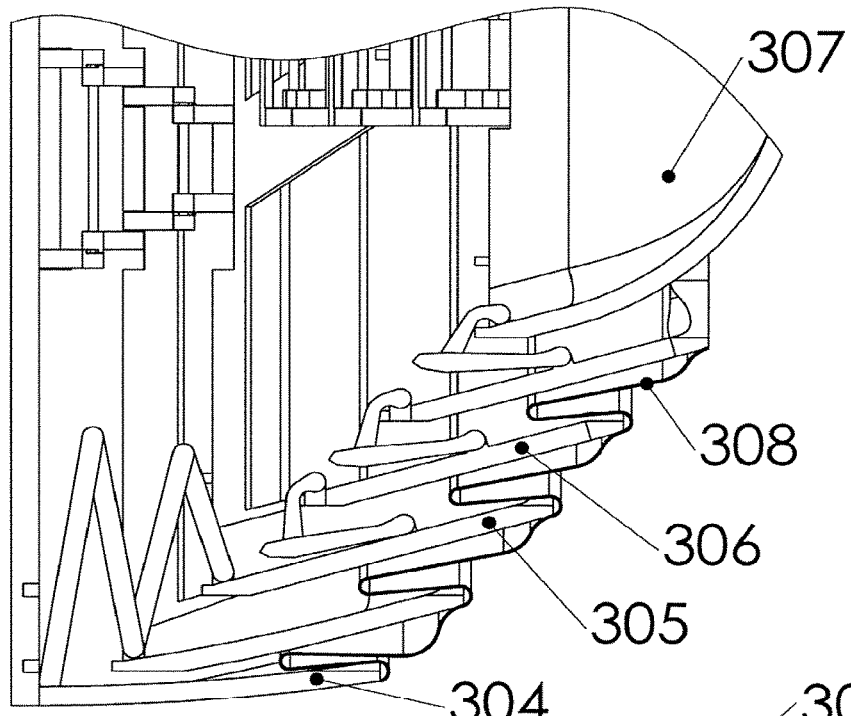
Figure 26B:
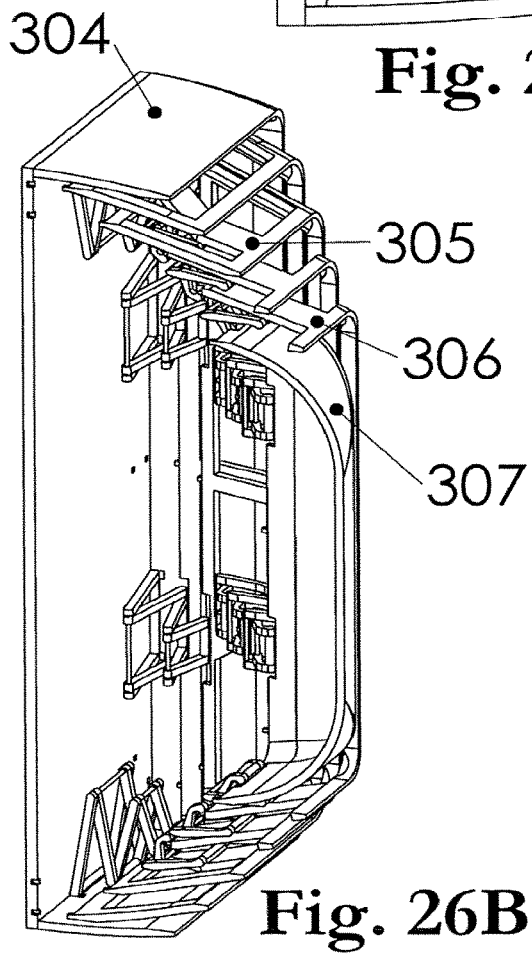
Figure 26C:
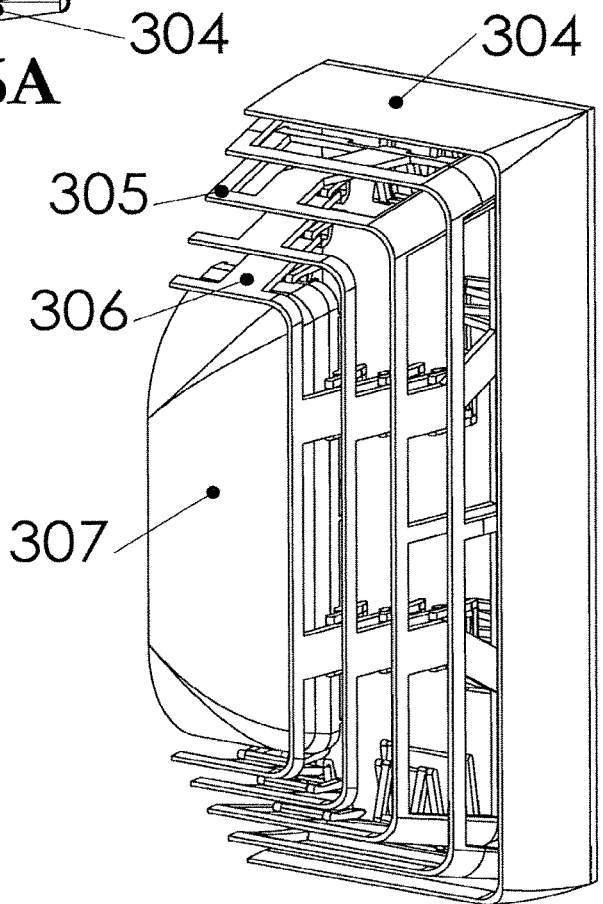

FIGS. 26A through 26C all show the right hand apparatus in the same partially extended configuration (also the same as shown in FIGS. 27A through 27E). The fabric has the form of a bellows attached to the trailing edges of the framework as shown in FIGS. 27A through 27C. In particular:

FIG. 26A shows a partial side elevation view. The approximate shape of the fabric in relation to the rigid components is shown.

FIG. 26B shows primarily the interior of the apparatus from the left rear corner. The fabric is not shown.

FIG. 26C shows primarily the exterior of the apparatus from the right rear corner. The fabric is not shown.

Figure 26D:
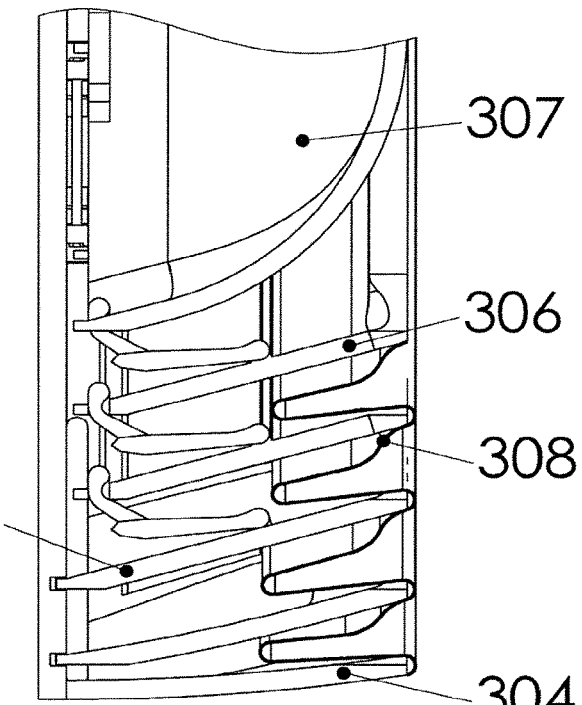
Figure 26E:
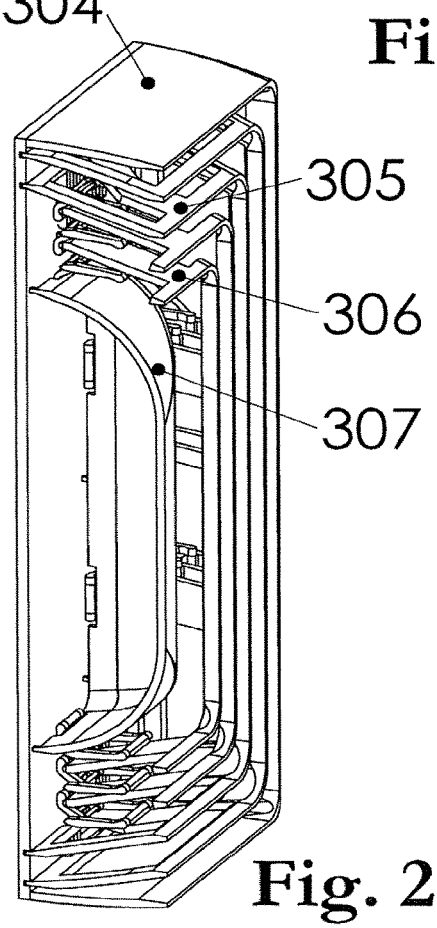
Figure 26F:
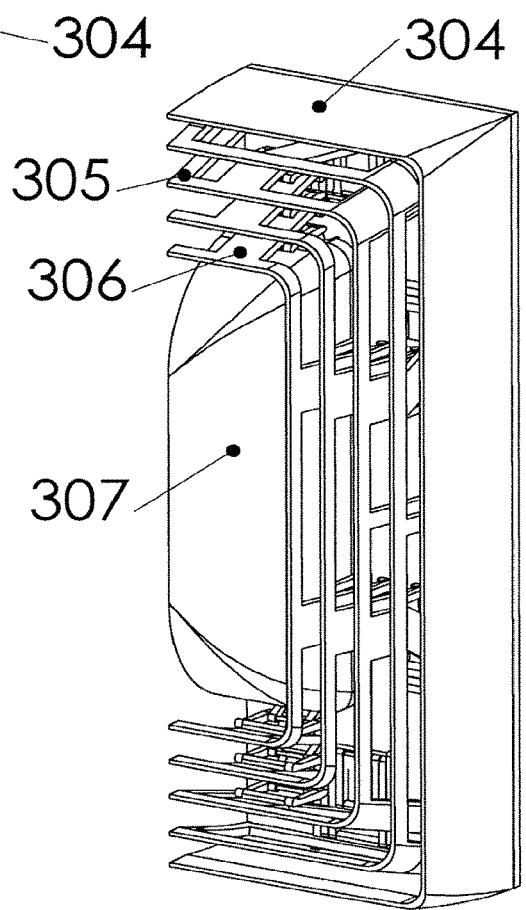
Figure 27I:
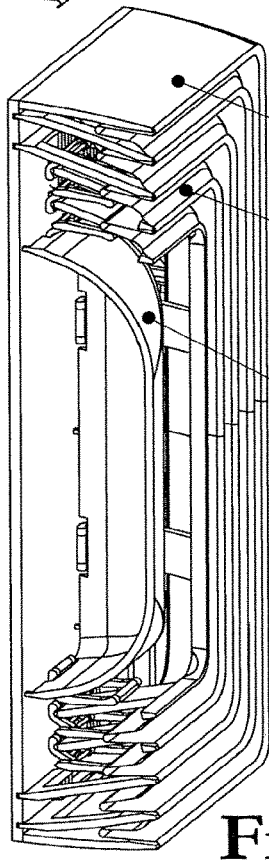
Figure 27J:
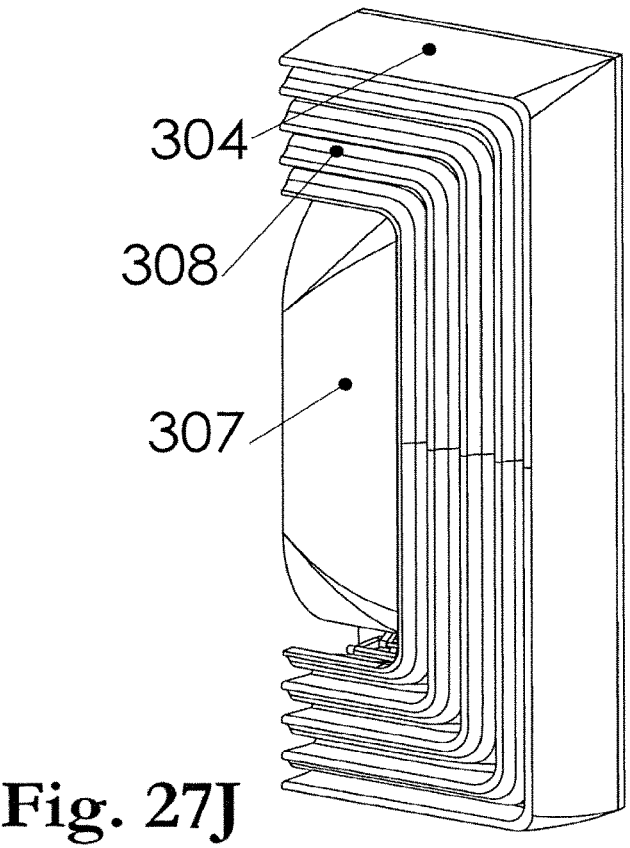

FIGS. 26D through 26F all show the right hand apparatus in the same fully retracted configuration (also the same as shown in FIGS. 27J). The fabric has the form of a bellows attached to the trailing edges of the framework as shown in FIGS. 27F through 27H. In particular:

FIG. 26D shows a partial side elevation view. The approximate shape of the fabric in relation to the rigid components is shown.

FIG. 26E shows primarily the interior of the apparatus from the left rear corner. The fabric is not shown.

FIG. 26F shows primarily the exterior of the apparatus from the right rear corner. The fabric is not shown.

FIGS. 27A through 27E all show the right hand apparatus in the same partially extended configuration that matches FIGS. 26A through 26C. In particular:

FIG. 27A through 27C show only the fabric. In particular:

FIG. 27A is shown in the same orientation as FIG. 26B.

FIG. 27B is an enlarged partial view with the same orientation as FIG. 27A.

FIG. 27C is shown in the same orientation as FIG. 26C.

FIG. 27D shows the apparatus, complete with fabric, in the same orientation as FIG. 26B.

FIG. 27E shows the apparatus, complete with fabric, in the same orientation as FIG. 26C.

FIGS. 27F through 27J all show the right hand apparatus in the same fully retracted configuration that matches FIGS. 26D through 26F. In particular:

FIG. 27F through 27H show only the fabric. In particular:

FIG. 27F is shown in the same orientation as FIG. 26E.

FIG. 27G is an enlarged partial view with the same orientation as FIG. 27F.

FIG. 27H is shown in the same orientation as FIG. 26F.

FIG. 27I shows the apparatus, complete with fabric, in the same orientation as FIG. 26E.

FIG. 27J shows the apparatus, complete with fabric, in the same orientation as FIG. 26F.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

The embodiment presented is also shown in various forms and shapes and with various optional features in various combinations. These variations also are exemplifications of the invention and are not intended to limit the combinations of forms, shapes, and optional features.

It should be further understood that the title of this section of this specification, namely, "Detailed Description of the Invention", relates to a requirement of the United States Patent Office, and does not imply, nor should be inferred to limit the subject matter disclosed herein.

Figure 1A:
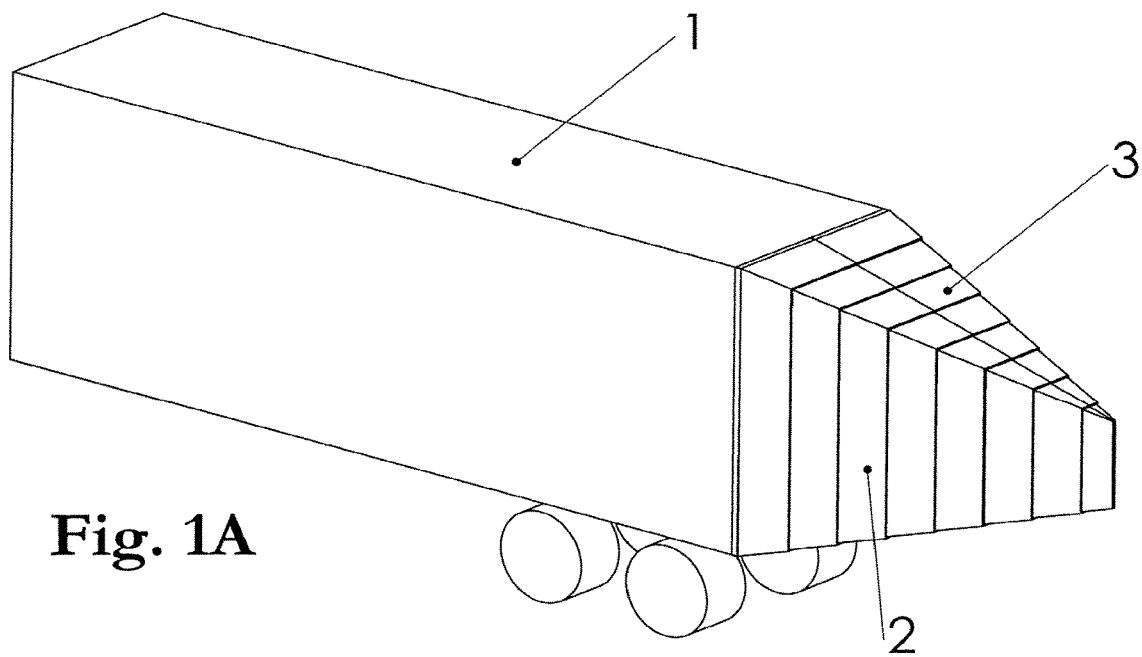
FIGS. 1A through 1E show a basic form of the present invention mounted on the rear of an over-the-road trailer in various configurations. In this form, the aerodynamic drag reducing apparatus is in two halves, split right and left. The right and left halves are opened for access to the rear of the trailer. In particular.
Figure 1B:
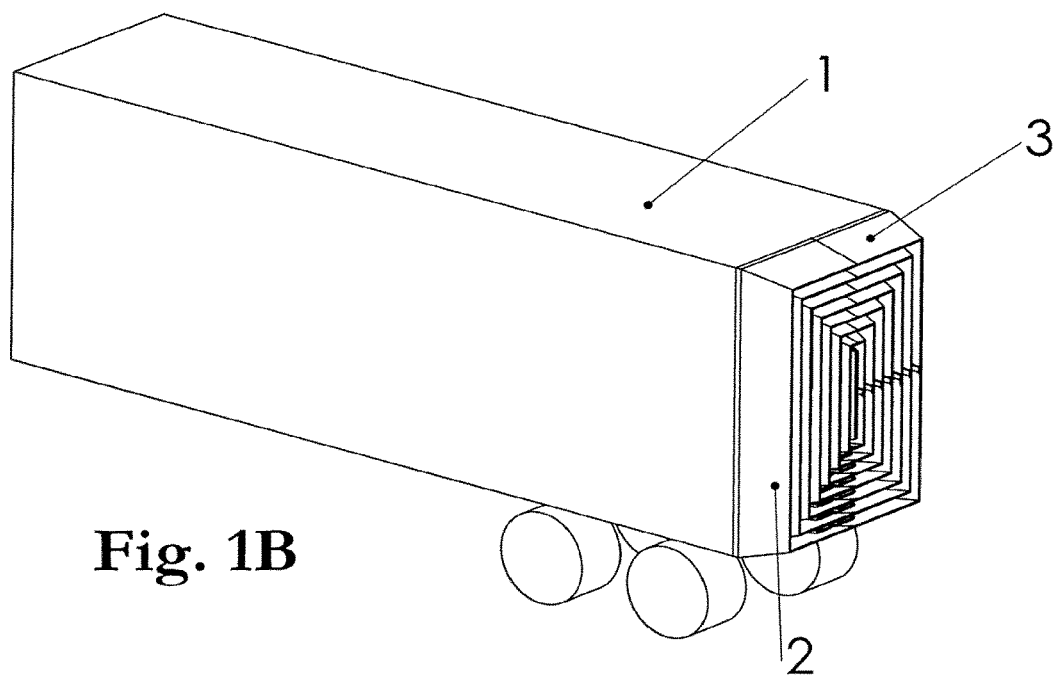
Figure 1C:
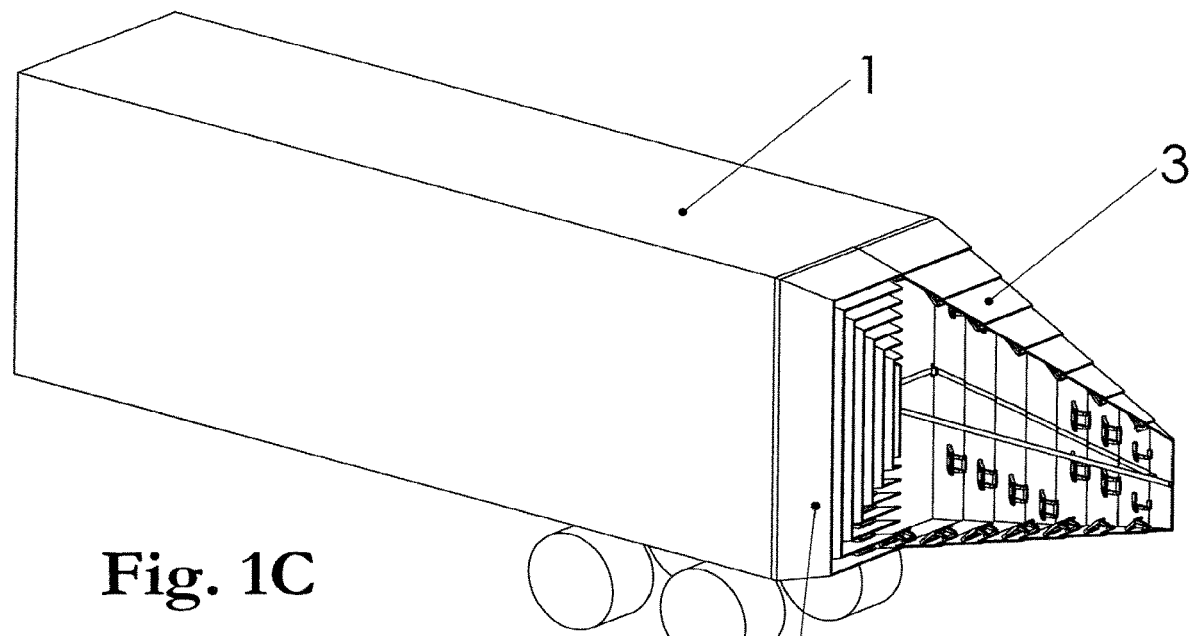
Figure 1D:
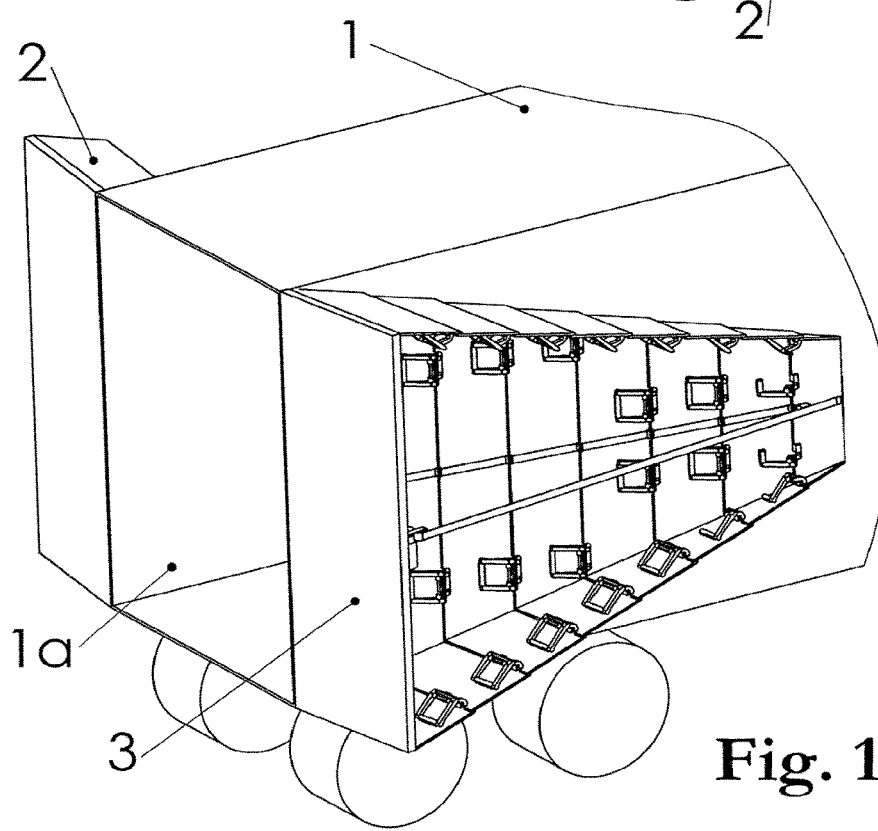
Figure 1F:
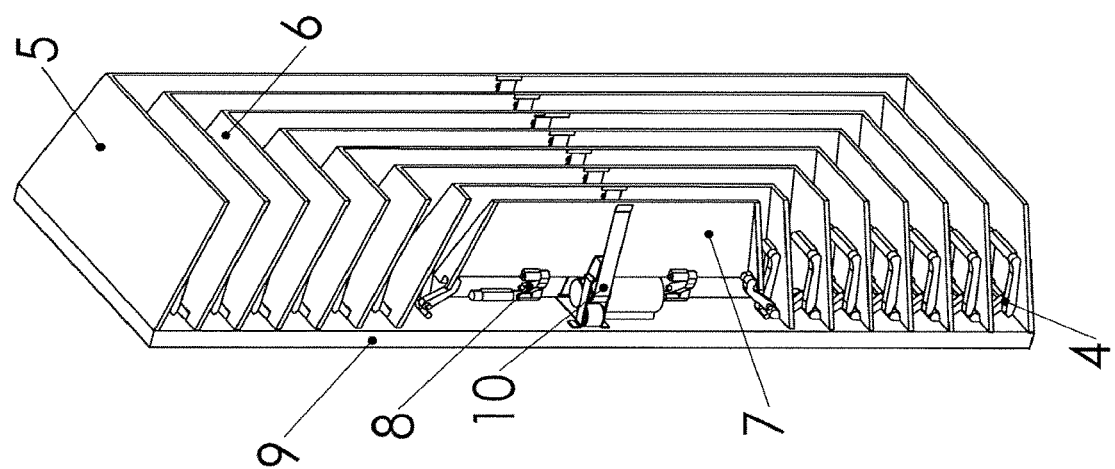
FIG. 1F is a perspective view showing the right apparatus fully retracted.
Figure 1E:
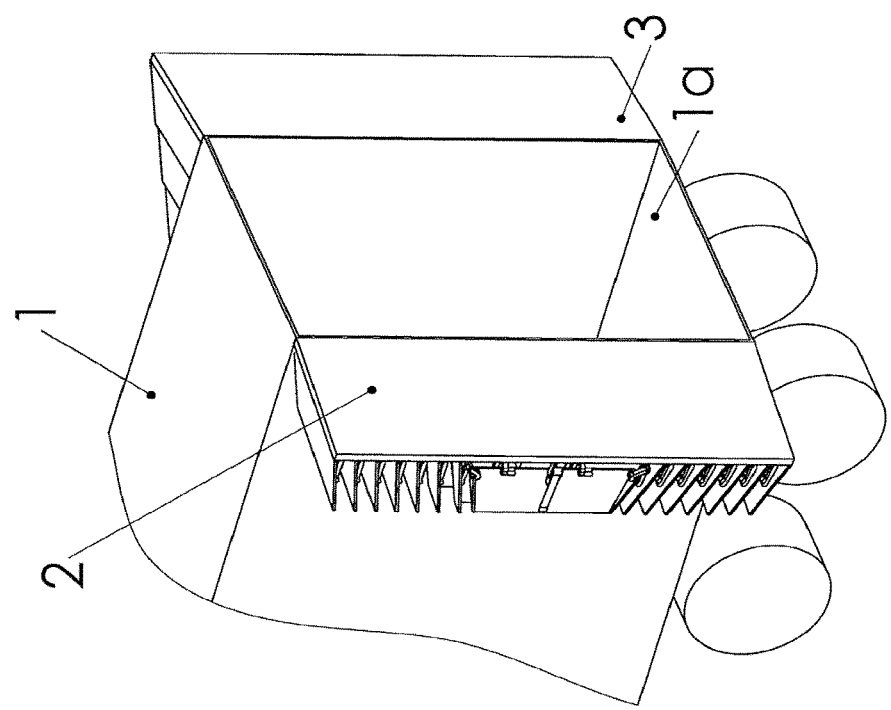

Referring now to the figures, in particular to FIGS. 1A through 1E and 1G, there is shown an exemplary over-the-road trailer 1 with an enclosed cargo holding area 1a. On the back end of the trailer 1, a left hand apparatus 2 and a right hand apparatus 3 are mounted and shown in various configurations. FIGS. 1F, 1H, and 1I show the right hand apparatus in detail in various configurations including a rear door 9 of the trailer 1 which, in this embodiment, serves as a mounting platform for the right hand apparatus 3 and is also part of the apparatus 3. The left hand apparatus 2 is a mirror image of the right hand apparatus 3. For gaining access to the cargo holding area 1a of the trailer 1, the apparatuses 2 and 3 are opened as typical trailer doors.

If the apparatuses 2 and 3 are symmetric in a vertical direction, as they are shown here, they can be identical with each other. In this case, the apparatuses 2 and 3 are simply assembled to the trailer 1 upside down from each other.

There are trailers and other vehicles that neither have rear doors nor need access to the rear of the vehicle. For these applications, the apparatuses 2 and 3 could be combined together, joined at their common edges. This would result in fewer parts and less weight.

FIGS. 1F, 1H, and 1I reveal other features of a typical apparatus 2 or 3 in addition to the door/mounting platform 9. In this section of the disclosure, the placement position of the features and components is described with respect to a fully deployed apparatus as shown in FIG. 1I. Immediately behind and fixedly connected to the door/mounting platform 9 are an optional extension-retraction system 10 and the first panel assembly 5. A plurality of intermediate panel assemblies 6, each having a different size but sharing the same features, follows the first panel assembly 5. The last panel assembly 7 immediately follows the last intermediate panel assembly 6. Connecting the various panel assemblies 5, 6, and 7 to each other are sets of extension-retraction linkage assemblies 4 or 8. Linkage assemblies 4 and 8 perform the same function, but linkage assembly 8 is narrower in the direction of its pivot axis and is used between the rearward panel assemblies 6 and 7 where there is less available space.

A set of extension-retraction linkage assemblies 4 or 8 holds each intermediate panel assembly 6 to the panel assembly 5 or 6 immediately in front of it. A second set of linkage assemblies 4 or 8 holds each intermediate panel assembly 6 to the panel assembly 6 or 7 immediately to its rear. In this way, all panel assemblies 5, 6, and 7 are held to each other in series with a set of linkage assemblies 4 or 8 between each. The linkage assemblies 4 or 8 in each set allow linear movement between each panel assembly 5, 6, or 7 and its neighbor(s). To accomplish the linear movement, at least two linkage assemblies 4 or 8 are required in each set. Each linkage assembly 4 or 8 by itself constrains the panel assembly 6 or 7 connected to its rear to move in a plane perpendicular to its joint axes of rotation. If two linkage assemblies 4 or 8 have corresponding axes that are collinear, the panel assembly 6 or 7 is still constrained to move in a perpendicular plane. However, if the corresponding axes are coplanar, but not collinear, a second planar constraint is formed. In this case, the two planar constraints combine to form a linear constraint at their common intersection. This is the method the present invention employs. Additional linkage assemblies 4 or 8 may be used to distribute the loads transferred between panel assemblies 5, 6, or 7 among more connection locations.

Referring to FIGS. 2A through 2H, the extension-retraction linkage assembly 4 and its components and features are shown. The linkage assembly 4 consists of two links 11 and 12 that rotatably connect to each other with the cylindrical surface 16 of link 11 forming a joint with the cylindrical surface 18 of link 12. This joint is constrained such that it effectively rotates about the common centerlines of the above surfaces. Provisions are made that effectively restrict any linear movement along the common centerlines. A torsional spring 13 is also included along the above joint that tends to cause the cylindrical surfaces 14 and 20 at the ends of the linkage assembly 4 to extend away from each other.

To keep the linkage assembly 4 from overextending, a stop 17 is provided on link 11 that contacts a surface 21 on link 12. Unless an external force is acting on the linkage assembly 4, the spring 13 keeps the stop 17 and stop surface 21 in contact with each other with a certain amount of preload. The various features of link 11 are held in place by one or more link arms 15. The various features of link 12 are held together by one or more link arms 19. When assembled, the centerlines of the cylindrical surfaces 14, 16, 18, and 20 are all parallel with each other.

The extension-retraction linkage assembly 4 also connects to the various panel assemblies 5, 6, and 7 as mentioned above and described below. Panel assemblies 5 and 6 have interior cylindrical surfaces 23 and 24 that rotatably connect to cylindrical surface 14 of link 11. Likewise, panel assemblies 6 and 7 have cylindrical surfaces 26 and 27 towards their upstream edge that rotatably connect to cylindrical surface 20 of link 12. As shown in FIGS. 3A through 3C, 3E, and 3F, the centerlines of surfaces 23 and 24 are coplanar, but not collinear. Likewise, as shown in FIGS. 3B through 3F, the centerlines of 26 and 27 are coplanar, but not collinear. This geometry satisfies the above requirement to produce linear movement between adjacent panel assemblies 5, 6, and 7 when used with two or more linkage assemblies 4 or 8 as described above.

The panel assemblies 5, 6, and 7 are each constructed from a set of panels 22 that also locate the various features described above. Notches 29 are cut into the upstream edge of the panels 22 as required to provide clearance with the linkage assemblies 4 and 8 as they travel through their range of motion.

Figure 5:
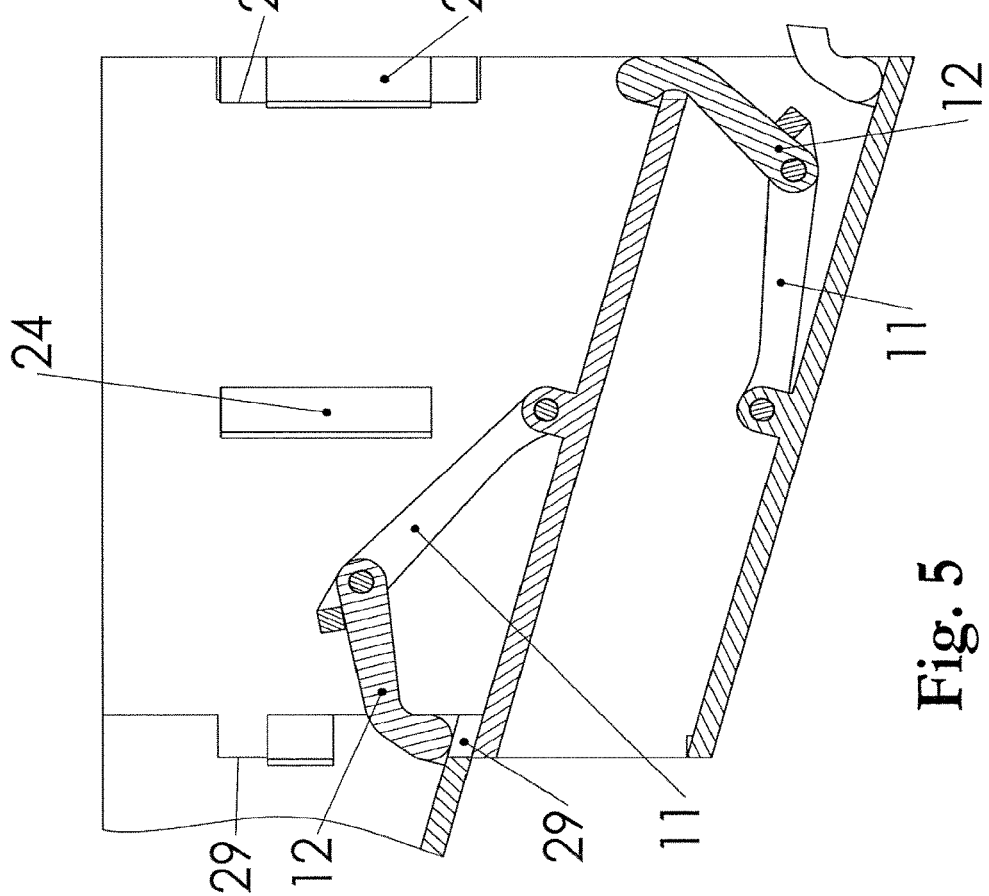
FIG. 5 is a partial section view showing two linkage assemblies from end to end. The first linkage assembly is between a fully retracted pair of panel assemblies. The second linkage assembly is between a fully extended pair of panel assemblies. In both cases, the linkage assemblies themselves are fully extended. Since the linkage assemblies are spring-loaded to seek this fully extended configuration, the apparatus will seek either the extended or retracted configurations between each set of neighboring panels. The linkage assemblies also form a mechanical stop to keep the apparatus from over extending or over retracting, holding each pair of neighboring panels either in the extended or retracted position. This is very desirable since those two configurations are sought in operation, and movement drifting toward an intermediate position would either lose aerodynamic performance, if drifting from the extended configuration, or occupy more volume, if drifting from the retracted position. The view's section cut is taken through the linkage component that attaches to the upstream edge of the panel assemblies and is perpendicular to the pivot point within the linkage assembly. The section cut is shown in FIG. 5X.
Figure 5X:
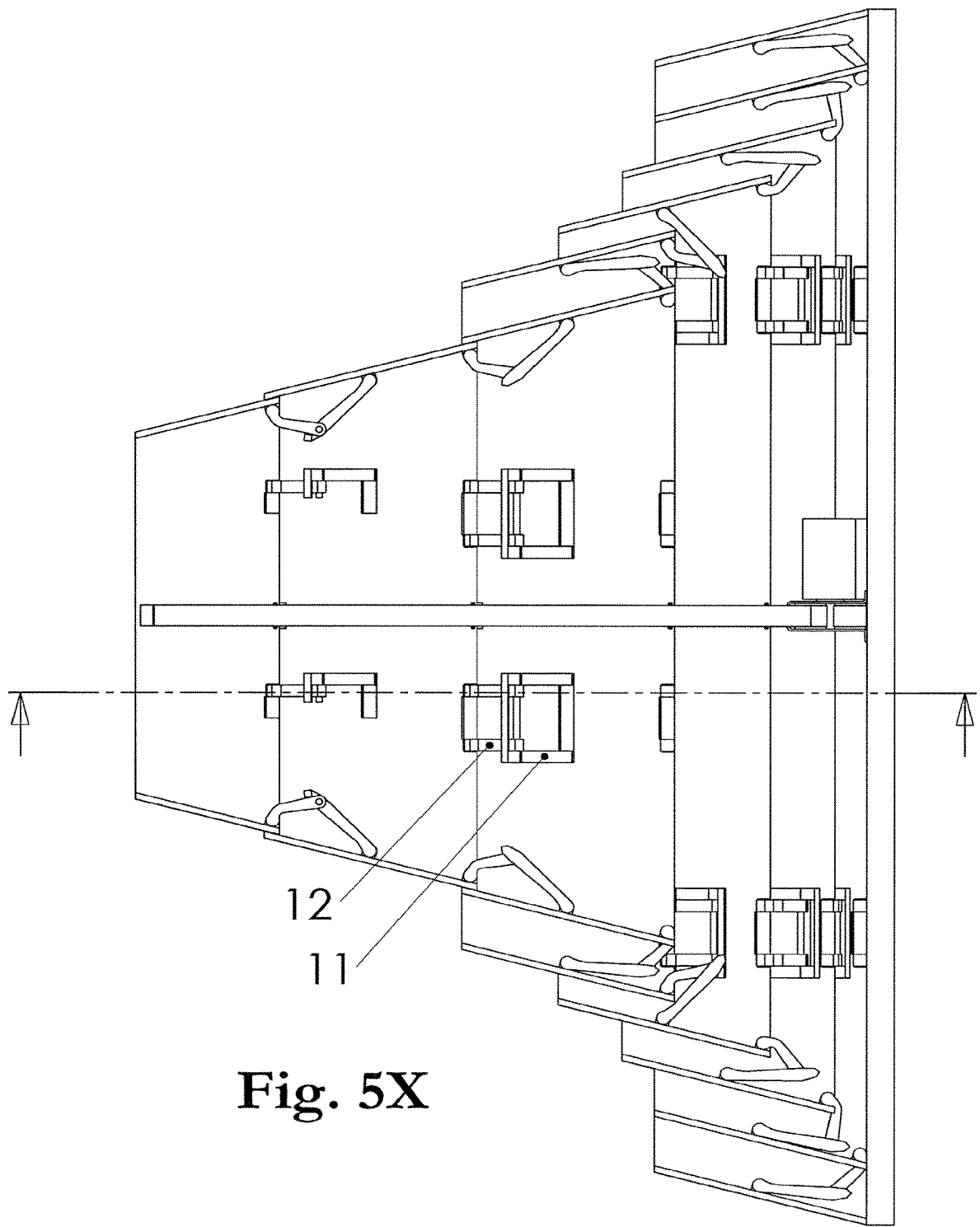
FIG. 5X is an elevation view showing the interior of a typical panel assembly. It also shows the section cut used to create FIG. 5.
Figure 8A:
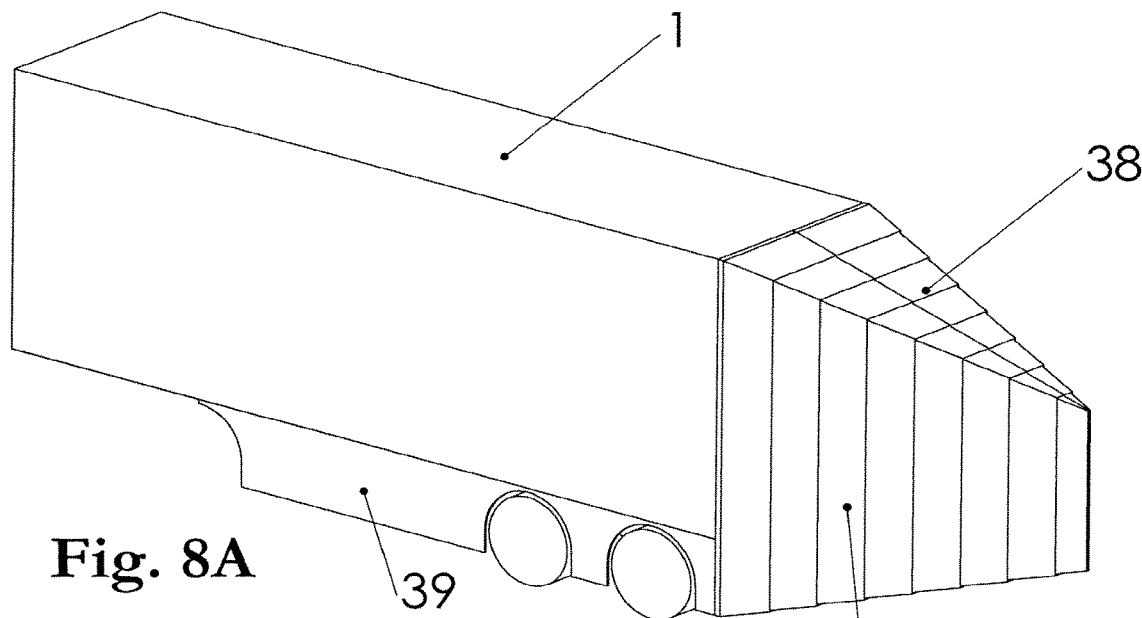
FIGS. 8A through 8D show an extended height form of the present invention mounted on the rear of an over-the-road trailer in various configurations. In this form, the aerodynamic drag reducing apparatus is in two halves, split right and left. The right and left halves are opened for access to the rear of the trailer. In addition, trailer skirts are shown. In particular.
Figure 8B:
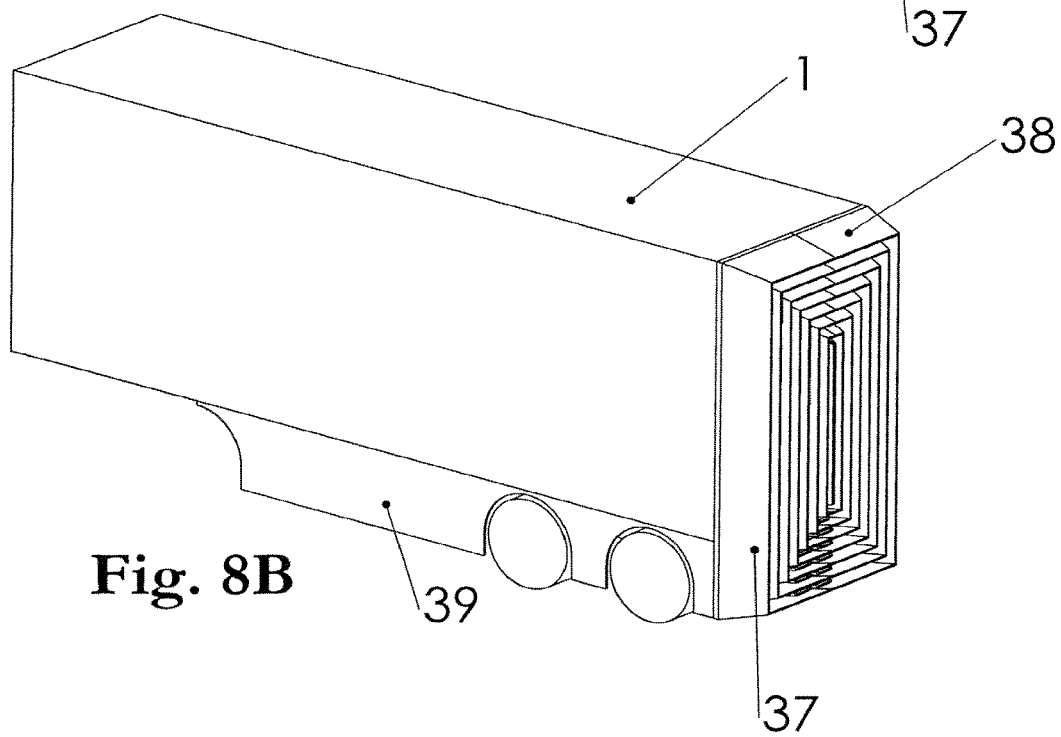
Figure 8C:
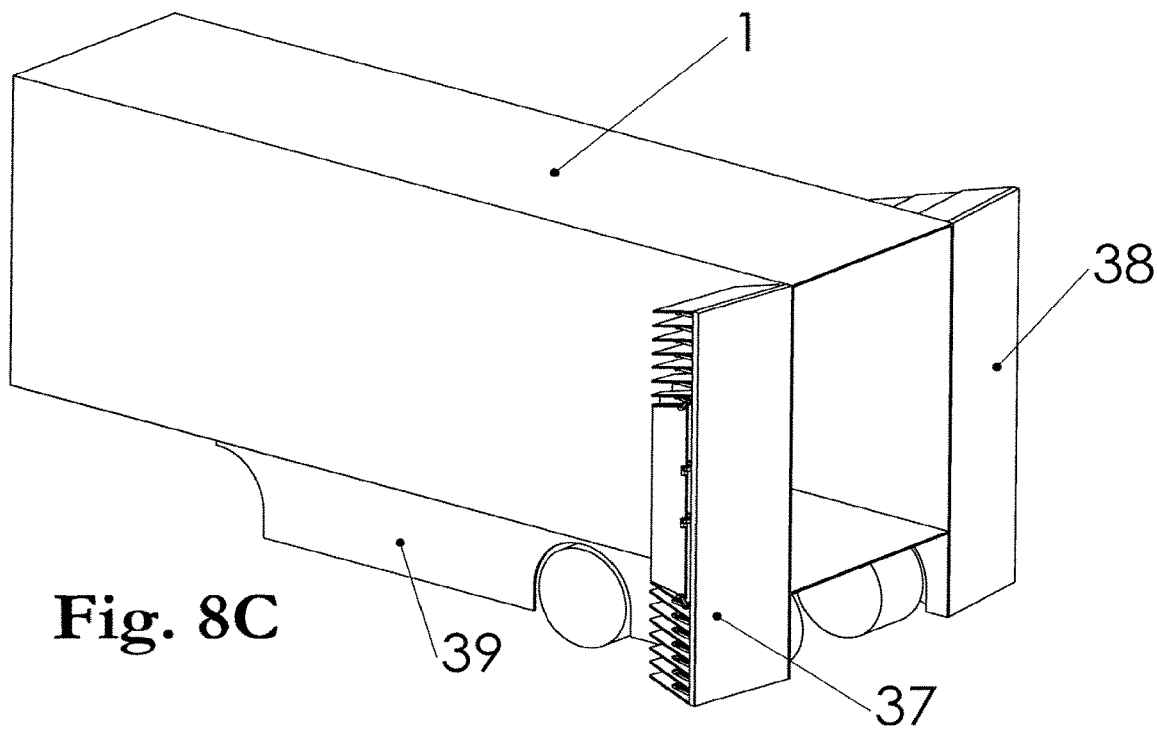
Figure 8D:
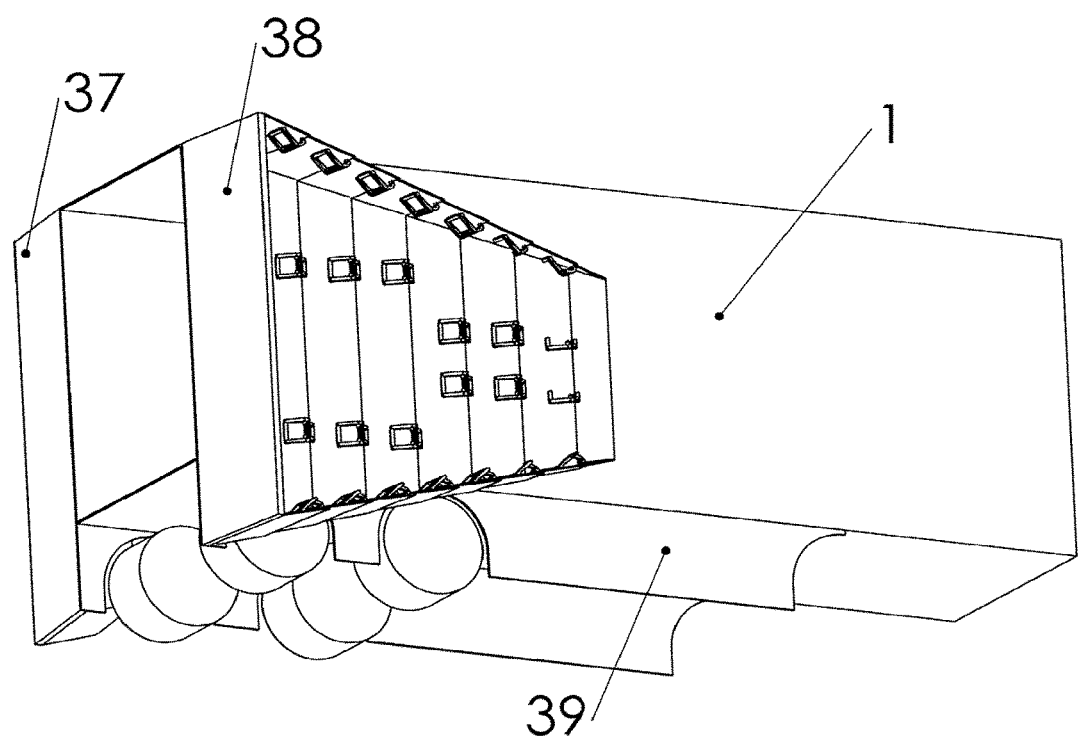
Figure 9A:
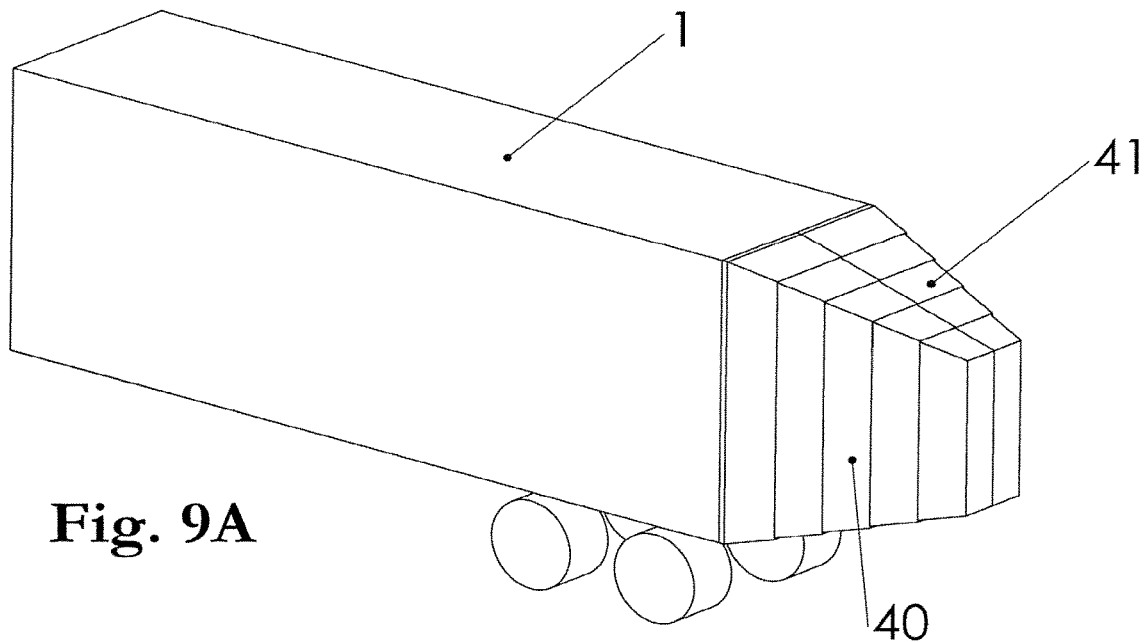
FIGS. 9A through 9D show a truncated length form of the present invention mounted on the rear of an over-the-road trailer in various configurations. In this form, the aerodynamic drag reducing apparatus is in two halves, split right and left. The right and left halves can be opened for access to the rear of the trailer. In particular.
Figure 9B:
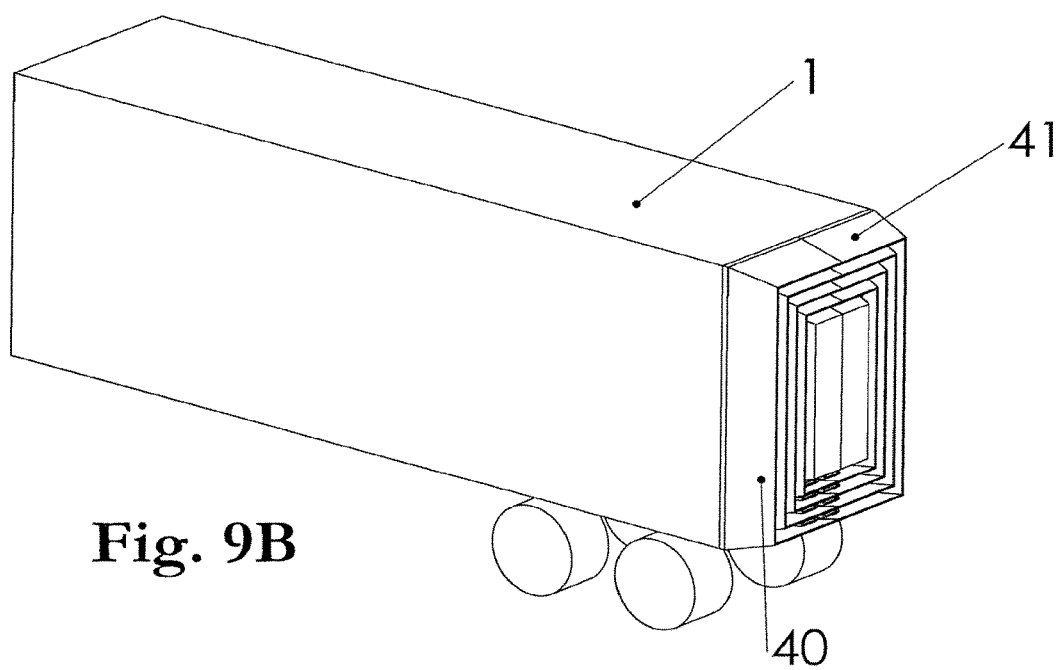
Figure 9C:
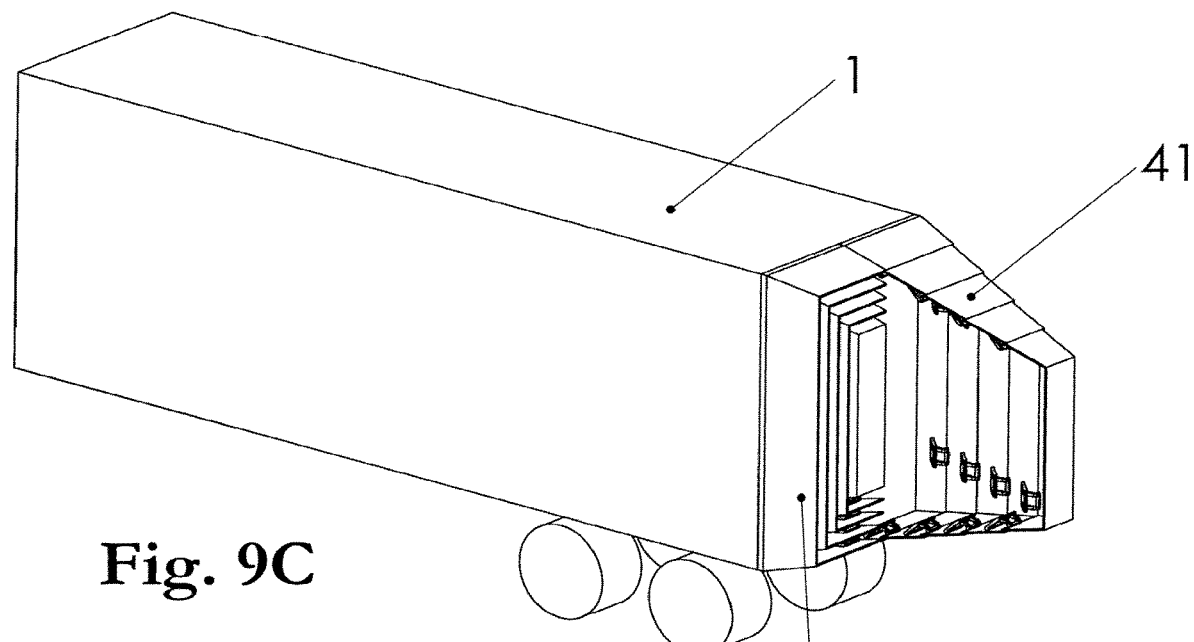
Figure 9D:
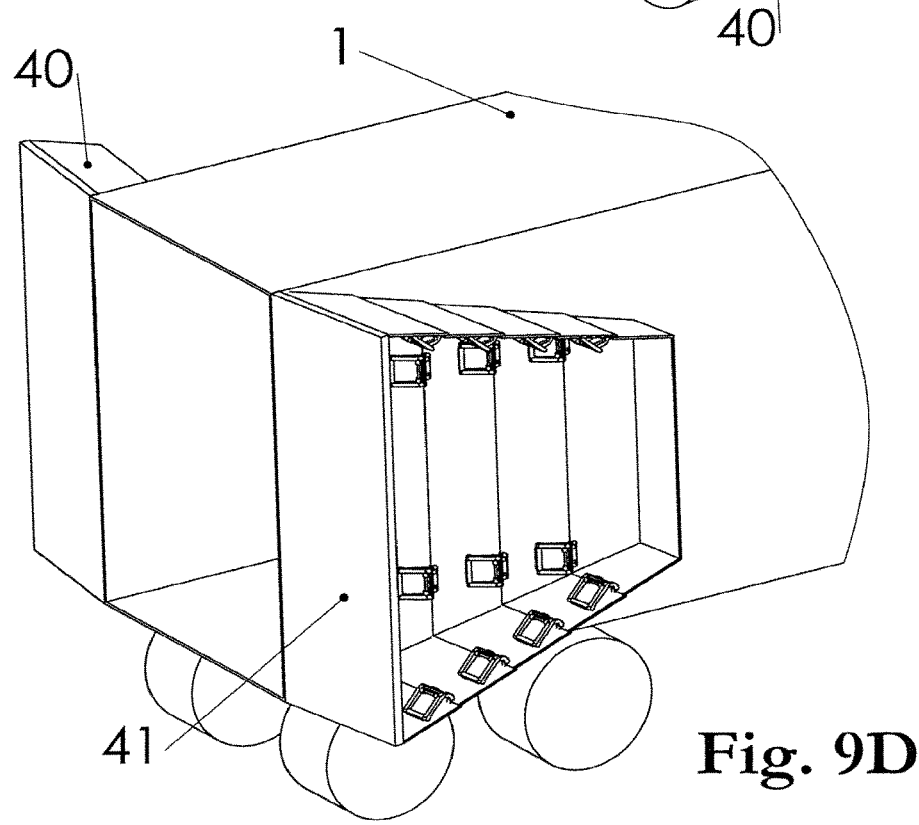
Figure 10A:
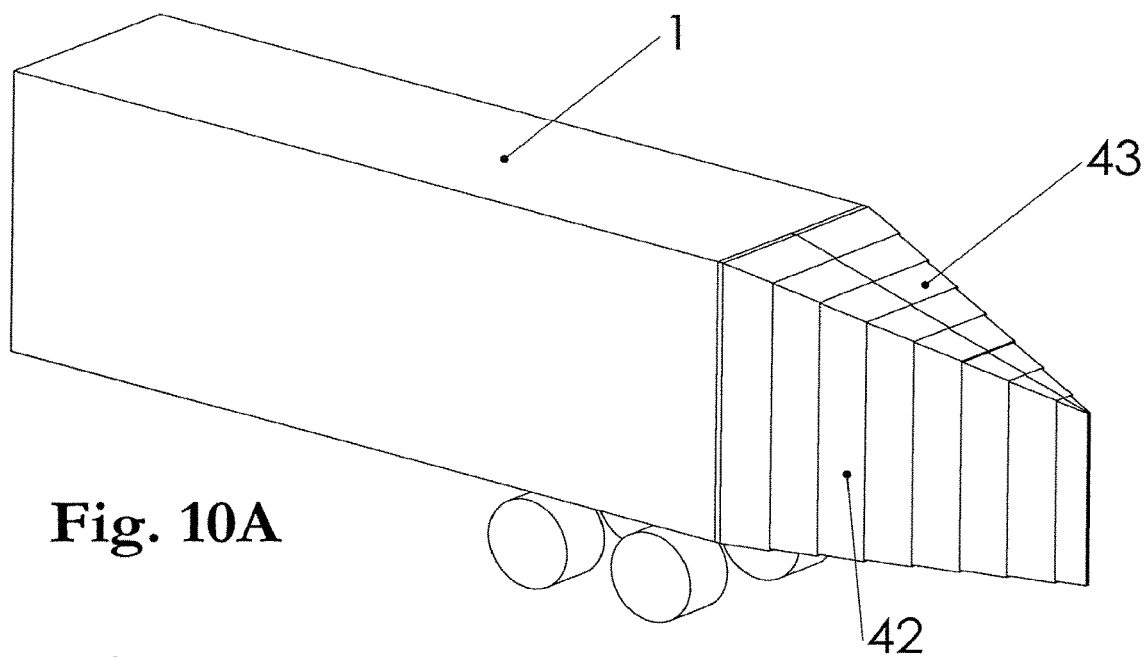
Figure 10B:
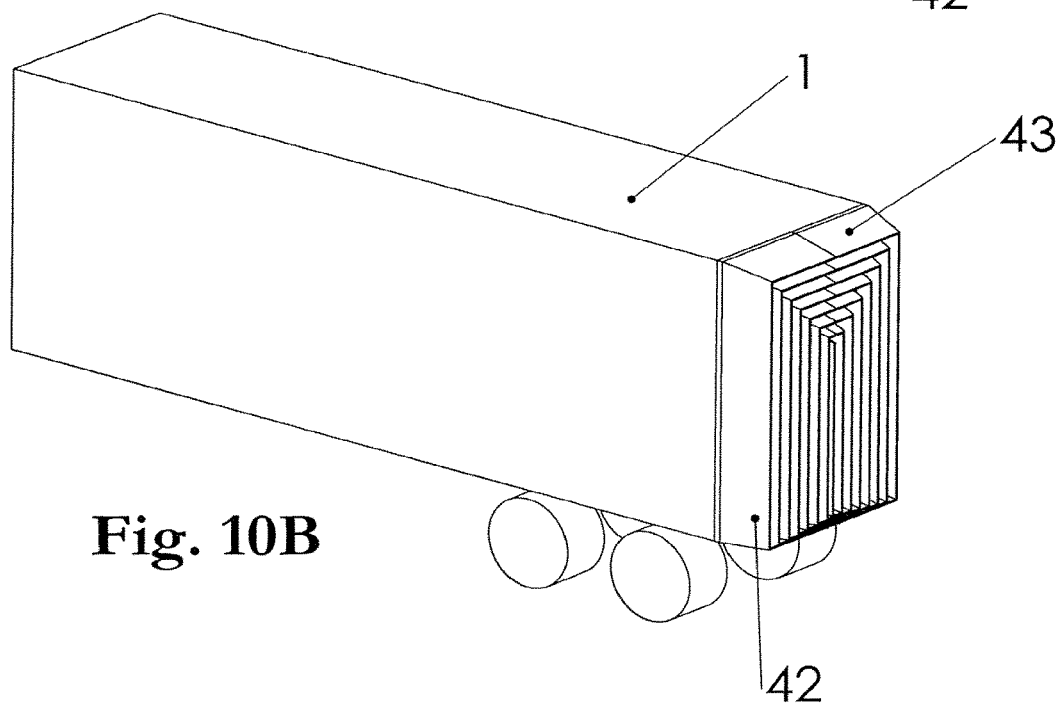
Figure 10C:
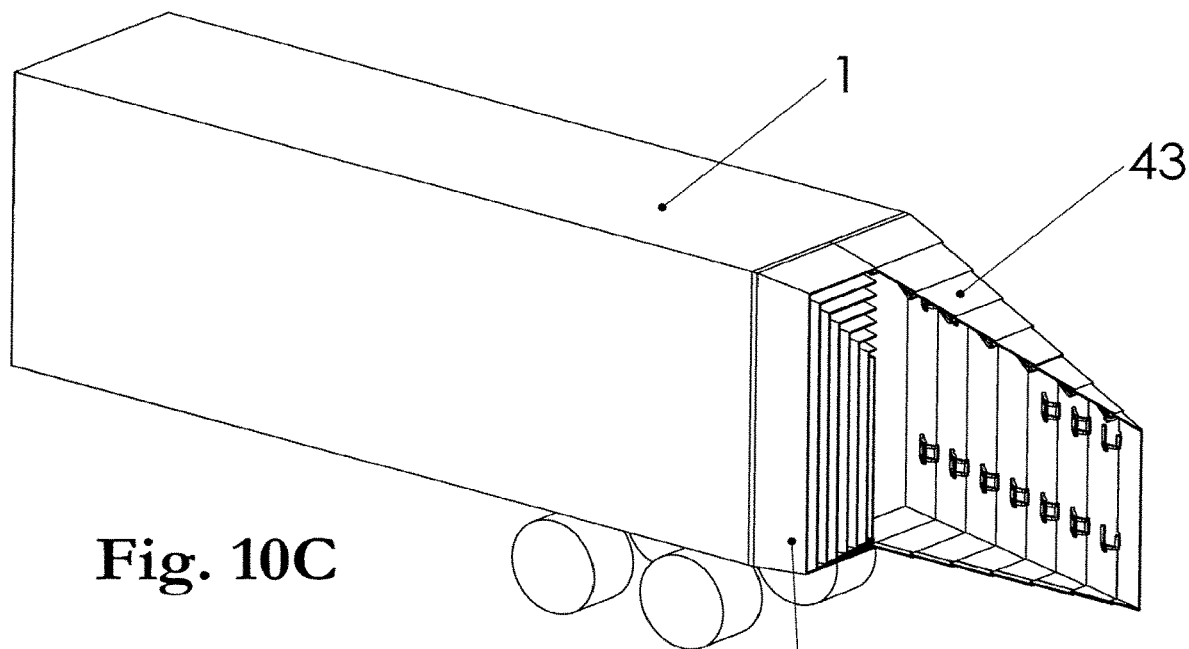
Figure 10D:
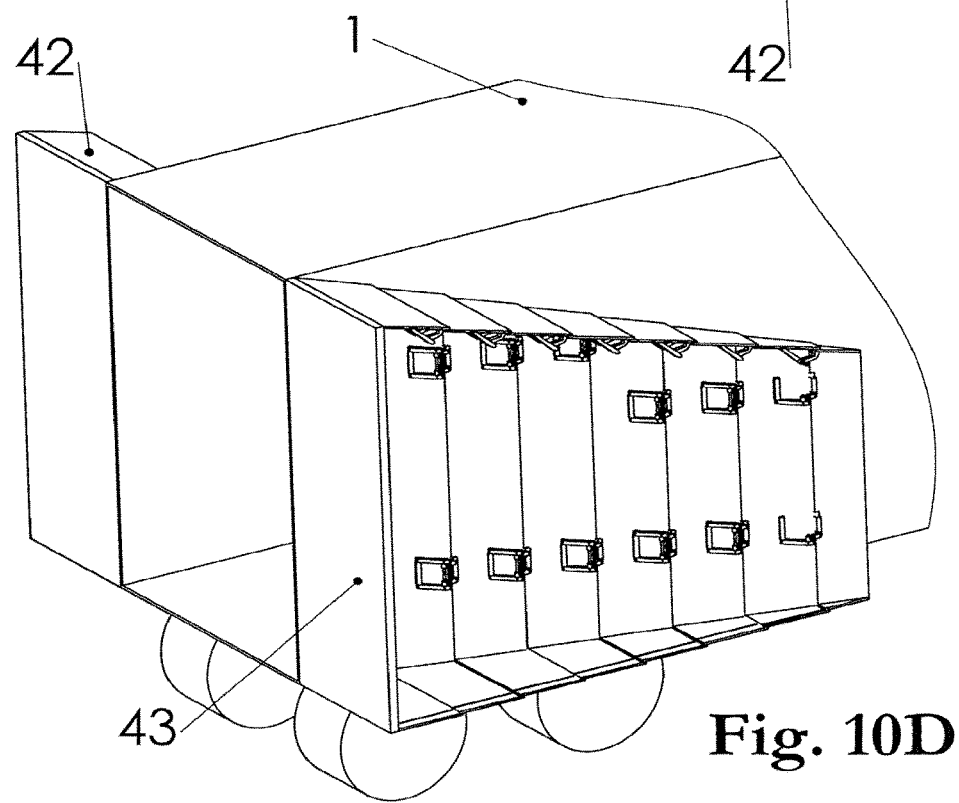

There are other benefits provided by the linkage assemblies 4 or 8 and panel assemblies 5, 6, and 7 when used together as described above. One is the travel-stop function that keeps the panel assemblies 5, 6, and 7 from over retracting and over extending. FIG. 5 illustrates this by showing two linkage assemblies 4 extended against their respective stops 17. The pair of panel assemblies 6 shown higher in the figure is fully extended and is prevented from extending farther by the stop 17 on the linkage assembly 4. Likewise, the lower pair of panel assemblies 6 are fully retracted and prevented from retracting farther by the stop 17. A second benefit is the self-return function. When each linkage assembly 4 or 8 is spring loaded against its stop 17, each pair of panel assemblies 5, 6, and 7 connected to them has only two stable positions—fully extended and fully retracted. If the pair of panel assemblies 5, 6, and 7 are put in another configuration and released, the spring 13 will return the pair to one of the two stable positions. This feature allows the apparatuses 2 and 3 to be set in an extended or retracted configuration and keep this position until the opposite configuration is desired.

Figure 4X:
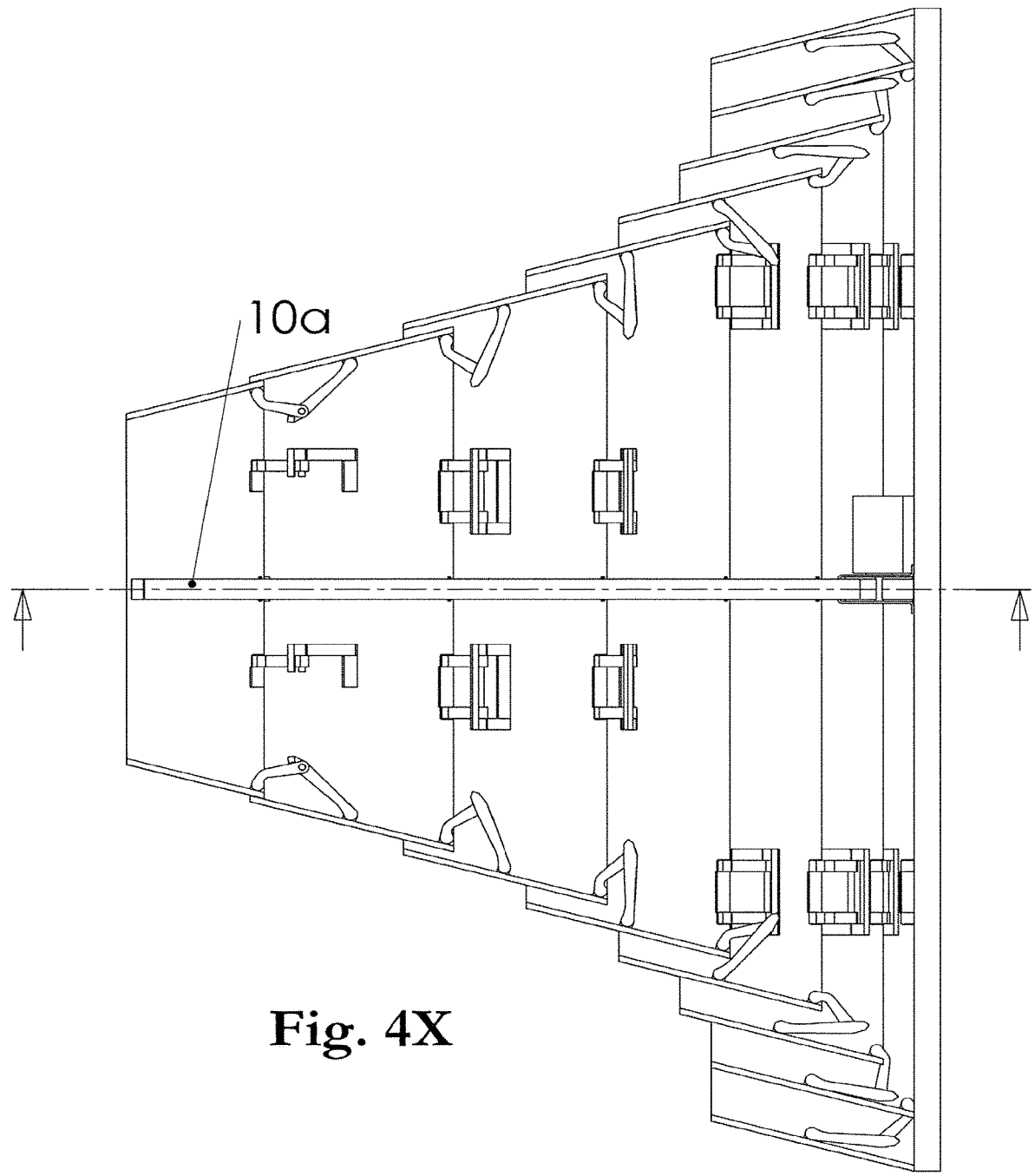
FIG. 4X is an elevation view showing the interior of the apparatus. It also shows the section cut used to create FIGS. 4B and 4C.
Figure 6A:
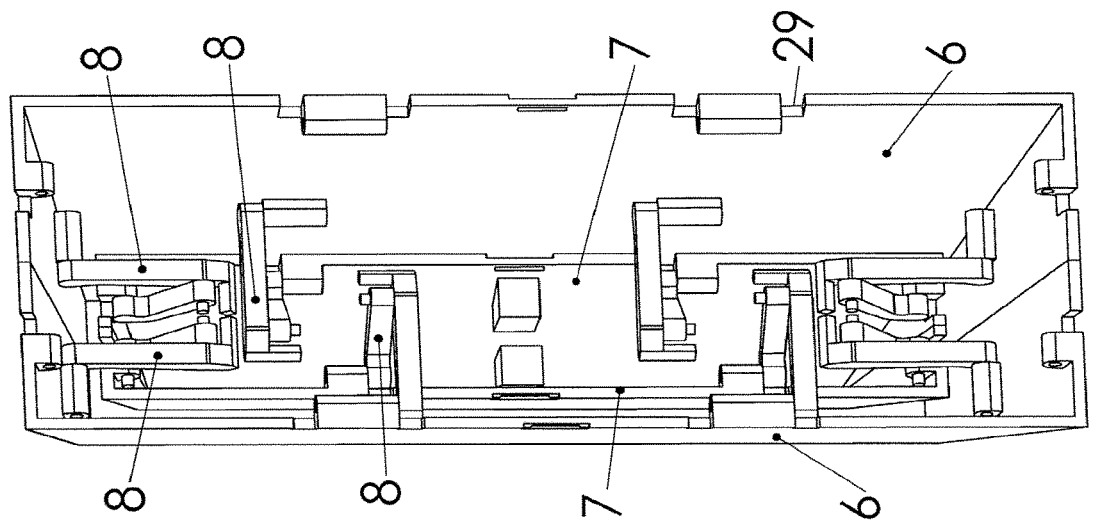

If desired, an optional feature can be incorporated on the apparatuses 2 and 3 that allows for remote, powered extension and retraction. FIGS. 4A through 4C illustrate this extension-retraction system 10 as applied to the current form. FIG. 14K also illustrates this extension-retraction system as applied to a similar form. The larger scale of FIG. 14K shows the routing of the extension-retraction web 10a more clearly. FIG. 3F shows a typical panel assembly 6 cross-section and highlights the web routing features 25 and 28. To operate the extension-retraction system 10, a drive motor 32 rotates a connected drive pulley 33, which moves a web 10a in one direction when turning clockwise and the opposite direction when turning counter-clockwise. As shown, the web is kept under tension by a pair of tensioning pulleys 35 which also serve to keep most of the drive pulley 33 in contact with the web 10a. A corner idler pulley 34 is also employed near the joint between the first panel assembly 5 and the trailer door/mounting platform 9. The web 10a is attached on each end to the last panel assembly 7. One end is attached at a downstream connection point 31, and the opposite end is attached at an upstream connection point 30.

The operation of the extension-retraction system 10 is described below. If retraction is desired, the drive motor 32 is made to turn counter-clockwise as shown in FIG. 4B. This causes a tension increase in the section of web 10a between the drive motor pulley 33 and web connection point 31. The increase in tension pulls the last panel assembly 7 towards the first panel assembly 5. Since the panel assemblies 5, 6, and 7 and linkage assemblies 4 and 8 are connected in series, the entire linkage-panel chain feels a force pulling it towards the first panel assembly 5. At a certain point as the tension force increases, the spring 13 preload forces in a certain set of linkage assemblies 4 or 8 are overcome. This causes the pair of panel assemblies 5, 6, or 7 on either side of the overcome set of linkage assemblies 4 or 8 to switch to a retracted configuration. As the drive motor 32 continues to turn, the panel assemblies 5, 6, and 7 each switch to a retracted configuration until the entire apparatus 2 or 3 is in the retracted configuration. With certain options described below, it may be desirable to have the panels retract in a predetermined sequence. To accomplish this, the linkage preload springs 13 may be customized for each linkage assembly 4 or 8 set putting weaker springs on those sets that are desired to retract first and stronger springs on those sets that are desired to retract last.

If it is desired to extend the apparatus 2 and 3, the drive motor 32 is made to turn clockwise as shown in FIG. 4B. This causes a tension increase in the section of web 10a between the drive motor pulley 33 and the web connection point 30. The increase in web 10a tension between web routing features 25 and 28 on the same panel assembly 6 is reacted by internal stresses within the panel assembly 6. The increase in web tension between panel assemblies 5, 6 and 7 results in a force pulling the upstream edge of the downstream panel assembly 6 or 7 toward the downstream edge of the upstream panel assembly. This force is initially resisted by the spring 13 preload force in the linkage assemblies 4 and 8. At a certain point as the tension force increases, the spring 13 preload force in a certain set of linkage assemblies 4 or 8 is overcome. This causes the pair of panel assemblies 5, 6, or 7 on either side of the overcome set of linkage assemblies 4 or 8 to switch to an extended configuration. As the drive motor 32 continues to turn, the panel assemblies 5, 6, and 7 each switch to an extended configuration until the entire apparatus 2 or 3 is in the extended configuration.

A benefit of the extension-retraction system 10 as described above is that the routing length of the web 10a remains nominally the same regardless of the configuration of the panel assemblies. This avoids the need for a web 10a take up and storage system.

If a larger radius on the web guiding features 25 and 28 within the panel assemblies 5 and 6 is required, either the panel assembly can be made thicker or the features 25 and 28 could be made to protrude outside the existing panel assembly 5 and 6 boundary. The protrusion could either be covered or left open to the environment. This will likely cause a small increase in drag, but may render the present invention more robust.

A space is reserved for the extension-retraction motor 32, drive pulley 33, tensioning pulleys 35, and related mounting hardware by making the last panel assembly 7 shorter in depth than the other panel assemblies 5 and 6. When retracted, the last panel assembly 7 is positioned to the rear of the drive motor 32, but remains within the overall contours of the retracted apparatus 2 and 3. In the case that the extension-retraction system 10 is not used, or in the case that the form of the invention provides a space for the motor 32 and its related items to occupy (as with apparatuses 40, 41, and 72), the panel assemblies 5, 6, and 7 should be the same depth to minimize the volume required in the retracted configuration.

Each apparatus may require its own extension-retraction system 10. It would also be possible for one apparatus 2 or 3 to drive the other apparatus 2 or 3. This could be done by forming some type of connection such as pins and pinholes across the halves. These connections could also provide structural reinforcing from one half to the other.

As shown in FIGS. 7A and 7B, vortex generators 36 may be added to the exterior of certain panel assemblies 5, 6, and 7. Vortex generators 36 are formed by adding a relatively small protrusion to the exterior surfaces. Their purpose is to add a small amount of turbulence to the airflow in their local area in the form of a small vortex. The goal of adding turbulence is keeping the airflow attached over a larger area of the exterior of the apparatus 2 and 3. If the vortex generators 36 are added sufficiently downstream on the panel assemblies 6 and 7, they will tuck inside the adjacent upstream panel assemblies 5 and 6 when the apparatuses 2 and 3 are retracted.

The descriptions above focused on a basic form and shape of the present invention and included certain optional features. The basic form above is thought to provide the lowest cost solution with acceptable performance for over-the-road trailers 1 and also provide access to the enclosed trailer volume 1a. Just as vehicles and trailers come in various forms and are operated in many different environments with many different requirements, there are also different adaptations of the present invention. Some of these will be discussed below.

There are known trailer skirts 39 that may be added to over-the-road trailers as shown in FIGS. 8A through 8D. These trailer skirts 39 could be combined with the present invention in the basic form described above and exemplified by apparatuses 2 and 3. However, a greater reduction in aerodynamic drag could be achieved by employing the trailer skirts 39 in combination with vertically lengthened apparatuses 37 and 38 as shown in FIGS. 8A through 8D. These apparatuses 37 and 38 differ from the basic apparatuses 2 and 3 only by an increase in the length of the vertical panels 22. It may be desirable to add additional linkage assemblies 4 or 8 along the length of these extended panels 22 to further distribute the load.

Upon testing, it may be found that significant airflow separation occurs somewhere along the length of the fully extended apparatuses 2 and 3. Testing may also reveal that there is little benefit provided by extending the apparatuses 2 and 3 until a vertex is formed, and the extra weight and cost is not worth the small benefit. Highway regulations may also limit the maximum length of the vehicle of trailer. In these cases, it may be desirable to use a truncated form of the apparatuses 40 and 41 as shown in FIGS. 9A through 9D.

Upon testing, it may be found that better aerodynamic performance is gained by reducing the slope of one or more surfaces. This can be accomplished by replacing the linkage assemblies 4 or 8 and related attachment points 23, 24, 26 and 27 and notches 29 with linear sliding joints as shown in FIGS. 10A through 10G on apparatuses 42 and 43. To accomplish this, the panel assembly 44 is fitted with a key 45 and way 46 that engage the key 45 and way 46 of adjacent panel assemblies 44.

Figure 11A:
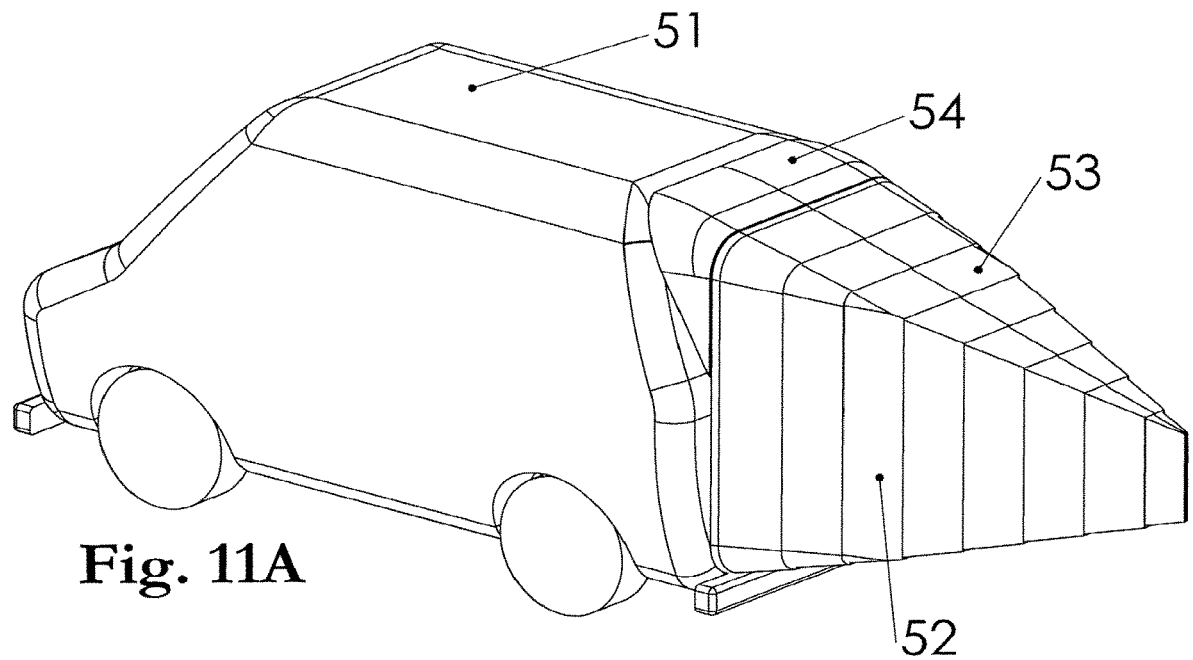
FIGS. 11A through 11C show a form of the present invention mounted on the rear of a minivan in various configurations. In this form, the aerodynamic drag reducing apparatus is in two halves, split right and left. An aerodynamic fairing is also used to fill the gap between the non-planar rear of the vehicle and the apparatus. The right and left halves can be opened for access to the rear of the vehicle. These three perspective views are taken from the left rear corner of the vehicle and are shown with access to the rear doors of the minivan closed. The extension-retraction web and its related features are not shown but could be included as described above. In particular.
Figure 11B:
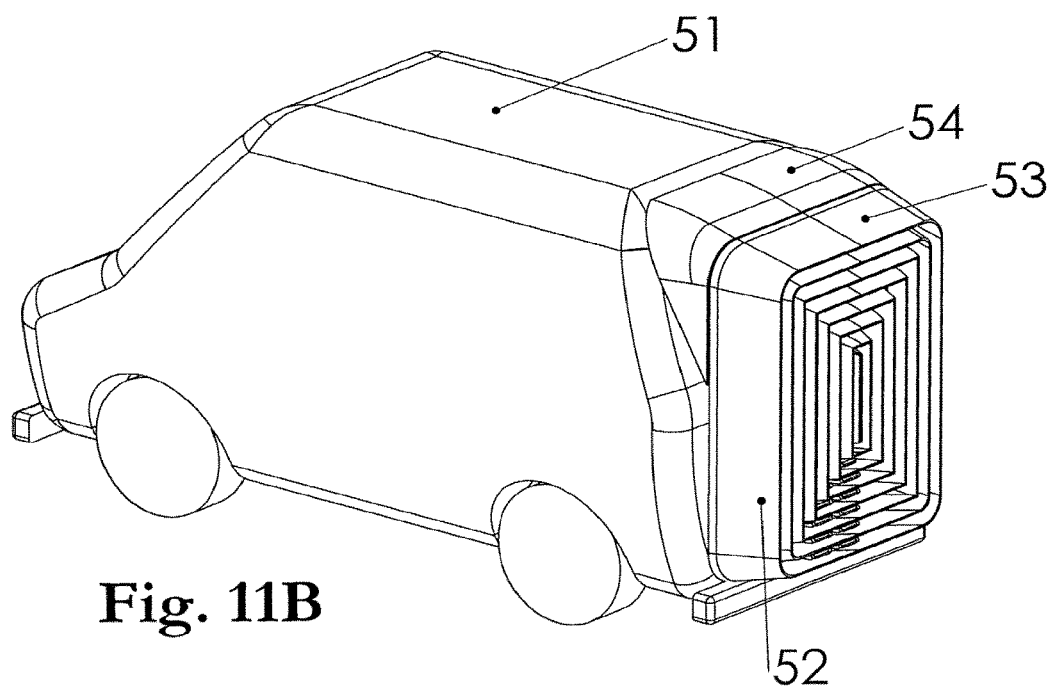
Figure 11C:
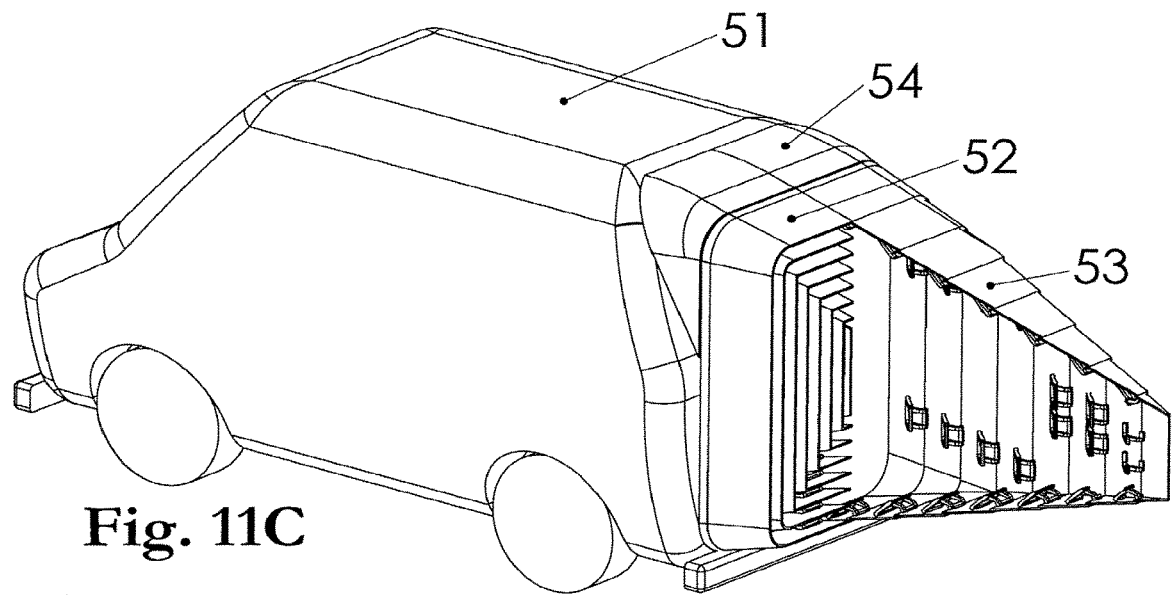
Figure 11D:
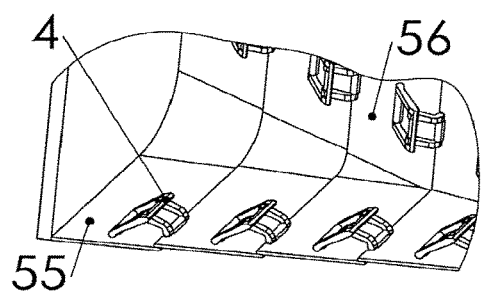
FIG. 11D is a partial perspective view of the interior of the right apparatus in the fully extended configuration. This view illustrates that the nesting shapes from one panel assembly to another do not necessarily need to be similar in shape. It also illustrates that a transition in the basic shape can be made from one nesting shape to the adjacent nesting shape.
Figure 11E:
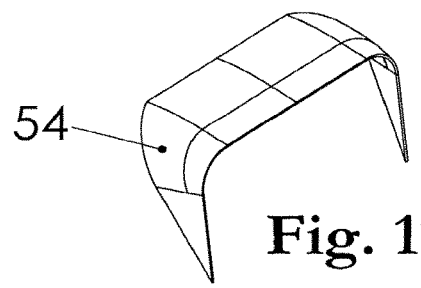
FIG. 11E is a perspective view of the aerodynamic fairing. In this view, the fairing is shown as one piece. It could also be made of two halves. In this case, each half could be mounted to the apparatus support structure. This would allow each fairing half to open with its respective apparatus half and would allow greater access to the rear of the vehicle. The fairing also contributes to the reduction in aerodynamic drag.
Figure 11F:
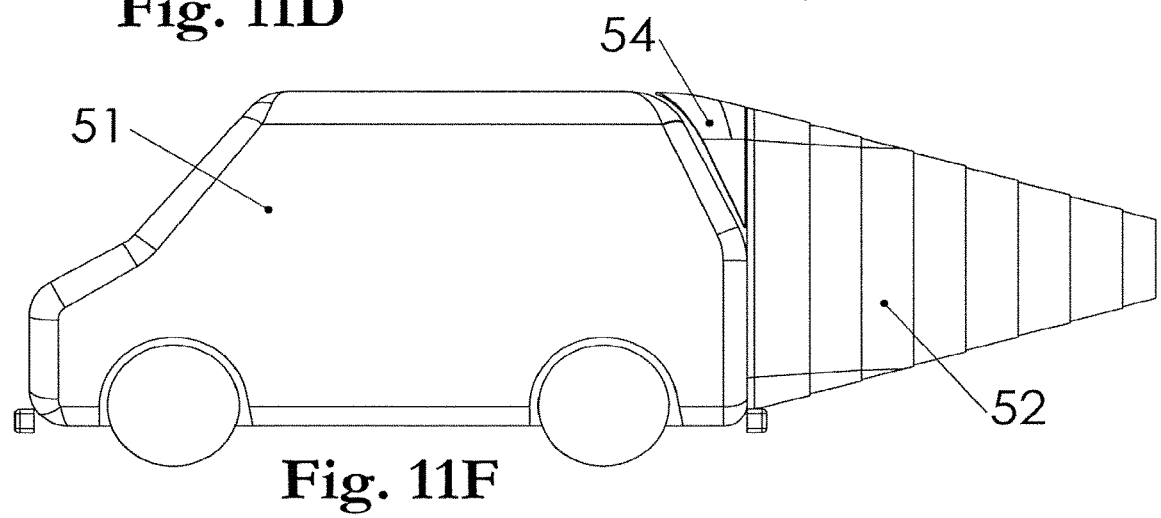
FIG. 11F is a side elevation view of a minivan with the aerodynamic apparatus mentioned above mounted on its rear fully extended. A fairing smoothly covers the gap between the drag reducing apparatuses and the minivan.
Figure 11G:
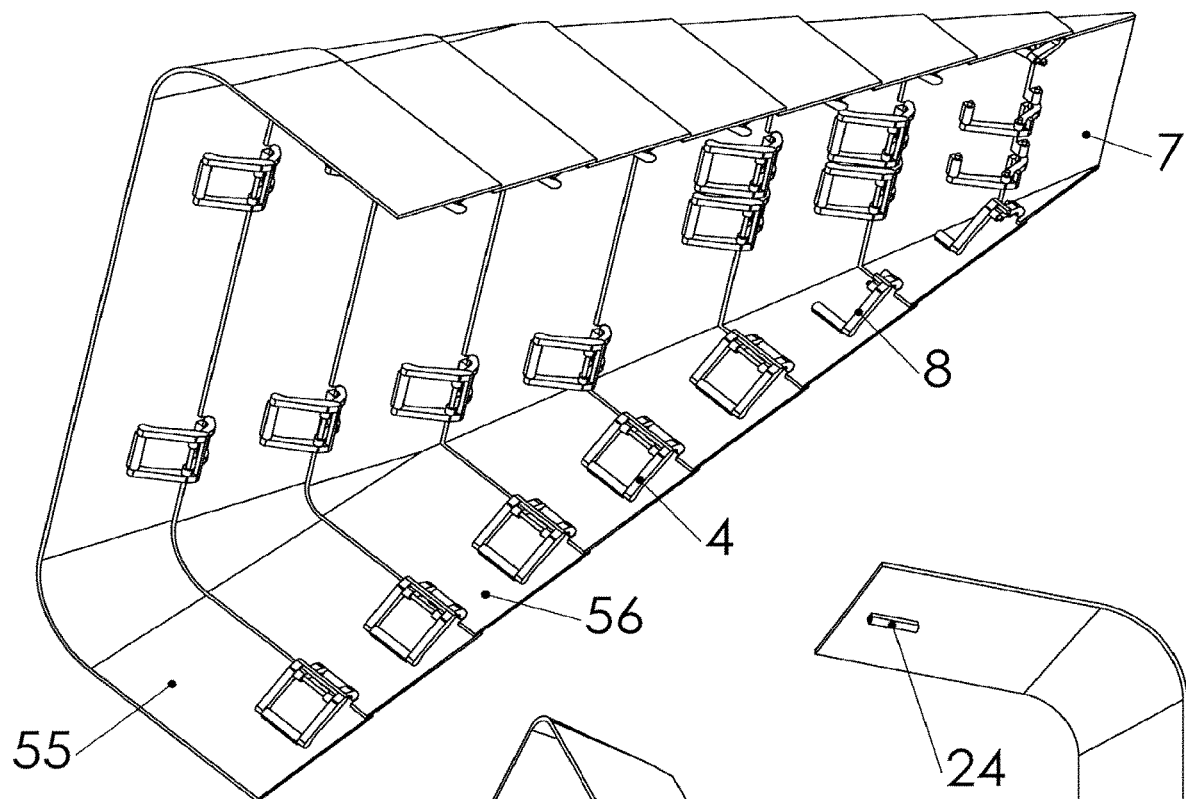
FIG. 11G is a perspective view showing the interior of the right apparatus in the fully extended configuration.
Figure 11H:
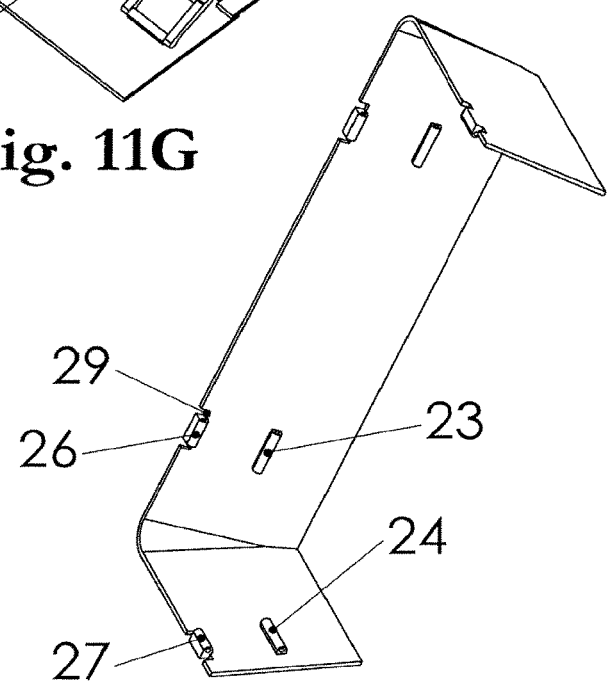
FIG. 11H is a perspective view of a typical panel assembly of the form used in the preceding paragraphs. It is shown with two sets of linkage mounting features and notches. These features are identical in purpose to those shown in FIGS. 3B and 3C. The essential difference is only the panel shape.
Figure 11I:
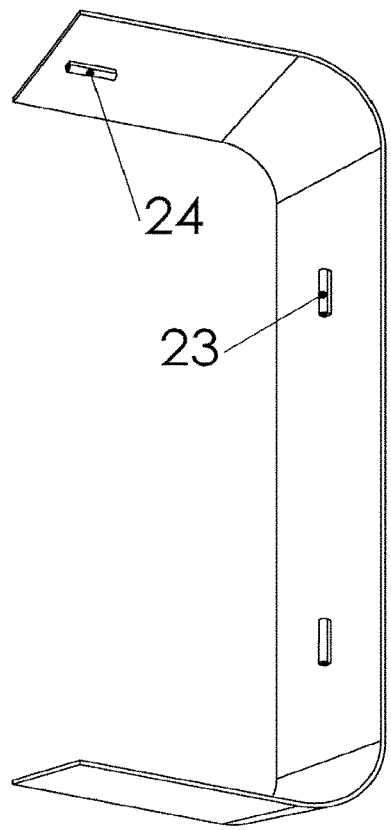
FIG. 11I is a perspective view showing the panel assembly farthest upstream. With the exception of the shape, this panel assembly shares the same features with the same purpose as the panel assembly shown in FIG. 3A.

In addition to over-the-road trailers 1, the present invention may be adapted to other vehicles. FIGS. 11A through 11I show a form suitable for use behind a minivan 51. The left hand apparatus 52 and right hand apparatus 53 have panel assemblies 55 and 56 of mixed shapes that allow them to blend to the contours of the minivan 51. The panel assembly 56 as shown in FIG. 11H transitions from one shape to another. The concept of transitioning shapes across a panel assembly 56, as illustrated here, can also be applied to other forms of the invention. The only limitations to this are that the panel assemblies must nest within each other when the apparatuses 52 and 53 are retracted, the mating edges must meet when the apparatuses 52 and 53 are deployed, and the linkage assemblies 4 or 8 must have adequate clearance over their required range of motion.

In the case of the minivan 51, shown in FIGS. 11A through 11C and 11F, the rear surfaces are not vertical and do not meet with the apparatuses 52 and 53. To provide a smooth transition from the minivan to the apparatuses 52 and 53, an aerodynamic fairing 54 is employed.

Figure 12A:
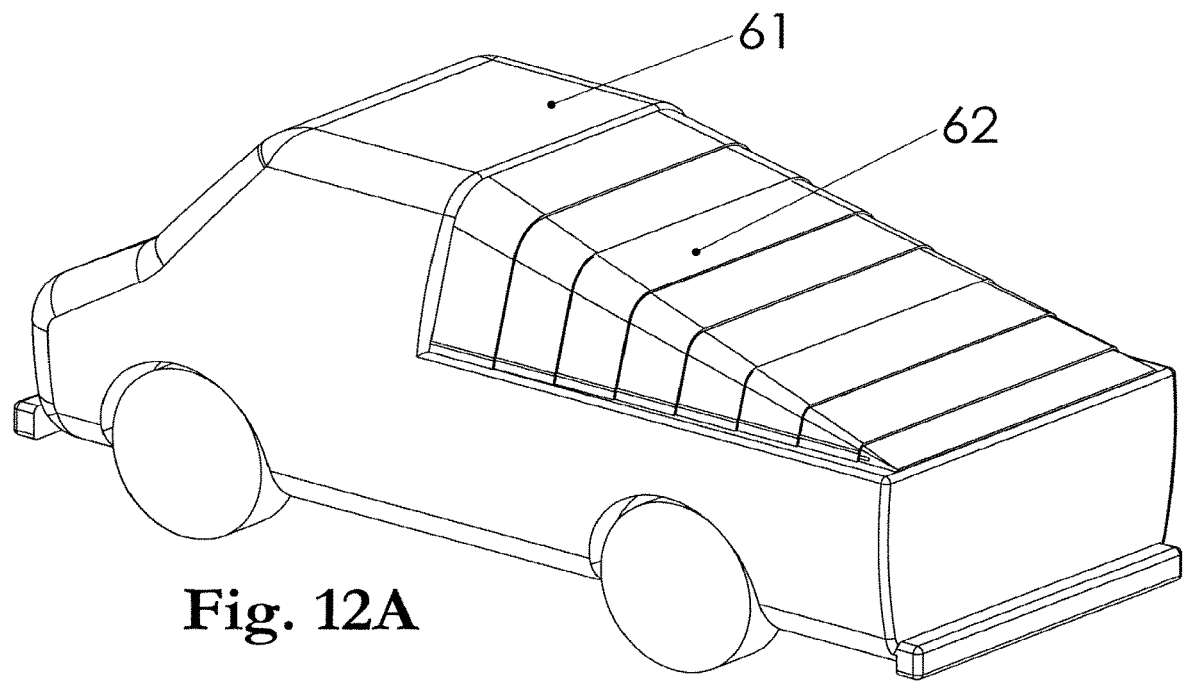
FIGS. 12A through 12C show a form of the present invention mounted behind the passenger cab of a pickup truck in two configurations. In this form, the aerodynamic drag reducing apparatus extends and retracts as a single mechanism. In this form, the apparatus, when fully extended, covers a pocket in the vehicle producing an overall aerodynamic shape that significantly reduces drag. In this form, two sets of linear sliding joints are used, each at a different location, between adjacent panel assemblies. A linear sliding joint is also formed between the bottom surfaces of the apparatus and the top surfaces of the pickup box sides. The interior of the pickup truck box can be accessed by retracting the apparatus. A retracted apparatus allows rear visibility through the apparatus and serves as a sun-shielding louver as well. The extension-retraction web and its related features are not shown but could be included as described above. In particular.
Figure 12B:
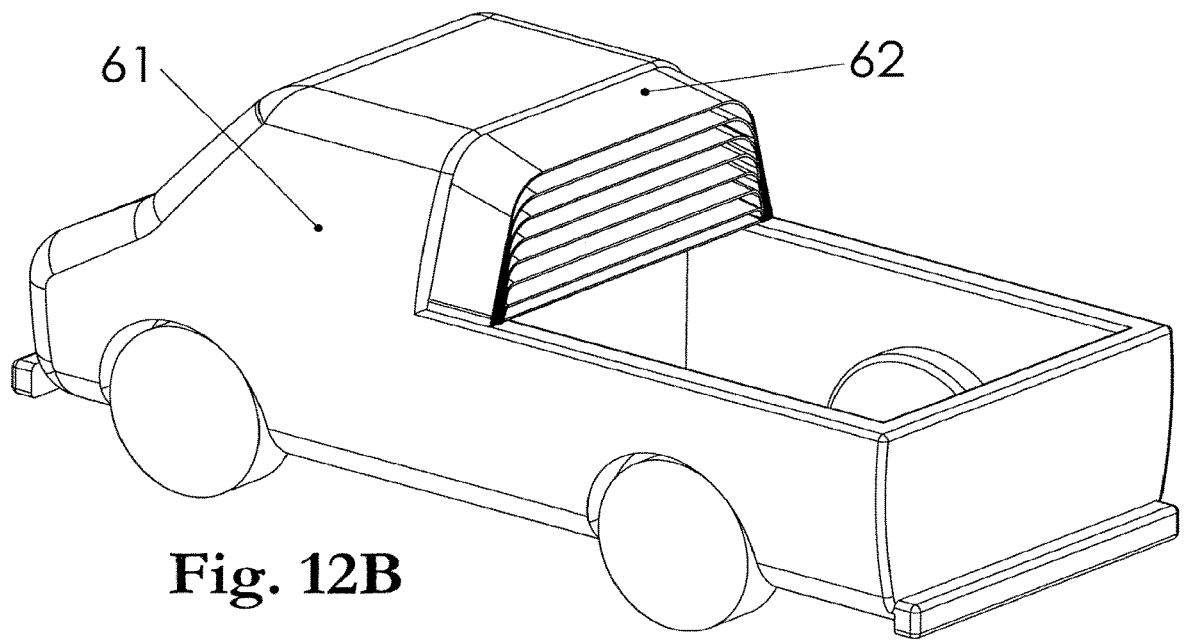
Figure 12C:
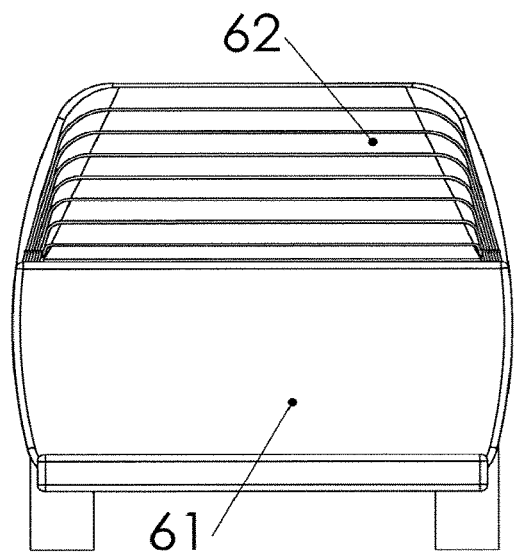
Figure 12D:
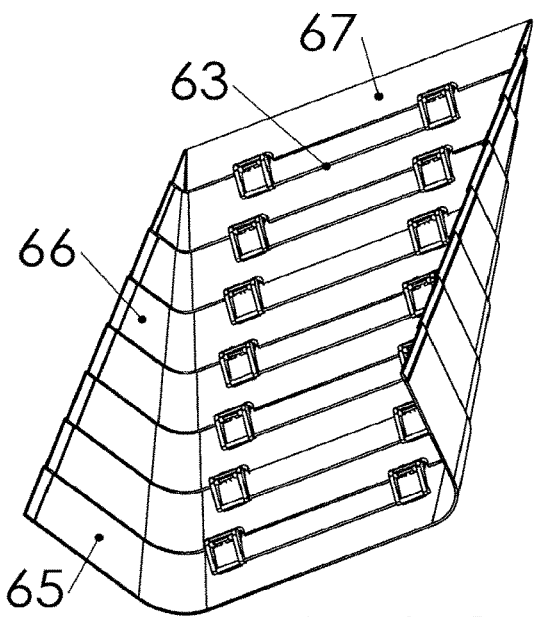
FIGS. 12D and 12E show the apparatus in a form suitable for mounting behind a pickup truck passenger cab. In particular.
Figure 12E:
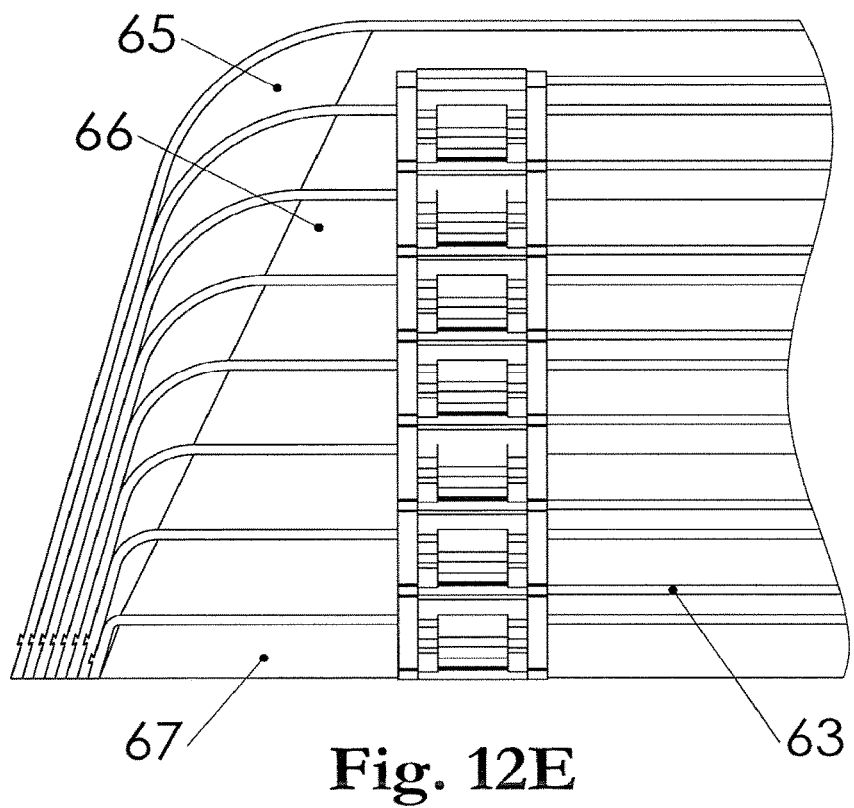

In addition to vehicles that have blunt rear surfaces as described above, vehicles such as pickup trucks 61 may benefit from the present invention. Pickup trucks 61 typically have blunt rear facing surfaces behind the passenger cab. As shown in FIGS. 12A through 12C, a form of the apparatus 62 may be employed. This form of the invention also employs linear sliding joints with keys 45 and ways 46 as described earlier on two surfaces of each panel assembly 65, 66, and 67 that are shown in detail in FIGS. 12E and 12G through 12I.

Figure 12F:
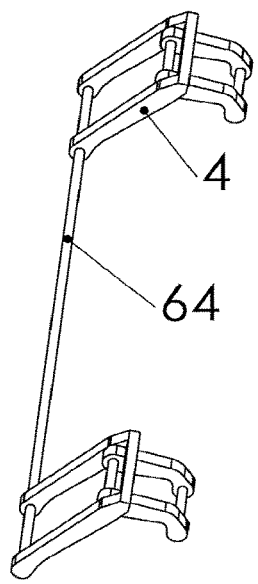
FIG. 12F is a perspective view of two extension-retraction linkage assemblies with a straight shaft connection joining a corresponding pair of links together. This ensures coordinated, non-binding action on all forms of the apparatus, especially where the spacing between linkage assemblies is wide. The straight shaft connection shown in this view could be replaced with a flexible shaft connection in the case that the coordinated links do not share a common pivot centerline. A gear train connection including components such as U-joints, belts, pulleys, and bevel gears could also replace the straight shaft connection. This view shows two linkage assemblies being connected and therefore coordinated. Additional linkage assemblies could be added in series or in parallel. In this view, linkage assemblies from between the same panel assemblies are connected. Linkage assemblies that are not between the same panel assemblies could also be connected in series or in parallel. An actuator controlling multiple linkage assemblies could be added to the shaft or alternate connecting parts mentioned above.
Figure 12G:
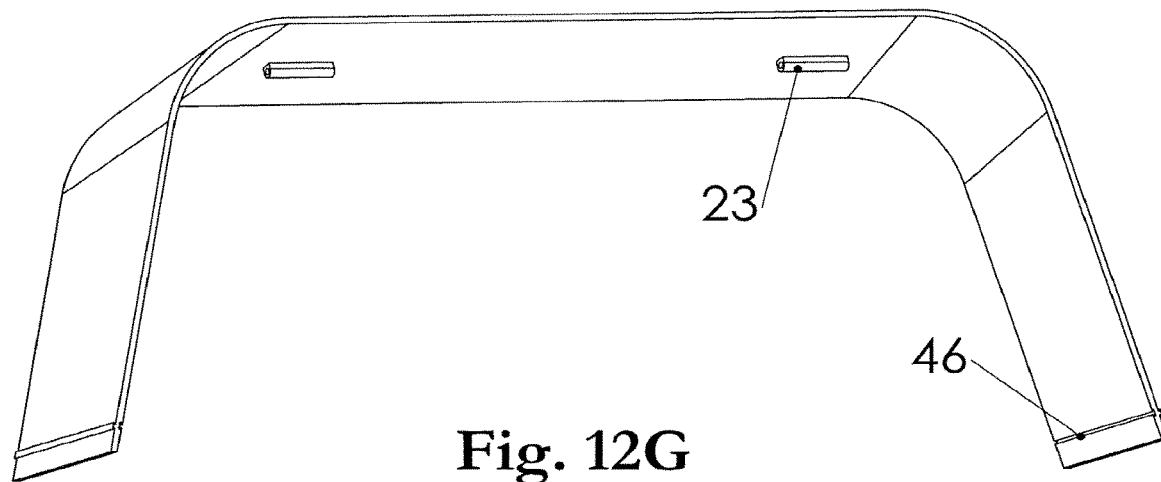
FIGS. 12G through 12I are perspective views showing panel assemblies used in a form of the apparatus suitable for mounting behind a pickup truck passenger cab. When relative placements are discussed below, they are in reference to the placements in a fully extended apparatus. In particular.
Figure 12H:
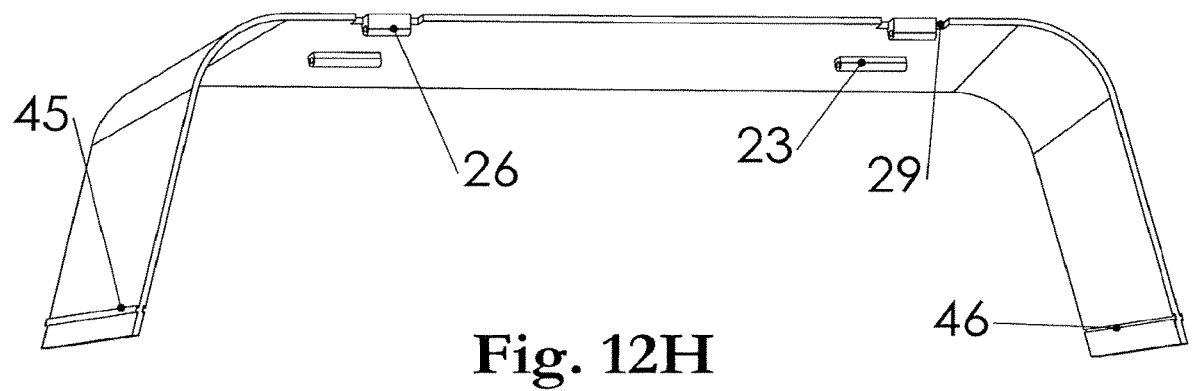
Figure 12I:
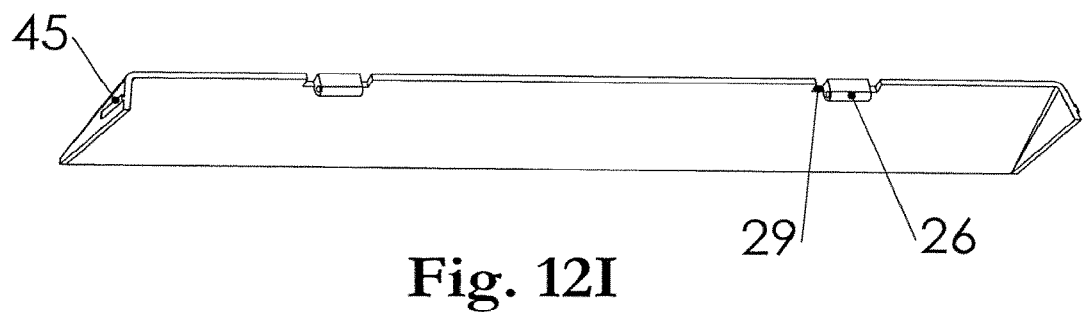
Figure 13A:
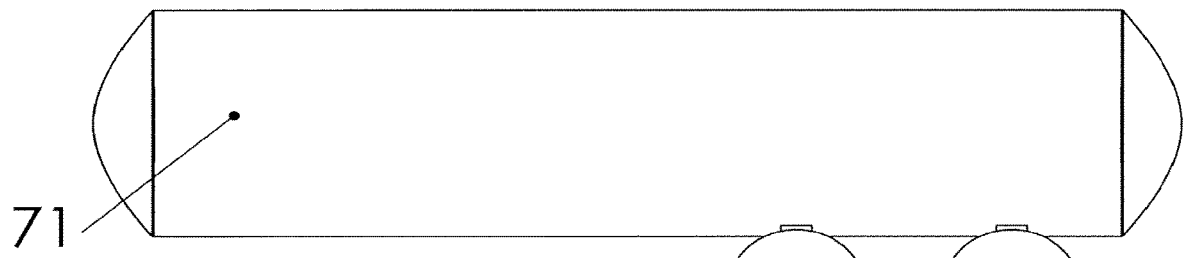
FIG. 13A shows a side elevation view of a typical over-the-road tanker truck.
Figure 13B:
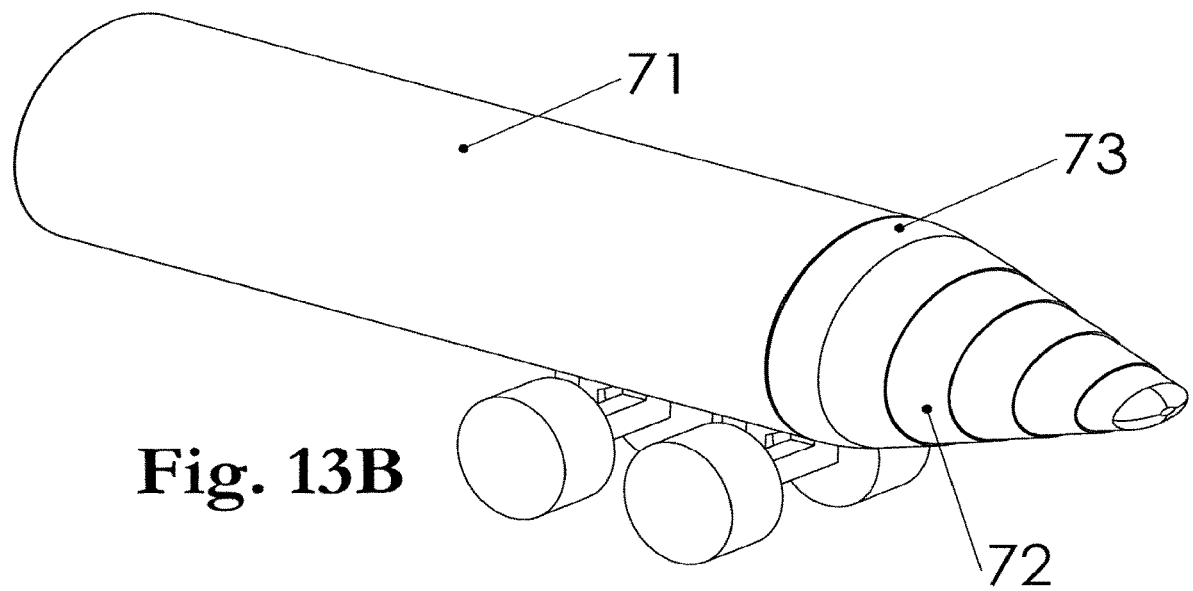
FIGS. 13B through 13F show a form of the present invention suitable for mounting behind an over-the-road tanker truck. In this form, the aerodynamic drag reducing apparatus extends and retracts as a single mechanism. An aerodynamic fairing is also used to fill the gap between the non-planar rear of the vehicle and the apparatus. The extension-retraction web and its related features are not shown but could be included as described above. In particular.
Figure 13C:
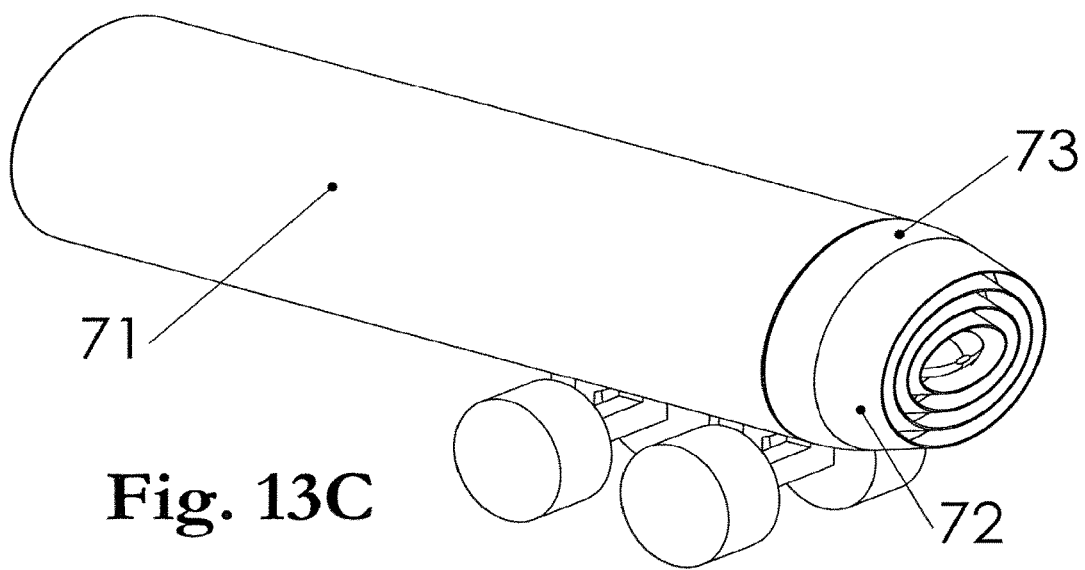
Figure 13D:
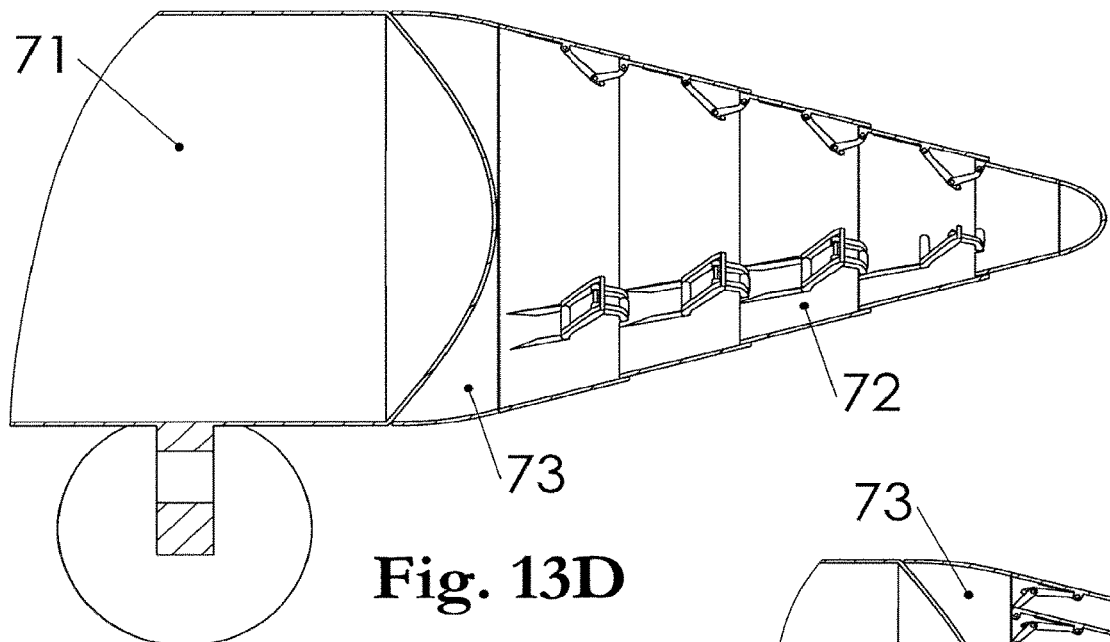
Figure 13E:
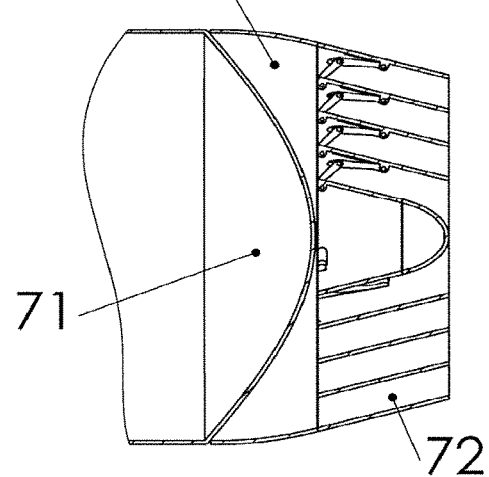
Figure 13F:
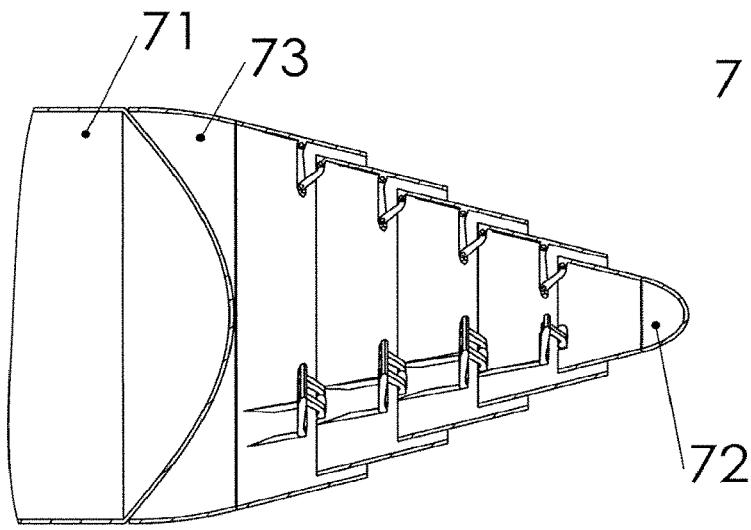
Figure 13G:
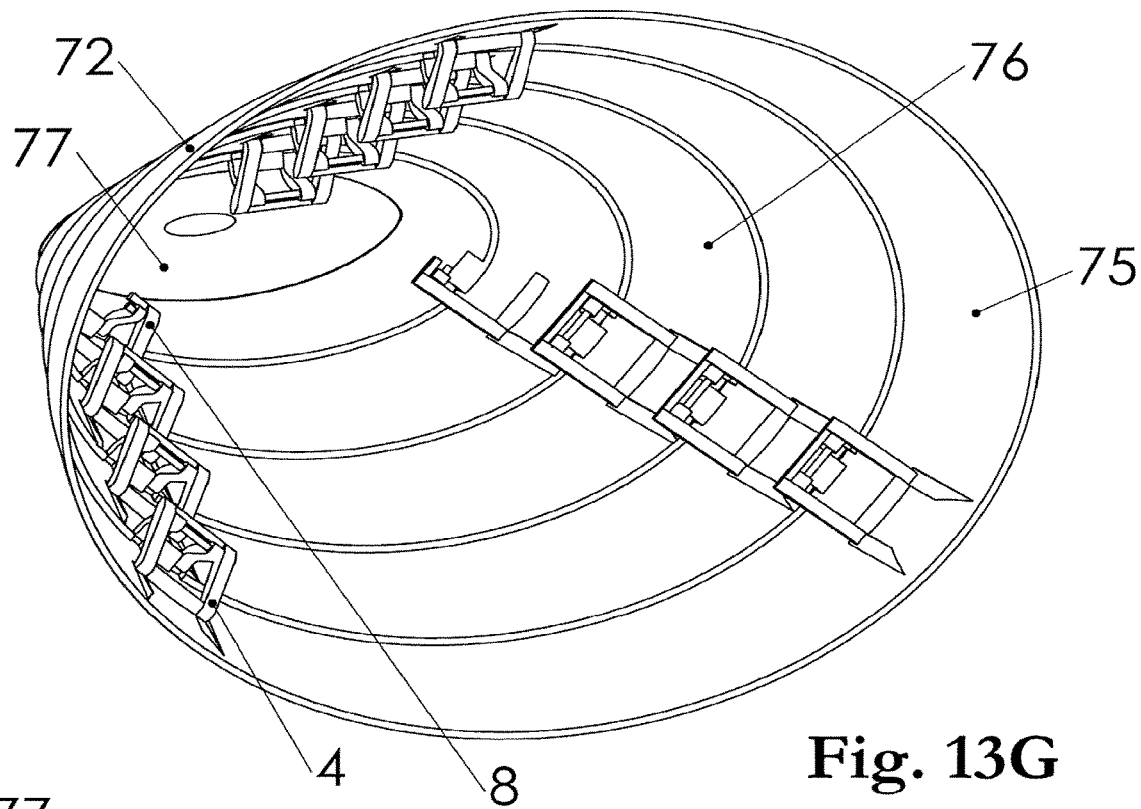
FIGS. 13G through 13J are perspective views showing primarily the interior of the apparatus and its components. The views show the apparatus and its components in a form suitable for mounting behind an over-the-road tanker truck. When relative placements are discussed below, they are in reference to the placements in a fully extended apparatus. In particular.
Figure 13H:
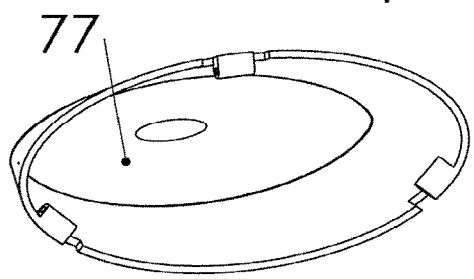
Figure 13I:
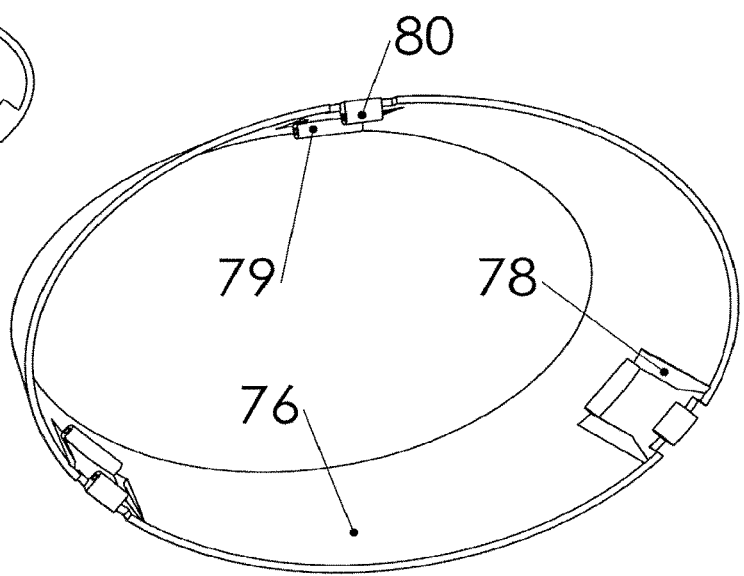
Figure 13K:
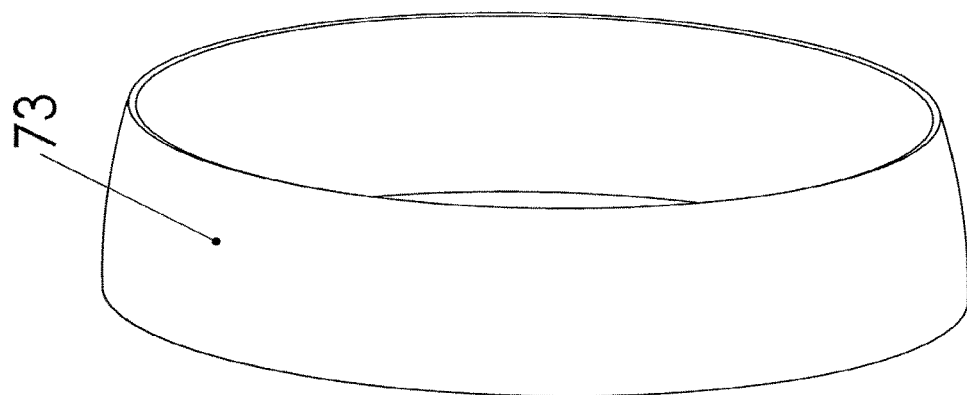
FIG. 13K is a perspective view showing an aerodynamic fairing in a form suitable for use between an over-the-road tanker truck and the apparatus discussed in the preceding paragraphs.
Figure 13J:
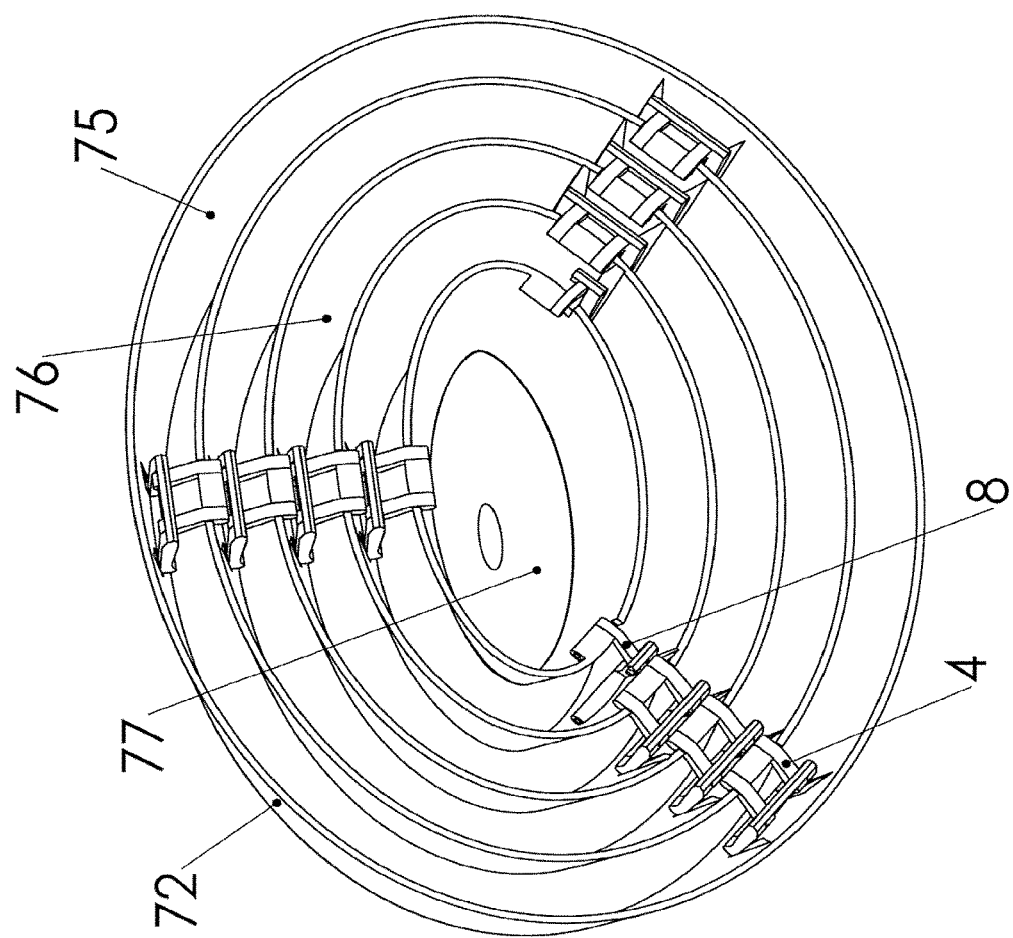
Figure 13X:
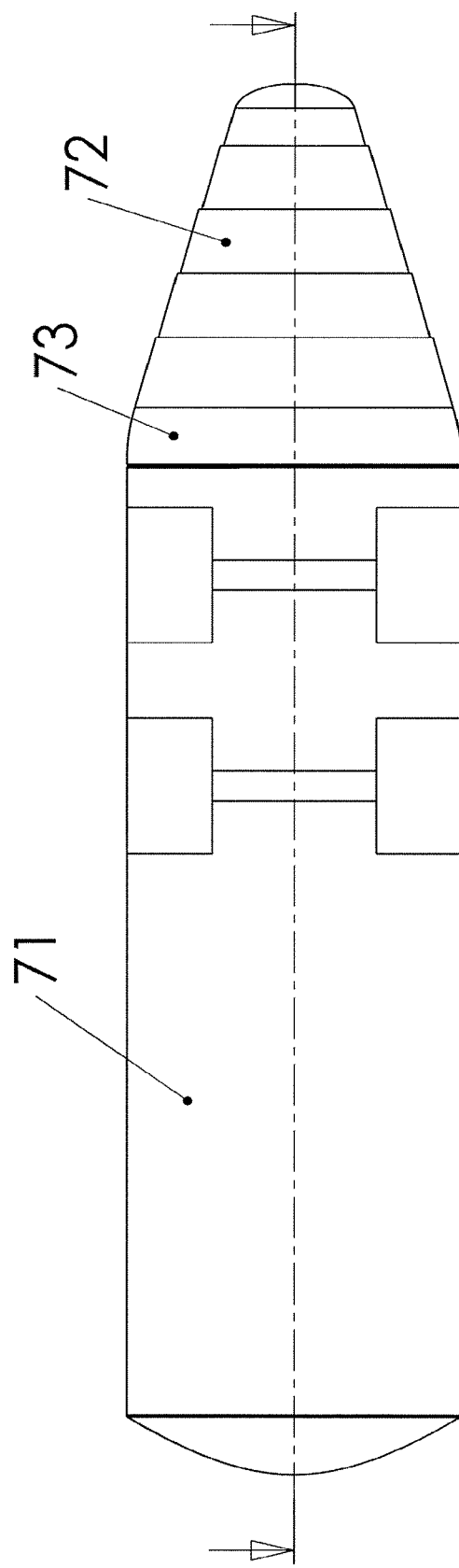
FIG. 13X is a bottom plan view of the apparatus and aerodynamic fairing mentioned in the preceding paragraphs. It also shows the section cut used to create FIG. 13D through 13F.

In this form, the linkage assembly 63 is optional. As shown in FIG. 12F, the linkage assembly 63 is comprised of two linkage assemblies 4 in combination with a straight shaft connection 64 between them. This is useful to coordinate the motion of one or more linkage assemblies 4 that are separated by a distance. This form of linkage assembly 63 may also be employed on other forms of the invention between two or more linkage assemblies 4 or 8 that have collinear joints axes. A flexible shaft connection could be used in forms of the invention that have non-collinear joints. A gear train connection could also be used to coordinate movement between various linkage assemblies. The linkage assemblies could be between the same or different sets of panels. An actuator could power one or more of these connected linkage assemblies.

If the linkage assembly 63 is used with apparatus 62, it could provide the benefits of a self-return function and a travel-stop function, as described above. In addition to vehicles that have predominately horizontal and vertical exterior surfaces as described above, the present invention may be adapted to vehicles with other shapes. FIGS. 13B through 13K show a form suitable for use behind a tanker trailer 71 with an elliptical cross-section. In this case, no access to the rear of the trailer 71 is required. Thus the apparatus 72 is made as a whole and not in halves. The panel assemblies 75, 76, and 77 are made in the general shape of the tanker trailer 71. The panel assembly 77 farthest downstream in the extended configuration is formed with a smooth capping surface. The linkage assemblies 4 and 8 are used in sets of three. Correspondingly, three sets of linkage mounting surfaces 79 and 80 are provided to attach the linkage assemblies 4 and 8. Shallow grooves 78 are cut into the panel assemblies 75 and 76 to allow the linkage assemblies 4 or 8 to move through their required range of motion.

To smooth the transition from the tanker trailer 71 to the apparatus 72, an aerodynamic fairing 73 is employed. The fairing 73 also covers a domed surface at the rear of the tanker trailer 71.

A modification to the basic form of the invention is shown in FIGS. 14A through 14K that provides for a smooth transition from the exterior surfaces of the over-the-road trailer 1 to the apparatuses 82 and 83. This form of the apparatuses 82 and 83 has all the same components and features as the basic apparatuses 2 and 3 except for those specifically mentioned in the conversion process below. Apparatuses 82 and 83 will reduce drag, but will cost more to produce. To convert apparatuses 2 and 3 into apparatuses 82 and 83, several steps are required. To begin, the first panel assembly 5 is replaced by the first panel assembly 85. Next, the panel assembly 6 adjacent to the first panel assembly 85 is replaced by panel assembly 86. Finally, the first set of linkage assemblies 4 are replaced by a set of linkage assemblies 84, and the extension-retraction corner pulley 34 is moved slightly. The first panel assembly 85 has curved surfaces that blend the overall slope of the apparatuses 82 and 83 with the trailer 1. This creates a slightly smaller space for the extension-retraction linkage assembly 84 to occupy. This is addressed by using link 88 and link 89 in the linkage assembly 84, resulting in a lower profile. A torsional spring 81 is used to spring load the linkage assembly 84 into the extended position. Panel assembly 86 differs from panel assembly 6 only by small notches 87 that are required to allow the linkage assembly 84 to operate through its range of motion.

Optional doors 90, 91, 92, and 93 may be added to the basic apparatuses 2 and 3 as shown in FIGS. 15A through 15F. These doors serve two functions but add cost and complexity to the apparatuses 2 and 3. The first function is keeping mud, snow, ice, and other debris out of the interior of the apparatuses when they are in the retracted configuration by covering up the openings between the panel assemblies 5, 6, and 7 as shown in FIG. 15B. The second function is providing a smoother transition across the panel assembly joints when in the extended configuration as shown in FIG. 15D. The latter will reduce drag. The doors 90, 91, 92, and 93 are actuated by a spring-loaded hinge 94 that tends to rotate them to a closed position. As the apparatuses 2 and 3 extend, the panel assemblies 6 and 7 simply overpower the spring-loaded hinges 94 and open the doors. The sequence that the panel assemblies 6 and 7 open is important when the optional doors 90, 91, 92, and 93 are present. As illustrated in FIG. 15E, the upstream panel assemblies 6 should extend sequentially before each downstream panel assembly 6 and 7 to avoid having the tips of the doors 90 and 91 caught in the hinge area of the doors 90 and 91 below it. As described above, this can be accomplished by putting stiffer springs 13 on the downstream linkage assemblies 4 and 8.

A modification to the basic form of the invention is shown in FIGS. 16A through 16J that provides for a smooth transition from the exterior surfaces of the over-the-road trailer 1 to the apparatuses 102 and 103 and between the panel assemblies 105 and 106 when fully extended. This modification consists of a pair of first panel assemblies 105 having essentially the same form and features as the pair of first panel assemblies 85 described above. In addition, a set of linkage assemblies 84 connects the first panel assemblies 105 to the corresponding panel assemblies 106. Furthermore, the exterior shape of panel assemblies 106 is modified from panel assemblies 6. Doors 110 and 111 are added and serve a similar function to the doors 90, 91, 92, and 93 as described in the preceding paragraph. Finally, corner covers 112 provide a smooth shape to the corners of the apparatuses 102 and 103 when fully extended. In this form, the invention will produce a greater drag reduction, but at a greater cost and complexity.

As shown in FIG. 16H, the doors 110 and 111 combine with the exterior surfaces of the panel assemblies 106 to form a smooth contour along the exterior of the apparatuses 102 and 103 when fully extended with the exception of the corners. The doors 110 and 111 are actuated in a similar fashion to the doors 90, 91, 92, and 93 mentioned above.

The doors 110 and 111, in a fully extended configuration, do not reach the corner of the apparatuses 102 and 103. This leaves a small portion of the corner uncovered similar to the corner shown in FIG. 15A. Corner covers 112 can be attached to the doors 102 and 103 to cover the corners in a smooth manner as shown in FIGS. 16K through 16M. The hinge 94 between the corner covers 112 and the door 110 or 111 is spring-loaded and tends to return to the fully extended configuration. When the apparatuses 102 and 103 retract, the corner cover 112 pushes against the neighboring corner cover 112, and they both fold into the retracted configuration as shown in FIG. 16M. This results in the corner covers 112 protruding the farthest downstream when the apparatuses 102 and 103 are fully retracted. The corner covers 112 are optional, and FIGS. 16G and 16J are shown without them.

Different methods may be employed to gain access to the rear of the vehicle or trailer. FIGS. 17A and 17B show hinges 118 connecting the apparatuses 2 and 3 to the trailer 1. This type of connection has been implied above.

FIGS. 18A and 18B show a telescoping linear slide 121 connecting the apparatuses 122 and 123 to the trailer 1. As shown in FIG. 18C, the apparatuses 122 and 123 differ from the basic apparatuses 2 and 3 only because they have a linear slide feature 124 on them. The telescoping linear slide 121 has trailer attachment points 125.

FIGS. 19A through 19G illustrate articulating links 127, 128, and 129 that move the apparatuses 2 and 3 from a closed position as shown in FIGS. 19A and 19C, to a fully open position as shown in FIGS. 19B and 19G.

A modification to the basic form of the invention is shown in FIGS. 20A through 20E that replaces the linkage assemblies 4 and 8 with straight links (or hinged panels) 133 and 134. The simplicity of the straight links 133 and 134 may result in a lower overall cost for this form of the invention compared to the basic form, exemplified by apparatuses 2 and 3. However, the reduced cost sacrifices the robust travel-stop function as described above. The door/mounting platform 131 is essentially the same as the door/mounting platform 9 described above. The panel assemblies 132 and 135 replace panel assemblies 6 and 5 respectively. The panel assemblies 132 and 135 have significantly smaller pivoting surfaces 23, 24, 26, and 27 in a slightly different location. The notches 29 are removed from panel assembly 132, which is instead trimmed to a shorter depth than panel assembly 135. This allows the straight links 134 to sit in a gap upstream from the upstream edge of the panel assemblies 132 when the apparatus is in the fully retracted configuration.

A modification to the basic form of the invention is shown in FIGS. 21A through 21O that provides for a smooth transition from the exterior surfaces of the over-the-road trailer 1 to the apparatuses 202 and 203 and between panel assemblies, 201, 205, 206, and 207 when fully extended. In the present form, a more gradual transition is possible than those described above in apparatuses 82, 83, 102, and 103. This is possible because the transition occurs over two panel assemblies 201 and 205. This concept could also be used to extend the transition over three or more panel assemblies.

When making a gradual transition over multiple panel assemblies 201 and 205, the panel assemblies 201 and 205 end up closer to each other in the retracted configuration as compared to the basic form in apparatuses 2 and 3. At some point, a practical linkage assembly 4 will no longer fit between the panel assemblies 201 and 205. The present form of the invention resolves this problem by using linkage assemblies 204 and 208 of a different form to connect the first three panel assemblies 205, 201, and 206. These linkage assemblies 204 and 208 fit in front of the panel assemblies 201 and 206 when the apparatuses 202 and 203 are fully retracted as shown in FIGS. 21M and 21N. To conserve space, linkage assembly 208 nests inside of linkage assembly 204. This concept could be extended to three or more linkage assemblies as well.

Linkage assemblies 204 connect to the first panel assembly 205 near its upstream edge at pivot points 234 and 235. On the other end, linkage assemblies 204 connect to the second panel assembly 201 near its upstream edge at pivot points 236 and 237. Pivot points 236 and 237 are also used by linkage assemblies 208 to connect the second panel assembly 201 to the third panel assembly 206 near its upstream edge at pivot points 26 and 27. This results in the second panel assembly 201 not being in the linkage chain, but merely attaching to linkage pivot points.

The panel assemblies 206 and 207 downstream from the gradual transition area retain the same pivot features 23, 24, 26, and 27 as the panel assemblies 6, 7, 56, 86, and 106 used in the apparatuses 2, 3, 52, 53, 82, 83, 102 previously described. Likewise, linkage assemblies 4 are used in conjunction with these downstream panel assemblies 206 and 207.

As shown in FIGS. 22A through 22E, the linkage assemblies 204 and 208 use a stop pocket 223 and stop protrusion 224 to prevent over travel. The stop pockets 223 are placed in links 221 and 225 and the stop protrusions 224 are placed in links 222 and 226. In addition to the travel stop function, the stop pocket 223 and stop protrusion 224 together perform a detent function. This is done by having the stop pocket 223 deeper at the end of the travel range. The stop protrusions 224 are spring-loaded and thus move into these detents. The result is that the apparatuses 202 and 203 are stable in the fully retracted and fully extended configuration.

The present form of the invention incorporates vertical covers 210 and horizontal covers 211 in much the same way as apparatuses 102 and 103. They serve the function of keeping debris out of the apparatuses 202 and 203 when they are in the closed configuration. When in the extended configuration, the covers smooth the transition between panel assemblies 201, 205, 206, and 207.

Corner covers 212 are also used in the present form of the invention. These corner covers 212 have a single hinge line 94 connecting them to the corresponding panel assemblies 201, 205, and 206. The primary function of the corner covers 212 is to form a smooth surface near the corners when the apparatuses 202 and 203 are fully extended.

To assist in keeping the panel assemblies 201, 205, 206, and 207 properly aligned with each other when the apparatuses 202 and 203 are fully extended, optional guides 220 are incorporated along the leading edge of the panel assemblies 201, 206, and 207. These guides contact the inside surfaces of the downstream edge of the panel assemblies 205, 201, and 206 immediately upstream. The trailer door 209 accommodates the guides 220 belonging to the second and third panel assemblies 201 and 206 with appropriate pockets.

An alternative to the linkage assemblies 204 and 208 would be to use linear slides 45 and 46 as shown in FIGS. 10E, 10F, and 10G.

An alternative form of the present invention is illustrated in FIGS. 24A through 24D, FIGS. 25A through 25D, FIGS. 26A through 26F, and FIGS. 27A through 27J. In the present form, one or more of the panel assemblies 5, 6, 7, 44, 55, 56, 65, 66, 67, 75, 76, 77, 85, 86, 105, 106, 132, 135, 201, 205, 206, and 207 belonging to a previous form of the invention are replaced by a corresponding framework 305 and 306. The framework 305 and 306 retains the attachment points 23, 24, 26, 27, 79, 80, 234, 235, 236, and 237 connecting to the linkage assemblies 4, 8, 63, 84, 204, and 208. The function and operation of the linkage assemblies remain the same as in the previous corresponding form. Likewise, the optional extension-retraction system 10 is retained by the present form, including web routing features 25 and 28 and web connecting features 30 and 31. To provide an aerodynamic surface, fabric 308 is connected to the framework 305 and 306 and, in some cases, to panel assemblies 304 and 307.

An example of the present form of the invention (excluding the fabric 308) is shown in FIG. 24A fully extended and attached to the rear of an over-the-road trailer 1. If the fabric 308 were included in this view, the appearance and exterior shape would be similar to that of FIG. 21A. As in earlier forms, this exemplary form has the aerodynamic drag reducing apparatus split in two halves, right 303 and left 302.

The fabric 308 attaches to the framework 305 and 306 at the trailing edge. When fully extended, the framework 305 and 306 provide shape and support to the fabric. When partially extended and when fully retracted, the fabric 308 takes the form of a bellows as shown in FIGS. 26A and 26D, FIGS. 27A through 27C, and FIGS. 27F through 27H.

Optionally, it may be desired to have the fabric 308 drawn into the spaces in between the frameworks 305 and 306 and panel assemblies 304 and 307 as shown in FIGS. 26A and 26D. In this case, elastic members can be attached between various points on the fabric 308 and the frameworks 305 and 306 and panel assemblies 304 and 307. When fully extended, the elastic members are overcome by the extension forces and the bellows shape is lost. An alternative method would be to embed elastic members into the fabric 308. In this case, the fabric 308 would take a bellows shape when no external loads were present. An additional alternative method would be to attach the fabric farther upstream than the trailing edge of the framework.

The fabric 308 serves several potential functions. The first is to provide all or part of the aerodynamic surface when the apparatus is fully extended. A second function is to carry tensile and shear loads when the apparatus 302 and 303 is fully extended. A third is to protect the joints of the linkage assemblies from the elements. A fourth is to provide an optional means for extending and retracting the apparatus. This is done by the fabric 308 serving as a bladder. To extend the apparatus 302 and 303, this bladder is filled with air. To retract the bladder, the air is evacuated.

The fabric 308 may be airtight or it may be porous. The fabric may be stiff or it may be stretchable.

In the present disclosure, the words "a" or "an" are to be taken to include both the singular and the plural. Conversely, any references to plural items shall, where appropriate, include the singular.

In the present disclosure, many features are described with respect to the theoretical design. For instance, "completely smooth" refers to the theoretical design shape. It is understood that imperfections exist and clearances are required in real parts. In these cases, such terms are used to distinguish the differences between theoretical designs.

It is desirable for drag reducing devices in accordance with the principles of the present disclosure to be shaped to reduce the effects of air flow separation. In certain example embodiments, drag reducing devices in accordance with the principles of the present disclosure may define an angle θ (see FIG. 21F) relative to the rear surface of the vehicle that is less than 18 degrees, or in the range of 10 to 18 degrees. As the drag reducing devices extend in a rearward direction relative to the vehicle, the drag reducing devices may be straight as shown at FIG. 1I. Alternatively, the drag reducing devices may include at least portions having segments angled relative to one another at progressively steeper angles as the devices extend in a rearward direction. In still other embodiments, at least portions of the drag reducing devices may curve as the devices extend rearwardly from their corresponding vehicles. In still other embodiments, the drag reducing devices may curve continuously along their lengths. Angle variations (e.g., curves or angled segments as described above) can be used to provide smooth transitions from the rear of the vehicle to the main bodies of the drag reducing devices.

When extended, drag reducing devices in accordance with the present disclosure may define relatively discrete peaks (see FIG. 1A) or may be truncated (see FIG. 21E). In certain truncated embodiments, the extended lengths of the drag reducing devices are such that the effects of drag caused by air separation at the truncated ends are minimal. In example embodiments suitable for tractor trailers, the drag reducing devices may have extended lengths greater than 6 feet, or in the range of 6 to 22 feet, or in the range of 8-14 feet. Vehicles having smaller heights and widths could be equipped with proportionally smaller drag reduction devices. In certain embodiments, the ratio of the extended length of the drag reduction device to a reference dimension of the vehicle is at least 1 to 1. The reference dimension is typically the smaller of the width or the height of the rear of the vehicle body. In the embodiment of FIG. 21A, the width w is the reference dimension since it is smaller than the height h. In other embodiments, this ratio is at least 1.5 to 1, or at least 2 to 1, or at least 3 to 1.

In certain embodiments, drag reducing devices in accordance with the present disclosure may be automatically extended or retracted. A control system may be used to automatically control extension and retraction. In certain embodiments, vehicle speed or other vehicle parameters may be used to automatically control retraction/extension. For example, a controller may sense vehicle speed, and automatically cause retraction of the drag reducing device if the vehicle speed moves below a given speed value (e.g., 45 miles per hour).

Retractable drag reducing devices in accordance with the present disclosure can have relatively long extended lengths as compared to retracted lengths. Certain embodiments have an extended length to retracted length ratio of at least 6 to 1. Other embodiments have extended length to retracted length ratios of at least 10 to 1 or at least 20 to 1.

While specific angles and lengths have been specified for certain embodiments of the present disclosure, it will be appreciated that the broad aspects of the present disclosure are not limited to these values.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. An aerodynamic drag reducing apparatus adapted for use on a vehicle with a substantially vertical rear end, the aerodynamic drag reducing apparatus comprising:
   at least one aerodynamic element which is adjustable between a first position and a second position, wherein the at least one aerodynamic element extends at least a portion of a contour of the vehicle and is adapted to reduce drag when at the second position;
   at least one support device for supporting the at least one aerodynamic element at least when at the second position;
   wherein the at least one support device includes a four-bar linkage having at least four joint axes for adjusting the aerodynamic element between the first position and the second position, the four-bar linkage including:
      at least one main oscillating link of a greater length and at least one secondary oscillating link of a smaller length;
      wherein the main oscillating link and the secondary oscillating link each include a first joint for attachment to the vehicle and a second joint which serves for pivotally connecting the main oscillating link and the secondary oscillating link respectively to the aerodynamic element.

2. The aerodynamic drag reducing apparatus of claim 1, wherein the four-bar linkage comprises precisely four joint axes.

3. The aerodynamic drag reducing apparatus of claim 1, wherein the four joint axes in which the aerodynamic element is adjustable run parallel to one another.

4. The aerodynamic drag reducing apparatus of claim 1, wherein the four-bar linkage forms a positive guidance for adjusting the aerodynamic element between the first position and the second position.

5. The aerodynamic drag reducing apparatus of claim 1, wherein the first joint of the secondary oscillating link is attached to the vehicle further outwards towards a side wall of the vehicle than the first joint of the main oscillating link.

6. The aerodynamic drag reducing apparatus of claim 1, wherein in the first position the second joint of the secondary oscillating link is attached to the aerodynamic element further laterally outwards than the second joint of the main oscillating link.

7. The aerodynamic drag reducing apparatus of claim 1, wherein a first swivel angle of the main oscillating link is smaller than a second swivel angle of the secondary oscillating link.

8. The aerodynamic drag reducing apparatus of claim 1, wherein the four-bar linkage is a planar linkage that operates in a substantially horizontal plane.

9. The aerodynamic drag reducing apparatus of claim 1, further comprising two secondary oscillating links having first joints lying in a common joint axis and second joints lying in a common joint axis.

10. The aerodynamic drag reducing apparatus of claim 1, wherein the at least four joint axes are each cylindrical.

11. The aerodynamic drag reducing apparatus of claim 1, wherein the at least one aerodynamic element comprises a side aerodynamic element, wherein the at least four joint axes include vertically running joint axes, and wherein the side aerodynamic element extends the at least the portion of the contour of the vehicle of a side wall of the vehicle.

12. The aerodynamic drag reducing apparatus of claim 1, wherein the first position of the aerodynamic element is a non-deployed position and the second position of the aerodynamic element is a deployed position.

13. The aerodynamic drag reducing apparatus of claim 1, further comprising travel-stops for at least one of the first position and the second position.

14. The aerodynamic drag reducing apparatus of claim 1, further comprising at least one spring device, which pushes the at least one aerodynamic element into the first position in a first swivel range and into the second position in a second swivel range.

15. The aerodynamic drag reducing apparatus of claim 1, comprising a left-hand side aerodynamic element and a right-hand side aerodynamic element for attachment to the vehicle, wherein the aerodynamic elements in the first position are adjacent side walls of the vehicle.

16. The aerodynamic drag reducing apparatus of claim 12, wherein the non-deployed position of the aerodynamic element is at a side of the vehicle.

17. The aerodynamic drag reducing apparatus of claim 14, wherein the spring device is installed in a bistable arrangement having a dead-point position between the first swivel range and second swivel range.

18. A drag reducing device for use in reducing aerodynamic drag on a vehicle, the drag reducing device comprising:
   a drag reducing element that is movable between a deployed configuration and a stowed configuration; and
   an unequal link four-bar linkage arrangement adapted to move the drag reducing element between the deployed configuration and the stowed configuration.

19. The drag reducing device of claim 18, wherein a base of the unequal link four-bar linkage is included on the vehicle.

20. An aerodynamic drag reducing apparatus adapted for use on a vehicle with a substantially vertical rear end, the aerodynamic drag reducing apparatus comprising:
   at least one aerodynamic element moveable between a first position and a second position, the aerodynamic element extending between a first end and a second end, the first end of the aerodynamic element adjacent a portion of a perimeter of the substantially vertical rear end at least when the aerodynamic panel assembly is at the second position, the second end of the aerodynamic element positioned rearwardly behind the vehicle at least when the aerodynamic element is at the second position; and
   at least one four-bar linkage for supporting the at least one aerodynamic element at least when the at least one aerodynamic element is at the second position.

* * * * *